(12) United States Patent
Rosson

(10) Patent No.: US 11,493,699 B2
(45) Date of Patent: Nov. 8, 2022

(54) MULTIFIBER FIBER OPTIC CONNECTORS, CABLE ASSEMBLIES AND METHODS OF MAKING THE SAME

(71) Applicant: Corning Research & Development Corporation, Corning, NY (US)

(72) Inventor: Joel Christopher Rosson, Hickory, NC (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 16/697,036

(22) Filed: Nov. 26, 2019

(65) Prior Publication Data

US 2020/0096710 A1 Mar. 26, 2020

Related U.S. Application Data

(63) Continuation of application No. PCT/US2017/064063, filed on Nov. 30, 2017.
(Continued)

(51) Int. Cl.
*G02B 6/38* (2006.01)
*G02B 6/44* (2006.01)
*G02B 6/42* (2006.01)

(52) U.S. Cl.
CPC .......... *G02B 6/3879* (2013.01); *G02B 6/387* (2013.01); *G02B 6/3825* (2013.01); *G02B 6/3826* (2013.01); *G02B 6/3831* (2013.01); *G02B 6/3851* (2013.01); *G02B 6/3869* (2013.01); *G02B 6/3873* (2013.01); *G02B 6/3885* (2013.01); *G02B 6/3887* (2013.01); *G02B 6/381* (2013.01); *G02B 6/389* (2013.01); *G02B 6/3821* (2013.01); *G02B 6/3837* (2013.01); *G02B 6/3841* (2013.01); *G02B 6/3843* (2013.01);
(Continued)

(58) Field of Classification Search
CPC ..... G02B 6/3879; G02B 6/381; G02B 6/3826
See application file for complete search history.

(56) References Cited

U.S. PATENT DOCUMENTS 3,074,107 A 1/1963 Mase et al.
3,532,783 A 10/1970 Pusey et al.
(Continued)

FOREIGN PATENT DOCUMENTS

CN 1213783 A 4/1999
CN 1231430 A 10/1999
(Continued)

OTHER PUBLICATIONS

Nawata, "Multimode and Single-Mode Fiber Connectors Technology"; IEEE Journal of Quantum Electronics, vol. QE-16, No. 6 Published Jun. 1980.
(Continued)

*Primary Examiner* — Sung H Pak
(74) *Attorney, Agent, or Firm* — Michael E. Carroll, Jr.

(57) ABSTRACT

Fiber optic connectors, cable assemblies and methods for making the same are disclosed. In one embodiment, the optical connector comprises a housing and a multifiber ferrule. The housing comprises a longitudinal passageway between a rear end and a front end, and, a part of the rear portion of the housing comprises a round cross-section and a part of the front portion of the housing comprises a non-round cross-section.

31 Claims, 70 Drawing Sheets

Related U.S. Application Data

(60) Provisional application No. 62/526,195, filed on Jun. 28, 2017, provisional application No. 62/526,018, filed on Jun. 28, 2017, provisional application No. 62/526,011, filed on Jun. 28, 2017.

(52) U.S. Cl.
CPC .......... *G02B 6/3849* (2013.01); *G02B 6/3871* (2013.01); *G02B 6/3889* (2013.01); *G02B 6/3893* (2013.01); *G02B 6/3895* (2013.01); *G02B 6/3897* (2013.01); *G02B 6/4262* (2013.01); *G02B 6/4401* (2013.01); *G02B 6/4446* (2013.01); *G02B 6/4471* (2013.01); *G02B 6/4472* (2013.01); *G02B 6/4477* (2013.01); *G02B 6/4479* (2013.01)

(56) References Cited

U.S. PATENT DOCUMENTS

| | | |
|---|---|---|
| 3,792,284 A | 2/1974 | Kaelin |
| 3,912,362 A | 10/1975 | Hudson |
| 4,003,297 A | 1/1977 | Mott |
| 4,077,567 A | 3/1978 | Ginn et al. |
| 4,148,557 A | 4/1979 | Garvey |
| 4,167,303 A | 9/1979 | Bowen et al. |
| 4,168,109 A | 9/1979 | Dumire |
| 4,188,088 A | 2/1980 | Andersen et al. |
| 4,336,977 A | 6/1982 | Monaghan et al. |
| 4,354,731 A | 10/1982 | Mouissie |
| 4,373,777 A | 2/1983 | Borsuk et al. |
| 4,413,880 A | 11/1983 | Forrest et al. |
| 4,423,922 A | 1/1984 | Porter |
| 4,440,471 A | 4/1984 | Knowles |
| 4,461,537 A | 7/1984 | Raymer et al. |
| 4,515,434 A | 5/1985 | Margolin et al. |
| 4,560,232 A | 12/1985 | O'Hara |
| 4,615,581 A | 10/1986 | Morimoto |
| 4,634,214 A | 1/1987 | Cannon et al. |
| 4,634,858 A | 1/1987 | Gerdt et al. |
| 4,684,205 A | 8/1987 | Margolin et al. |
| 4,688,200 A | 8/1987 | Poorman et al. |
| 4,690,563 A | 9/1987 | Barton et al. |
| 4,699,458 A | 10/1987 | Ohtsuki et al. |
| 4,705,352 A | 11/1987 | Margolin et al. |
| 4,711,752 A | 12/1987 | Deacon et al. |
| 4,715,675 A | 12/1987 | Kevern et al. |
| 4,723,827 A | 2/1988 | Shaw et al. |
| 4,741,590 A | 5/1988 | Caron |
| 4,763,983 A | 8/1988 | Keith |
| 4,783,137 A | 11/1988 | Kosman et al. |
| 4,842,363 A | 6/1989 | Margolin et al. |
| 4,844,570 A | 7/1989 | Tanabe |
| 4,854,664 A | 8/1989 | McCartney |
| 4,856,867 A | 8/1989 | Gaylin |
| 4,902,238 A | 2/1990 | Iacobucci |
| 4,913,514 A | 4/1990 | Then |
| 4,921,413 A | 5/1990 | Blew |
| 4,944,568 A | 7/1990 | Danbach et al. |
| 4,960,318 A | 10/1990 | Nilsson et al. |
| 4,961,623 A | 10/1990 | Midkiff et al. |
| 4,964,688 A | 10/1990 | Caldwell et al. |
| 4,979,792 A * | 12/1990 | Weber .................. G02B 6/3831 385/139 |
| 4,994,134 A | 2/1991 | Knecht et al. |
| 4,995,836 A | 2/1991 | Toramoto |
| 5,007,860 A | 4/1991 | Robinson et al. |
| 5,016,968 A | 5/1991 | Hammond et al. |
| 5,028,114 A | 7/1991 | Krausse et al. |
| 5,058,984 A | 10/1991 | Bulman et al. |
| 5,067,783 A | 11/1991 | Lampert |
| 5,073,042 A | 12/1991 | Mulholland et al. |
| 5,076,656 A | 12/1991 | Briggs et al. |
| 5,085,492 A | 2/1992 | Kelsoe et al. |
| 5,088,804 A | 2/1992 | Grinderslev |
| 5,095,176 A | 3/1992 | Harbrecht et al. |
| 5,129,023 A | 7/1992 | Anderson et al. |
| 5,131,735 A | 7/1992 | Berkey et al. |
| 5,134,677 A | 7/1992 | Leung et al. |
| 5,136,683 A | 8/1992 | Aoki et al. |
| 5,142,602 A | 8/1992 | Cabato et al. |
| 5,146,519 A | 9/1992 | Miller et al. |
| 5,155,900 A | 10/1992 | Grois et al. |
| 5,180,890 A | 1/1993 | Pendergrass et al. |
| 5,189,718 A | 2/1993 | Barrett et al. |
| 5,210,810 A | 5/1993 | Darden et al. |
| 5,212,752 A | 5/1993 | Stephenson et al. |
| 5,214,732 A | 5/1993 | Beard et al. |
| 5,224,187 A | 6/1993 | Davisdon |
| 5,231,685 A | 7/1993 | Hanzawa et al. |
| 5,245,683 A | 9/1993 | Belenkiy et al. |
| 5,263,105 A | 11/1993 | Johnson et al. |
| 5,276,750 A | 1/1994 | Manning |
| 5,313,540 A | 5/1994 | Ueda et al. |
| 5,317,663 A | 5/1994 | Beard et al. |
| 5,321,917 A | 6/1994 | Franklin et al. |
| 5,367,594 A | 11/1994 | Essert et al. |
| 5,371,823 A | 12/1994 | Barrett et al. |
| 5,375,183 A | 12/1994 | Edwards et al. |
| 5,381,494 A | 1/1995 | O'Donnell et al. |
| 5,390,269 A | 2/1995 | Palecek et al. |
| 5,394,494 A | 2/1995 | Jennings et al. |
| 5,394,497 A | 2/1995 | Erdman et al. |
| 5,408,570 A | 4/1995 | Cook et al. |
| 5,416,874 A | 5/1995 | Giebel et al. |
| 5,452,388 A | 9/1995 | Rittle et al. |
| 5,519,799 A | 5/1996 | Murakami et al. |
| 5,553,186 A | 9/1996 | Allen |
| 5,557,696 A | 9/1996 | Stein |
| 5,569,050 A | 10/1996 | Lloyd |
| 5,588,077 A | 12/1996 | Woodside |
| 5,600,747 A | 2/1997 | Yamakawa et al. |
| 5,603,631 A | 2/1997 | Kawahara et al. |
| 5,608,828 A | 3/1997 | Coutts et al. |
| 5,631,993 A | 5/1997 | Cloud et al. |
| 5,647,045 A | 7/1997 | Robinson et al. |
| 5,682,451 A | 10/1997 | Lee et al. |
| 5,694,507 A | 12/1997 | Walles |
| 5,748,821 A | 5/1998 | Schempp et al. |
| 5,761,359 A | 6/1998 | Chudoba et al. |
| 5,781,686 A | 7/1998 | Robinson et al. |
| 5,782,892 A | 7/1998 | Castle et al. |
| 5,789,701 A | 8/1998 | Wettengel et al. |
| 5,791,918 A | 8/1998 | Pierce |
| 5,796,895 A | 8/1998 | Jennings et al. |
| RE35,935 E | 10/1998 | Cabato et al. |
| 5,818,993 A | 10/1998 | Chudoba et al. |
| 5,857,050 A | 1/1999 | Jiang et al. |
| 5,862,290 A | 1/1999 | Burek et al. |
| 5,867,621 A | 2/1999 | Luther et al. |
| 5,887,099 A | 3/1999 | Csipkes et al. |
| 5,913,001 A | 6/1999 | Nakajima et al. |
| 5,920,669 A | 7/1999 | Knecht et al. |
| 5,923,804 A | 7/1999 | Rosson |
| 5,925,191 A | 7/1999 | Stein et al. |
| 5,926,596 A | 7/1999 | Edwards et al. |
| 5,960,141 A | 9/1999 | Sasaki et al. |
| 5,961,344 A | 10/1999 | Rosales et al. |
| 5,971,626 A | 10/1999 | Knodell et al. |
| 5,993,070 A | 11/1999 | Tamekuni et al. |
| 6,035,084 A | 3/2000 | Haake et al. |
| 6,045,270 A | 4/2000 | Weiss et al. |
| 6,079,881 A | 6/2000 | Roth |
| 6,094,517 A | 7/2000 | Yuuki |
| 6,108,482 A | 8/2000 | Roth |
| 6,112,006 A | 8/2000 | Foss |
| 6,149,313 A | 11/2000 | Giebel et al. |
| 6,151,432 A | 11/2000 | Nakajima et al. |
| RE37,028 E | 1/2001 | Cooke et al. |
| 6,173,097 B1 | 1/2001 | Throckmorton et al. |
| 6,179,482 B1 | 1/2001 | Takizawa et al. |
| 6,188,822 B1 | 2/2001 | McAlpine et al. |
| 6,200,040 B1 | 3/2001 | Edwards et al. |
| 6,206,579 B1 | 3/2001 | Selfridge et al. |

(56) References Cited

U.S. PATENT DOCUMENTS

| | | |
|---|---|---|
| 6,206,581 B1 | 3/2001 | Driscoll et al. |
| 6,224,268 B1 | 5/2001 | Manning et al. |
| 6,229,944 B1 | 5/2001 | Yokokawa et al. |
| 6,234,683 B1 | 5/2001 | Waldron et al. |
| 6,234,685 B1 | 5/2001 | Carlisle et al. |
| 6,249,628 B1 | 6/2001 | Rutterman et al. |
| 6,256,438 B1 | 7/2001 | Gimblet |
| 6,261,006 B1 | 7/2001 | Selfridge |
| 6,264,374 B1 | 7/2001 | Selfridge et al. |
| 6,287,016 B1 | 9/2001 | Weigel |
| 6,305,849 B1 | 10/2001 | Roehrs et al. |
| 6,356,390 B1 | 3/2002 | Hall |
| 6,356,690 B1 | 3/2002 | McAlpine et al. |
| 6,357,929 B1 | 3/2002 | Roehrs et al. |
| 6,371,660 B1 | 4/2002 | Roehrs et al. |
| 6,375,363 B1 | 4/2002 | Harrison et al. |
| 6,379,054 B2 | 4/2002 | Throckmorton et al. |
| 6,386,891 B1 | 5/2002 | Howard et al. |
| 6,409,391 B1 | 6/2002 | Chang |
| 6,422,764 B1 | 7/2002 | Marrs |
| 6,427,035 B1 | 7/2002 | Mahony |
| 6,439,780 B1 | 8/2002 | Mudd et al. |
| 6,466,725 B2 | 10/2002 | Battey et al. |
| 6,496,641 B1 | 12/2002 | Mahony |
| 6,501,888 B2 | 12/2002 | Gimblet et al. |
| 6,522,804 B1 | 2/2003 | Mahony |
| 6,529,663 B1 | 3/2003 | Parris et al. |
| 6,536,956 B2 | 3/2003 | Luther et al. |
| 6,539,147 B1 | 3/2003 | Mahony |
| 6,540,410 B2 | 4/2003 | Childers et al. |
| 6,542,674 B1 | 4/2003 | Gimblet |
| 6,546,175 B1 | 4/2003 | Wagman et al. |
| 6,554,489 B2 | 4/2003 | Kent et al. |
| 6,579,014 B2 | 6/2003 | Melton et al. |
| 6,599,026 B1 | 7/2003 | Fahrnbauer et al. |
| 6,599,027 B2 | 7/2003 | Miyake et al. |
| 6,614,980 B1 | 9/2003 | Mahony |
| 6,618,526 B2 | 9/2003 | Jackman et al. |
| 6,619,697 B2 | 9/2003 | Griffioen et al. |
| 6,621,964 B2 | 9/2003 | Quinn et al. |
| 6,625,375 B1 | 9/2003 | Mahony |
| 6,629,782 B2 | 10/2003 | Mcphee et al. |
| 6,644,862 B1 | 11/2003 | Berto et al. |
| 6,648,520 B2 | 11/2003 | McDonald et al. |
| 6,668,127 B1 | 12/2003 | Mahony |
| 6,672,774 B2 | 1/2004 | Theuerkorn et al. |
| 6,678,442 B2 | 1/2004 | Gall et al. |
| 6,678,448 B2 | 1/2004 | Moisel et al. |
| 6,685,361 B1 | 2/2004 | Rubino et al. |
| 6,702,475 B1 | 3/2004 | Giobbio et al. |
| 6,714,708 B2 | 3/2004 | McAlpine et al. |
| 6,714,710 B2 | 3/2004 | Gimblet |
| 6,729,773 B1 | 5/2004 | Finona et al. |
| 6,738,555 B1 | 5/2004 | Cooke et al. |
| 6,748,147 B2 | 6/2004 | Quinn et al. |
| 6,771,861 B2 | 8/2004 | Wagner et al. |
| 6,785,450 B2 | 8/2004 | Wagman et al. |
| 6,789,950 B1 | 9/2004 | Loder et al. |
| 6,809,265 B1 | 10/2004 | Gladd et al. |
| 6,848,838 B2 | 2/2005 | Doss et al. |
| 6,856,748 B1 | 2/2005 | Elkins et al. |
| 6,899,467 B2 * | 5/2005 | McDonald ............ G02B 6/3869 385/78 |
| 6,909,821 B2 | 6/2005 | Ravasio et al. |
| 6,916,120 B2 | 7/2005 | Zimmel et al. |
| 6,944,387 B2 | 9/2005 | Howell et al. |
| 6,962,445 B2 | 11/2005 | Zimmel et al. |
| 7,011,454 B2 | 3/2006 | Caveney et al. |
| 7,025,507 B2 | 4/2006 | De Marchi |
| 7,033,191 B1 | 4/2006 | Cao |
| 7,079,734 B2 | 7/2006 | Seddon et al. |
| 7,090,406 B2 | 8/2006 | Melton et al. |
| 7,090,407 B2 | 8/2006 | Melton et al. |
| 7,090,409 B2 | 8/2006 | Nakajima et al. |
| 7,104,702 B2 | 9/2006 | Barnes et al. |
| 7,111,990 B2 | 9/2006 | Melton et al. |
| 7,113,679 B2 | 9/2006 | Melton et al. |
| 7,120,347 B2 | 10/2006 | Blackwell, Jr. et al. |
| 7,137,742 B2 | 11/2006 | Theuerkorn et al. |
| 7,146,090 B2 | 12/2006 | Vo et al. |
| 7,150,567 B1 | 12/2006 | Luther et al. |
| 7,165,893 B2 | 1/2007 | Schmitz |
| 7,178,990 B2 | 2/2007 | Caveney et al. |
| 7,184,634 B2 | 2/2007 | Hurley et al. |
| 7,201,518 B2 | 4/2007 | Holmquist |
| 7,204,644 B2 | 4/2007 | Barnes et al. |
| 7,213,975 B2 | 5/2007 | Khemakhem et al. |
| 7,228,047 B1 | 6/2007 | Szilagyi et al. |
| 7,241,056 B1 | 7/2007 | Kuffel et al. |
| 7,266,265 B2 | 9/2007 | Gall et al. |
| 7,270,487 B2 | 9/2007 | Billman et al. |
| 7,277,614 B2 | 10/2007 | Cody et al. |
| 7,302,152 B2 | 11/2007 | Luther et al. |
| 7,330,629 B2 | 2/2008 | Cooke et al. |
| 7,333,708 B2 | 2/2008 | Blackwell, Jr. et al. |
| 7,341,382 B2 | 3/2008 | Dye |
| 7,346,256 B2 | 3/2008 | Marrs et al. |
| 7,366,416 B2 | 4/2008 | Ramachandran et al. |
| 7,444,056 B2 | 10/2008 | Allen et al. |
| 7,463,803 B2 | 12/2008 | Cody et al. |
| 7,467,896 B2 | 12/2008 | Melton et al. |
| 7,489,849 B2 | 2/2009 | Reagan et al. |
| 7,497,896 B2 | 3/2009 | Bromet et al. |
| 7,542,645 B1 | 6/2009 | Hua et al. |
| 7,565,055 B2 | 7/2009 | Lu et al. |
| 7,614,797 B2 | 11/2009 | Lu et al. |
| 7,621,675 B1 | 11/2009 | Bradley |
| 7,627,222 B2 | 12/2009 | Reagan et al. |
| 7,628,545 B2 | 12/2009 | Cody et al. |
| 7,628,548 B2 | 12/2009 | Benjamin et al. |
| 7,653,282 B2 | 1/2010 | Blackwell, Jr. et al. |
| 7,654,747 B2 | 2/2010 | Theuerkorn et al. |
| 7,680,388 B2 | 3/2010 | Reagan et al. |
| 7,708,476 B2 | 5/2010 | Liu |
| 7,709,733 B1 | 5/2010 | Plankell |
| 7,712,971 B2 | 5/2010 | Lee et al. |
| 7,713,679 B2 | 5/2010 | Ishiduka et al. |
| 7,740,409 B2 | 6/2010 | Bolton et al. |
| 7,742,670 B2 | 6/2010 | Benjamin et al. |
| 7,753,596 B2 | 7/2010 | Cox |
| 7,762,726 B2 | 7/2010 | Lu et al. |
| 7,785,015 B2 | 8/2010 | Melton et al. |
| 7,802,926 B2 | 9/2010 | Leeman et al. |
| 7,806,599 B2 | 10/2010 | Margolin et al. |
| 7,844,148 B2 | 11/2010 | Jenkins et al. |
| 7,844,160 B2 | 11/2010 | Reagan et al. |
| RE42,094 E | 2/2011 | Barnes et al. |
| 7,903,923 B2 | 3/2011 | Gronvall et al. |
| 7,903,925 B2 | 3/2011 | Cooke et al. |
| 7,918,609 B2 | 4/2011 | Melton et al. |
| 7,933,517 B2 | 4/2011 | Ye et al. |
| 7,942,590 B2 | 5/2011 | Lu et al. |
| 8,025,445 B2 | 9/2011 | Rambow et al. |
| 8,213,761 B2 | 7/2012 | Gronvall et al. |
| 8,218,935 B2 | 7/2012 | Reagan et al. |
| 8,267,596 B2 | 9/2012 | Theuerkorn |
| 8,272,792 B2 | 9/2012 | Coleman et al. |
| RE43,762 E | 10/2012 | Smith et al. |
| 8,301,003 B2 | 10/2012 | De et al. |
| 8,301,004 B2 | 10/2012 | Cooke et al. |
| 8,376,629 B2 | 2/2013 | Cline et al. |
| 8,408,811 B2 | 4/2013 | De et al. |
| 8,439,577 B2 | 5/2013 | Jenkins |
| 8,465,235 B2 | 6/2013 | Jenkins et al. |
| 8,466,262 B2 | 6/2013 | Siadak et al. |
| 8,472,773 B2 | 6/2013 | De Jong |
| 8,480,312 B2 | 7/2013 | Smith et al. |
| 8,520,996 B2 | 8/2013 | Cowen et al. |
| 8,534,928 B2 | 9/2013 | Cooke et al. |
| 8,556,522 B2 | 10/2013 | Cunningham |
| 8,622,634 B2 | 1/2014 | Arnold et al. |
| 8,635,733 B2 | 1/2014 | Bardzilowski |
| 8,662,760 B2 | 3/2014 | Cline et al. |
| 8,678,668 B2 | 3/2014 | Cooke et al. |

(56) References Cited

U.S. PATENT DOCUMENTS

| | | |
|---|---|---|
| 8,727,638 B2 | 5/2014 | Lee et al. |
| 8,737,837 B2 | 5/2014 | Conner et al. |
| 8,755,654 B1 | 6/2014 | Danley et al. |
| 8,755,663 B2 | 6/2014 | Makrides-Saravanos et al. |
| 8,758,046 B2 | 6/2014 | Pezzetti et al. |
| 8,764,316 B1 | 7/2014 | Barnette et al. |
| 8,770,861 B2 | 7/2014 | Smith et al. |
| 8,821,036 B2 | 9/2014 | Shigehara |
| 8,870,469 B2 | 10/2014 | Kachmar |
| 8,882,364 B2 | 11/2014 | Busse et al. |
| 8,917,966 B2 | 12/2014 | Thompson et al. |
| 8,998,502 B2 | 4/2015 | Benjamin et al. |
| 9,158,074 B2 | 10/2015 | Anderson et al. |
| 9,158,075 B2 | 10/2015 | Benjamin et al. |
| 9,182,567 B2 | 11/2015 | Mullaney |
| 9,207,410 B2 | 12/2015 | Lee et al. |
| 9,285,550 B2 | 3/2016 | Nhep et al. |
| 9,297,974 B2 | 3/2016 | Valderrabano et al. |
| 9,310,570 B2 | 4/2016 | Busse et al. |
| 9,322,998 B2 | 4/2016 | Miller |
| 9,383,539 B2 | 7/2016 | Power et al. |
| 9,405,068 B2 | 8/2016 | Graham et al. |
| 9,442,257 B2 | 9/2016 | Lu |
| 9,450,393 B2 | 9/2016 | Thompson et al. |
| 9,482,819 B2 | 11/2016 | Li et al. |
| 9,513,444 B2 | 12/2016 | Barnette, Jr. et al. |
| 9,541,711 B2 | 1/2017 | Raven et al. |
| 9,551,842 B2 | 1/2017 | Theuerkorn |
| 9,684,138 B2 | 1/2017 | Lu |
| 9,618,704 B2 | 4/2017 | Dean et al. |
| 9,618,718 B2 | 4/2017 | Islam |
| 9,638,871 B2 * | 5/2017 | Bund .................. G02B 6/4452 |
| 9,645,331 B1 | 5/2017 | Kim |
| 9,651,741 B2 | 5/2017 | Isenhour et al. |
| 9,664,862 B2 | 5/2017 | Lu et al. |
| 9,684,136 B2 | 6/2017 | Cline et al. |
| 9,696,500 B2 | 7/2017 | Barnette et al. |
| 9,739,951 B2 | 8/2017 | Busse et al. |
| 9,762,322 B1 | 9/2017 | Amundson |
| 9,766,416 B1 | 9/2017 | Kim |
| 9,772,457 B2 | 9/2017 | Hill et al. |
| 9,810,855 B2 | 11/2017 | Cox et al. |
| 9,810,856 B2 | 11/2017 | Graham et al. |
| 9,829,668 B2 | 11/2017 | Claessens et al. |
| 9,857,540 B2 | 1/2018 | Ahmed et al. |
| 9,864,151 B2 | 1/2018 | Lu |
| D810,029 S | 2/2018 | Robert et al. |
| 9,891,391 B2 | 2/2018 | Watanabe |
| 9,933,582 B1 * | 4/2018 | Lin ...................... G02B 6/3883 |
| 9,964,715 B2 | 5/2018 | Lu |
| 9,983,374 B2 | 5/2018 | Li et al. |
| 10,038,946 B2 | 7/2018 | Smolorz |
| 10,061,090 B2 | 8/2018 | Coenegracht |
| 10,073,224 B2 | 9/2018 | Tong et al. |
| 10,114,176 B2 | 10/2018 | Gimblet et al. |
| 10,180,541 B2 | 1/2019 | Coenegracht et al. |
| 10,209,454 B2 | 2/2019 | Isenhour et al. |
| 10,235,184 B2 | 3/2019 | Walker |
| 10,261,268 B2 | 4/2019 | Theuerkorn |
| 10,268,011 B2 | 4/2019 | Courchaine et al. |
| 10,353,154 B2 | 7/2019 | Ott et al. |
| 10,353,156 B2 | 7/2019 | Hill et al. |
| 10,401,575 B2 | 9/2019 | Daily et al. |
| 10,401,578 B2 | 9/2019 | Coenegracht |
| 10,409,007 B2 | 9/2019 | Kadar-Kallen et al. |
| 10,422,962 B2 | 9/2019 | Coenegracht |
| 10,444,442 B2 * | 10/2019 | Takano ................ G02B 6/3887 |
| 10,451,811 B2 | 10/2019 | Coenegracht et al. |
| 10,451,817 B2 | 10/2019 | Lu |
| 10,451,830 B2 | 10/2019 | Szumacher et al. |
| 10,488,597 B2 | 11/2019 | Parikh et al. |
| 10,495,822 B2 | 12/2019 | Nhep |
| 10,520,683 B2 | 12/2019 | Nhep |
| 10,545,298 B2 | 1/2020 | Bauco et al. |
| 10,613,278 B2 | 4/2020 | Kempeneers et al. |
| 10,656,347 B2 | 5/2020 | Kato |
| 10,782,487 B2 | 9/2020 | Lu |
| 10,802,236 B2 | 10/2020 | Kowalczyk et al. |
| 10,830,967 B2 | 11/2020 | Pimentel et al. |
| 10,859,771 B2 | 12/2020 | Nhep |
| 10,962,731 B2 | 3/2021 | Coenegracht |
| 10,976,500 B2 | 4/2021 | Ott et al. |
| 11,061,191 B2 | 7/2021 | Van Baelen et al. |
| 2001/0019654 A1 | 9/2001 | Waldron et al. |
| 2001/0036342 A1 | 11/2001 | Knecht et al. |
| 2001/0036345 A1 | 11/2001 | Gimblet et al. |
| 2002/0012502 A1 | 1/2002 | Farrar et al. |
| 2002/0062978 A1 | 5/2002 | Sakabe et al. |
| 2002/0064364 A1 | 5/2002 | Battey et al. |
| 2002/0081077 A1 | 6/2002 | Nault |
| 2002/0122653 A1 | 9/2002 | Donaldson et al. |
| 2003/0063866 A1 | 4/2003 | Melton et al. |
| 2003/0063867 A1 | 4/2003 | McDonald et al. |
| 2003/0063868 A1 | 4/2003 | Fentress |
| 2003/0063897 A1 | 4/2003 | Heo |
| 2003/0094298 A1 | 5/2003 | Morrow et al. |
| 2003/0099448 A1 | 5/2003 | Gimblet |
| 2003/0103733 A1 | 6/2003 | Fleenor et al. |
| 2003/0123813 A1 | 7/2003 | Ravasio et al. |
| 2004/0047566 A1 | 3/2004 | McDonald et al. |
| 2004/0052474 A1 | 3/2004 | Lampert et al. |
| 2004/0072454 A1 | 4/2004 | Nakajima et al. |
| 2004/0076377 A1 | 4/2004 | Mizukami et al. |
| 2004/0096162 A1 | 5/2004 | Kocher et al. |
| 2004/0120662 A1 | 6/2004 | Lail et al. |
| 2004/0120663 A1 | 6/2004 | Lail et al. |
| 2004/0157449 A1 | 8/2004 | Hidaka et al. |
| 2004/0157499 A1 | 8/2004 | Nania et al. |
| 2004/0223699 A1 | 11/2004 | Melton et al. |
| 2004/0223720 A1 | 11/2004 | Melton et al. |
| 2004/0228589 A1 | 11/2004 | Melton et al. |
| 2005/0019031 A1 | 1/2005 | Ye et al. |
| 2005/0036786 A1 | 2/2005 | Ramachandran et al. |
| 2005/0054237 A1 | 3/2005 | Gladd et al. |
| 2005/0084215 A1 | 4/2005 | Grzegorzewska et al. |
| 2005/0123422 A1 | 6/2005 | Lilie |
| 2005/0129379 A1 | 6/2005 | Reagan et al. |
| 2005/0175307 A1 | 8/2005 | Battey et al. |
| 2005/0232552 A1 | 10/2005 | Takahashi et al. |
| 2005/0281510 A1 | 12/2005 | Vo et al. |
| 2005/0281514 A1 | 12/2005 | Oki et al. |
| 2006/0045430 A1 | 3/2006 | Theuerkorn et al. |
| 2006/0088247 A1 | 4/2006 | Tran et al. |
| 2006/0093278 A1 | 5/2006 | Elkins et al. |
| 2006/0120672 A1 | 6/2006 | Cody et al. |
| 2006/0133758 A1 | 6/2006 | Mullaney et al. |
| 2006/0133759 A1 | 6/2006 | Mullaney et al. |
| 2006/0147172 A1 | 7/2006 | Luther et al. |
| 2006/0153503 A1 | 7/2006 | Suzuki et al. |
| 2006/0153517 A1 | 7/2006 | Reagan et al. |
| 2006/0171638 A1 | 8/2006 | Dye |
| 2006/0269204 A1 | 11/2006 | Barth et al. |
| 2006/0269208 A1 | 11/2006 | Allen et al. |
| 2006/0280420 A1 | 12/2006 | Blackwell et al. |
| 2006/0283619 A1 | 12/2006 | Kowalczyk et al. |
| 2006/0291787 A1 | 12/2006 | Seddon |
| 2007/0031100 A1 | 2/2007 | Garcia et al. |
| 2007/0031103 A1 | 2/2007 | Tinucci et al. |
| 2007/0036483 A1 | 2/2007 | Shin et al. |
| 2007/0077010 A1 | 4/2007 | Melton et al. |
| 2007/0098343 A1 | 5/2007 | Miller et al. |
| 2007/0189674 A1 | 8/2007 | Scheibenreif et al. |
| 2008/0080817 A1 | 4/2008 | Melton et al. |
| 2008/0138016 A1 | 6/2008 | Katagiyama et al. |
| 2008/0175542 A1 | 7/2008 | Lu et al. |
| 2008/0175544 A1 | 7/2008 | Fujiwara et al. |
| 2008/0175546 A1 | 7/2008 | Lu et al. |
| 2008/0175548 A1 | 7/2008 | Knecht et al. |
| 2008/0232743 A1 | 9/2008 | Gronvall et al. |
| 2008/0240658 A1 | 10/2008 | Leeman et al. |
| 2008/0264664 A1 | 10/2008 | Dinh et al. |
| 2008/0273837 A1 | 11/2008 | Margolin et al. |
| 2008/0310796 A1 | 12/2008 | Lu |
| 2008/0317415 A1 | 12/2008 | Hendrickson et al. |

(56) References Cited

U.S. PATENT DOCUMENTS

| | | |
|---|---|---|
| 2009/0041412 A1 | 2/2009 | Danley et al. |
| 2009/0060421 A1 | 3/2009 | Parikh et al. |
| 2009/0136184 A1 | 5/2009 | Abernathy et al. |
| 2009/0148101 A1 | 6/2009 | Lu et al. |
| 2009/0148104 A1 | 6/2009 | Lu et al. |
| 2009/0185835 A1 | 7/2009 | Park et al. |
| 2009/0245743 A1 | 10/2009 | Cote et al. |
| 2009/0263097 A1 | 10/2009 | Solheid et al. |
| 2010/0008909 A1 | 1/2010 | Siadak et al. |
| 2010/0014813 A1 | 1/2010 | Ito et al. |
| 2010/0014867 A1 | 1/2010 | Ramanitra et al. |
| 2010/0015834 A1 | 1/2010 | Siebens |
| 2010/0054680 A1 | 3/2010 | Lochkovic et al. |
| 2010/0092136 A1 | 4/2010 | Nhep |
| 2010/0172616 A1 | 7/2010 | Lu et al. |
| 2010/0197222 A1 | 8/2010 | Scheucher |
| 2010/0247053 A1 | 9/2010 | Cowen et al. |
| 2010/0272399 A1 | 10/2010 | Griffiths et al. |
| 2010/0303426 A1 | 12/2010 | Davis |
| 2010/0303427 A1 | 12/2010 | Rambow et al. |
| 2010/0310213 A1 | 12/2010 | Lewallen et al. |
| 2011/0019964 A1 | 1/2011 | Nhep et al. |
| 2011/0047731 A1 | 3/2011 | Sugita et al. |
| 2011/0108719 A1 | 5/2011 | Ford et al. |
| 2011/0129186 A1 | 6/2011 | Lewallen et al. |
| 2011/0164854 A1 | 7/2011 | Desard et al. |
| 2011/0222826 A1 | 9/2011 | Blackburn et al. |
| 2011/0229098 A1 | 9/2011 | Abernathy et al. |
| 2011/0262099 A1 | 10/2011 | Castonguay et al. |
| 2011/0299814 A1 | 12/2011 | Nakagawa |
| 2012/0002925 A1 | 1/2012 | Nakagawa |
| 2012/0008909 A1 | 1/2012 | Mertesdorf et al. |
| 2012/0106912 A1 | 5/2012 | McGranahan et al. |
| 2012/0183268 A1 | 7/2012 | De et al. |
| 2012/0251063 A1 | 10/2012 | Reagan et al. |
| 2012/0252244 A1 | 10/2012 | Elkins, II et al. |
| 2013/0004122 A1 | 1/2013 | Kingsbury |
| 2013/0034333 A1 | 2/2013 | Holmberg et al. |
| 2013/0064506 A1 | 3/2013 | Eberle et al. |
| 2013/0109213 A1 | 5/2013 | Chang |
| 2013/0170834 A1 | 7/2013 | Cho et al. |
| 2013/0236139 A1 | 9/2013 | Chen et al. |
| 2014/0016902 A1 | 1/2014 | Pepe et al. |
| 2014/0029897 A1 | 1/2014 | Shimazu et al. |
| 2014/0050446 A1 | 2/2014 | Chang |
| 2014/0079356 A1 | 3/2014 | Pepin et al. |
| 2014/0133806 A1 | 5/2014 | Hill et al. |
| 2014/0133807 A1 | 5/2014 | Katoh |
| 2014/0153876 A1 | 6/2014 | Dendas et al. |
| 2014/0161397 A1 | 6/2014 | Gallegos et al. |
| 2014/0205257 A1 | 7/2014 | Durrant et al. |
| 2014/0219609 A1* | 8/2014 | Nielson .............. G02B 6/46 385/54 |
| 2014/0219622 A1 | 8/2014 | Coan et al. |
| 2014/0233896 A1 | 8/2014 | Ishigami et al. |
| 2014/0241671 A1 | 8/2014 | Koreeda et al. |
| 2014/0294395 A1 | 10/2014 | Waldron et al. |
| 2014/0328559 A1 | 11/2014 | Kobayashi et al. |
| 2014/0355936 A1 | 12/2014 | Bund et al. |
| 2015/0003788 A1 | 1/2015 | Chen et al. |
| 2015/0036982 A1 | 2/2015 | Nhep et al. |
| 2015/0144883 A1 | 5/2015 | Sendelweck |
| 2015/0185423 A1 | 7/2015 | Matsui et al. |
| 2015/0253528 A1 | 9/2015 | Corbille et al. |
| 2015/0268423 A1* | 9/2015 | Burkholder .......... G02B 6/387 385/76 |
| 2015/0268434 A1 | 9/2015 | Barnette, Jr. et al. |
| 2015/0293310 A1* | 10/2015 | Kanno .............. G02B 6/3847 385/78 |
| 2015/0316727 A1 | 11/2015 | Kondo et al. |
| 2015/0346436 A1 | 12/2015 | Pepe et al. |
| 2016/0015885 A1 | 1/2016 | Pananen et al. |
| 2016/0131851 A1 | 5/2016 | Theuerkorn |
| 2016/0131857 A1 | 5/2016 | Pimentel et al. |
| 2016/0139346 A1 | 5/2016 | Bund et al. |
| 2016/0154186 A1 | 6/2016 | Gimblet et al. |
| 2016/0161688 A1 | 6/2016 | Nishimura |
| 2016/0161689 A1 | 6/2016 | Nishimura |
| 2016/0209599 A1 | 7/2016 | Van Baelen et al. |
| 2016/0209605 A1 | 7/2016 | Lu et al. |
| 2016/0238810 A1 | 8/2016 | Hubbard et al. |
| 2016/0246019 A1 | 8/2016 | Ishii et al. |
| 2016/0249019 A1 | 8/2016 | Westwick et al. |
| 2016/0259133 A1 | 9/2016 | Kobayashi et al. |
| 2016/0306122 A1 | 10/2016 | Tong et al. |
| 2017/0038538 A1 | 2/2017 | Isenhour et al. |
| 2017/0131509 A1 | 5/2017 | Xiao et al. |
| 2017/0139158 A1 | 5/2017 | Coenegracht |
| 2017/0160492 A1 | 6/2017 | Lin et al. |
| 2017/0168248 A1 | 6/2017 | Hayauchi et al. |
| 2017/0176252 A1 | 6/2017 | Marple et al. |
| 2017/0176690 A1 | 6/2017 | Bretz et al. |
| 2017/0219782 A1 | 8/2017 | Nishimura |
| 2017/0238822 A1 | 8/2017 | Young et al. |
| 2017/0254961 A1 | 9/2017 | Kamada et al. |
| 2017/0254962 A1 | 9/2017 | Mueller-Schlomka et al. |
| 2017/0261699 A1 | 9/2017 | Compton et al. |
| 2017/0285279 A1 | 10/2017 | Daems et al. |
| 2017/0343741 A1 | 11/2017 | Coenegracht et al. |
| 2017/0343745 A1 | 11/2017 | Rosson |
| 2017/0351037 A1 | 12/2017 | Watanabe et al. |
| 2018/0081127 A1 | 3/2018 | Coenegracht |
| 2018/0267243 A1 | 9/2018 | Nhep et al. |
| 2018/0267265 A1 | 9/2018 | Zhang et al. |
| 2019/0004251 A1 | 1/2019 | Dannoux et al. |
| 2019/0004252 A1 | 1/2019 | Rosson |
| 2019/0004256 A1 | 1/2019 | Rosson |
| 2019/0004258 A1 | 1/2019 | Dannoux et al. |
| 2019/0107677 A1 | 4/2019 | Coenegracht et al. |
| 2019/0147202 A1 | 5/2019 | Harney |
| 2019/0162910 A1 | 5/2019 | Gurreri |
| 2019/0187396 A1 | 6/2019 | Finnegan et al. |
| 2020/0012051 A1 | 1/2020 | Coenegracht et al. |
| 2020/0049922 A1 | 2/2020 | Rosson |
| 2020/0057222 A1 | 2/2020 | Dannoux et al. |
| 2020/0057723 A1 | 2/2020 | Chirca et al. |
| 2020/0116952 A1 | 4/2020 | Rosson |
| 2020/0116953 A1 | 4/2020 | Rosson |
| 2020/0124805 A1 | 4/2020 | Rosson et al. |
| 2020/0241211 A1* | 7/2020 | Shonkwiler .......... G02B 6/3885 |
| 2020/0371306 A1 | 11/2020 | Mosier et al. |
| 2020/0393629 A1 | 12/2020 | Hill et al. |

FOREIGN PATENT DOCUMENTS

| | | |
|---|---|---|
| CN | 1646962 A | 7/2005 |
| CN | 1922523 A | 2/2007 |
| CN | 101195453 A | 6/2008 |
| CN | 201404194 Y | 2/2010 |
| CN | 201408274 Y | 2/2010 |
| CN | 201522561 U | 7/2010 |
| CN | 101806939 A | 8/2010 |
| CN | 101866034 A | 10/2010 |
| CN | 201704194 U | 1/2011 |
| CN | 102141655 A | 8/2011 |
| CN | 203224645 U | 10/2013 |
| CN | 203396982 U | 1/2014 |
| CN | 104064903 A | 9/2014 |
| CN | 110954996 A | 4/2020 |
| DE | 03537684 A1 | 4/1987 |
| DE | 3737842 C1 | 9/1988 |
| DE | 19805554 A1 | 8/1998 |
| EP | 0012566 A1 | 6/1980 |
| EP | 122566 A2 | 10/1984 |
| EP | 130513 A2 | 1/1985 |
| EP | 462362 A2 | 12/1991 |
| EP | 0469671 A1 | 2/1992 |
| EP | 547778 A1 | 6/1993 |
| EP | 0547788 A1 | 6/1993 |
| EP | 468671 B1 | 1/1996 |
| EP | 762171 A1 | 3/1997 |
| EP | 855610 A2 | 7/1998 |
| EP | 0856751 A1 | 8/1998 |
| EP | 856761 A1 | 8/1998 |

(56) References Cited

FOREIGN PATENT DOCUMENTS

| | | |
|---|---|---|
| EP | 940700 A2 | 9/1999 |
| EP | 949522 A2 | 10/1999 |
| EP | 957381 A1 | 11/1999 |
| EP | 997757 A2 | 5/2000 |
| EP | 1065542 A1 | 1/2001 |
| EP | 1258758 A2 | 11/2002 |
| EP | 1391762 A1 | 2/2004 |
| EP | 1431786 A2 | 6/2004 |
| EP | 1438622 A2 | 7/2004 |
| EP | 1122566 B1 | 7/2005 |
| EP | 1678537 A1 | 7/2006 |
| EP | 1759231 A1 | 3/2007 |
| EP | 1810062 A1 | 7/2007 |
| EP | 2069845 A2 | 6/2009 |
| EP | 2149063 A1 | 2/2010 |
| EP | 2150847 A1 | 2/2010 |
| EP | 2193395 A1 | 6/2010 |
| EP | 2255233 A1 | 12/2010 |
| EP | 2333597 A2 | 6/2011 |
| EP | 2362253 A1 | 8/2011 |
| EP | 2401641 A1 | 1/2012 |
| EP | 2609458 A1 | 7/2013 |
| EP | 2622395 A1 | 8/2013 |
| EP | 2734879 A1 | 5/2014 |
| EP | 2815259 A1 | 12/2014 |
| EP | 2817667 A1 | 12/2014 |
| EP | 2992372 A1 | 3/2016 |
| EP | 3064973 A2 | 9/2016 |
| EP | 3101740 A1 | 12/2016 |
| EP | 3207223 A1 | 8/2017 |
| EP | 3245545 A1 | 11/2017 |
| EP | 3265859 A1 | 1/2018 |
| EP | 3336992 A1 | 6/2018 |
| EP | 3362830 A1 | 8/2018 |
| EP | 3427096 A1 | 1/2019 |
| EP | 3443395 A1 | 2/2019 |
| EP | 3535614 A1 | 9/2019 |
| EP | 3537197 A1 | 9/2019 |
| EP | 3646074 A1 | 5/2020 |
| EP | 3646079 A1 | 5/2020 |
| ES | 1184287 U | 5/2017 |
| GB | 2022284 A | 12/1979 |
| GB | 2154333 A | 9/1985 |
| GB | 2169094 A | 7/1986 |
| JP | 52030447 A | 3/1977 |
| JP | 58142308 A | 8/1983 |
| JP | 61-145509 A | 7/1986 |
| JP | 62054204 A | 3/1987 |
| JP | 6320111 B2 | 2/1988 |
| JP | 63089421 A | 4/1988 |
| JP | 63078908 U | 5/1988 |
| JP | 03-063615 A | 3/1991 |
| JP | 03207223 A | 9/1991 |
| JP | 05106765 A | 4/1993 |
| JP | 05142439 A | 6/1993 |
| JP | 05297246 A | 11/1993 |
| JP | 06-320111 A | 11/1994 |
| JP | 07318758 A | 12/1995 |
| JP | 08050211 A | 2/1996 |
| JP | 08054522 A | 2/1996 |
| JP | 08062432 A | 3/1996 |
| JP | 08292331 A | 11/1996 |
| JP | 09135526 A | 5/1997 |
| JP | 09159867 A | 6/1997 |
| JP | 09203831 A | 8/1997 |
| JP | 09325223 A | 12/1997 |
| JP | 09325249 A | 12/1997 |
| JP | 10170781 A | 6/1998 |
| JP | 10332953 A | 12/1998 |
| JP | 11064682 A | 3/1999 |
| JP | 11271582 A | 10/1999 |
| JP | 11281861 A | 10/1999 |
| JP | 11326693 A | 11/1999 |
| JP | 11352368 A | 12/1999 |
| JP | 2000002828 A | 1/2000 |
| JP | 2001116968 A | 4/2001 |
| JP | 2001290051 A | 10/2001 |
| JP | 2002520987 A | 7/2002 |
| JP | 2002-250987 A | 9/2002 |
| JP | 2003009331 A | 1/2003 |
| JP | 2003070143 A | 3/2003 |
| JP | 2003121699 A | 4/2003 |
| JP | 2003177279 A | 6/2003 |
| JP | 2003302561 A | 10/2003 |
| JP | 2004361521 A | 12/2004 |
| JP | 2005024789 A | 1/2005 |
| JP | 2005031544 A | 2/2005 |
| JP | 2005077591 A | 3/2005 |
| JP | 2005114860 A | 4/2005 |
| JP | 2005520987 A | 7/2005 |
| JP | 2006023502 A | 1/2006 |
| JP | 2006146084 A | 6/2006 |
| JP | 2006259631 A | 9/2006 |
| JP | 2006337637 A | 12/2006 |
| JP | 2007078740 A | 3/2007 |
| JP | 2007121859 A | 5/2007 |
| JP | 2009265208 A | 11/2009 |
| JP | 2010152084 A | 7/2010 |
| JP | 2011033698 A | 2/2011 |
| JP | 2013041089 A | 2/2013 |
| JP | 2013156580 A | 8/2013 |
| JP | 2014085474 A | 5/2014 |
| JP | 05537852 B2 | 7/2014 |
| JP | 05538328 B2 | 7/2014 |
| JP | 2014134746 A | 7/2014 |
| JP | 3207223 U | 11/2016 |
| KR | 10-2013-0081087 A | 7/2013 |
| WO | 1994025885 A1 | 11/1994 |
| WO | 1998036304 A1 | 8/1998 |
| WO | 2001027660 A2 | 4/2001 |
| WO | 01/92927 A2 | 12/2001 |
| WO | 2001092937 A1 | 12/2001 |
| WO | 0225340 A1 | 3/2002 |
| WO | 03/36358 A2 | 5/2003 |
| WO | 2004/061509 A1 | 7/2004 |
| WO | 2005/045494 A1 | 5/2005 |
| WO | 2006/009597 A1 | 1/2006 |
| WO | 2006/052420 A1 | 5/2006 |
| WO | 2006113726 A1 | 10/2006 |
| WO | 2008/027201 A2 | 3/2008 |
| WO | 2008/150408 A1 | 12/2008 |
| WO | 2008/150423 A1 | 12/2008 |
| WO | 2009/042066 A1 | 4/2009 |
| WO | 2009/117060 A1 | 9/2009 |
| WO | 2010/092009 A1 | 8/2010 |
| WO | 2010/099141 A1 | 9/2010 |
| WO | 2011/044090 A2 | 4/2011 |
| WO | 2011/047111 A1 | 4/2011 |
| WO | 2012/027313 A1 | 3/2012 |
| WO | 2012037727 A1 | 3/2012 |
| WO | 2012/044741 A1 | 4/2012 |
| WO | 2012/163052 A1 | 12/2012 |
| WO | 2013/016042 A1 | 1/2013 |
| WO | 2013/122752 A1 | 8/2013 |
| WO | 2013/126488 A1 | 8/2013 |
| WO | 2013177016 A1 | 11/2013 |
| WO | 2014151259 A1 | 9/2014 |
| WO | 2014167447 A1 | 10/2014 |
| WO | 2014/179411 A1 | 11/2014 |
| WO | 2014197894 A1 | 12/2014 |
| WO | 2015/009435 A1 | 1/2015 |
| WO | 2015144883 A1 | 10/2015 |
| WO | 2015197588 A1 | 12/2015 |
| WO | 2016/059320 A1 | 4/2016 |
| WO | 2016/100078 A1 | 6/2016 |
| WO | 2016095213 A1 | 6/2016 |
| WO | 2016/115288 A1 | 7/2016 |
| WO | 2016156610 A1 | 10/2016 |
| WO | 2016168389 A1 | 10/2016 |
| WO | 2017/063107 A1 | 4/2017 |
| WO | 2017/146722 A1 | 8/2017 |
| WO | 2017/155754 A1 | 9/2017 |
| WO | 2017/178920 A1 | 10/2017 |
| WO | 2018/083561 A1 | 5/2018 |

(56) References Cited

FOREIGN PATENT DOCUMENTS

| WO | 2018/175123 A1 | 9/2018 |
| --- | --- | --- |
| WO | 2018/204864 A1 | 11/2018 |
| WO | 2019/006176 A1 | 1/2019 |
| WO | 2019005190 A2 | 1/2019 |
| WO | 2019005191 A1 | 1/2019 |
| WO | 2019005192 A1 | 1/2019 |
| WO | 2019005193 A1 | 1/2019 |
| WO | 2019005194 A1 | 1/2019 |
| WO | 2019005195 A1 | 1/2019 |
| WO | 2019005196 A1 | 1/2019 |
| WO | 2019005197 A1 | 1/2019 |
| WO | 2019005198 A1 | 1/2019 |
| WO | 2019005199 A1 | 1/2019 |
| WO | 2019005200 A1 | 1/2019 |
| WO | 2019005201 A1 | 1/2019 |
| WO | 2019005202 A1 | 1/2019 |
| WO | 2019005203 A1 | 1/2019 |
| WO | 2019005204 A1 | 1/2019 |
| WO | 2019/126333 A1 | 6/2019 |
| WO | 2019/195652 A1 | 10/2019 |
| WO | 2020/101850 A1 | 5/2020 |

OTHER PUBLICATIONS

Clearfield, "Fieldshield Optical Fiber Protection System: Installation Manual." for part No. 016164. Last Updated Dec. 2014. 37 pgs.
Clearfield, "FieldShield® SC and LC Pushable Connectors," Last Updated Jun. 1, 2018, 2 pgs.
Clearfield, "FieldShield® SmarTerminal: Hardened Pushable Connectors" Last Updated Jun. 29, 2018, 2 pgs.
International Search Report and Written Opinion PCT/US2017/063938 dated May 14, 2018.
International Search Report and Written Opinion PCT/US2017/063953 dated May 14, 2018.
International Search Report and Written Opinion PCT/US2017/063991 dated May 14, 2018.
International Search Report and Written Opinion PCT/US2017/064027 dated Oct. 9, 2018.
International Search Report and Written Opinion PCT/US2017/064063 dated May 15, 2018.
International Search Report and Written Opinion PCT/US2017/064071 dated May 14, 2018.
International Search Report and Written Opinion PCT/US2017/064072 dated May 14, 2018.
International Search Report and Written Opinion PCT/US2017/064077 dated Feb. 26, 2018.
International Search Report and Written Opinion PCT/US2017/064084 dated Feb. 26, 2018.
International Search Report and Written Opinion PCT/US2017/064087 dated Feb. 26, 2018.
International Search Report and Written Opinion PCT/US2017/064092 dated Feb. 23, 2018.
International Search Report and Written Opinion PCT/US2017/064093 dated Feb. 26, 2018.
International Search Report and Written Opinion PCT/US2017/064095 dated Feb. 23, 2018.
International Search Report and Written Opinion PCT/US2017/064096 dated Feb. 26, 2018.
International Search Report and Written Opinion PCT/US2018/039019 dated Sep. 18, 2018.
International Search Report and Written Opinion PCT/US2018/039020 dated Mar. 8, 2019.
International Search Report and Written Opinion PCT/US2018/039490 dated Oct. 4, 2018.
International Search Report and Written Opinion PCT/US2018/039494 dated Oct. 11, 2018.
International Search Report and Written Opinion PCT/US2018/040011 dated Oct. 5, 2018.
International Search Report and Written Opinion PCT/US2018/040104 dated Oct. 9, 2018.
International Search Report and Written Opinion PCT/US2018/040126 dated Oct. 9, 2018.
International Search Report and Written Opinion PCT/US2018/040130 dated Sep. 18, 2018.
Brown, "What is Transmission Welding?" Laser Plastic Welding website, 6 pgs, Retrieved on Dec. 7, 2018 from: http://www.laserplasticwelding.com/what-is-transmission-welding.
Infolite—Design and Data Specifications, 1 pg. Retrieved Feb. 21, 2019.
Notice of Allowance Received for U.S. Appl. No. 16/018,997 dated Oct. 4, 2018.
Office Action Pertaining to U.S. Appl. No. 16/018,918 dated Sep. 28, 2018.
Office Action Pertaining to U.S. Appl. No. 16/018,988 dated Oct. 31, 2018.
Office Action Pertaining to U.S. Appl. No. 16/109,008 dated Oct. 31, 2018.
Schneier, Bruce; "Applied Cryptography: Protocols, Algorithms, and Source Code in C," Book. 1995 SEC. 10.3, 12.2, 165 Pgs.
Coaxum, L., et al., U.S. Appl. No. 62/341,947, "Fiber Optic Multiport Having Different Types of Ports for Multi-Use," filed May 26, 2016.
Faulkner et al. "Optical networks for local lopp applications," J. Lightwave Technol.0733-8724 7(11), 17411751 (1989).
Ramanitra et al. "Optical access network using a self-latching variable splitter remotely powered through an optical fiber link," Optical Engineering 46(4) p. 45007-1-45007-9, Apr. 2007.
Ratnam et al. "Burst switching using variable optical splitter based switches with wavelength conversion," ICIIS 2017—Poeceedings Jan. 2018, pp. 1-6.
Wang et al. "Opto-VLSI-based dynamic optical splitter," Electron. Lett.0013-5194 10.1049/el:20046715 40(22), 14451446 (2004).

* cited by examiner

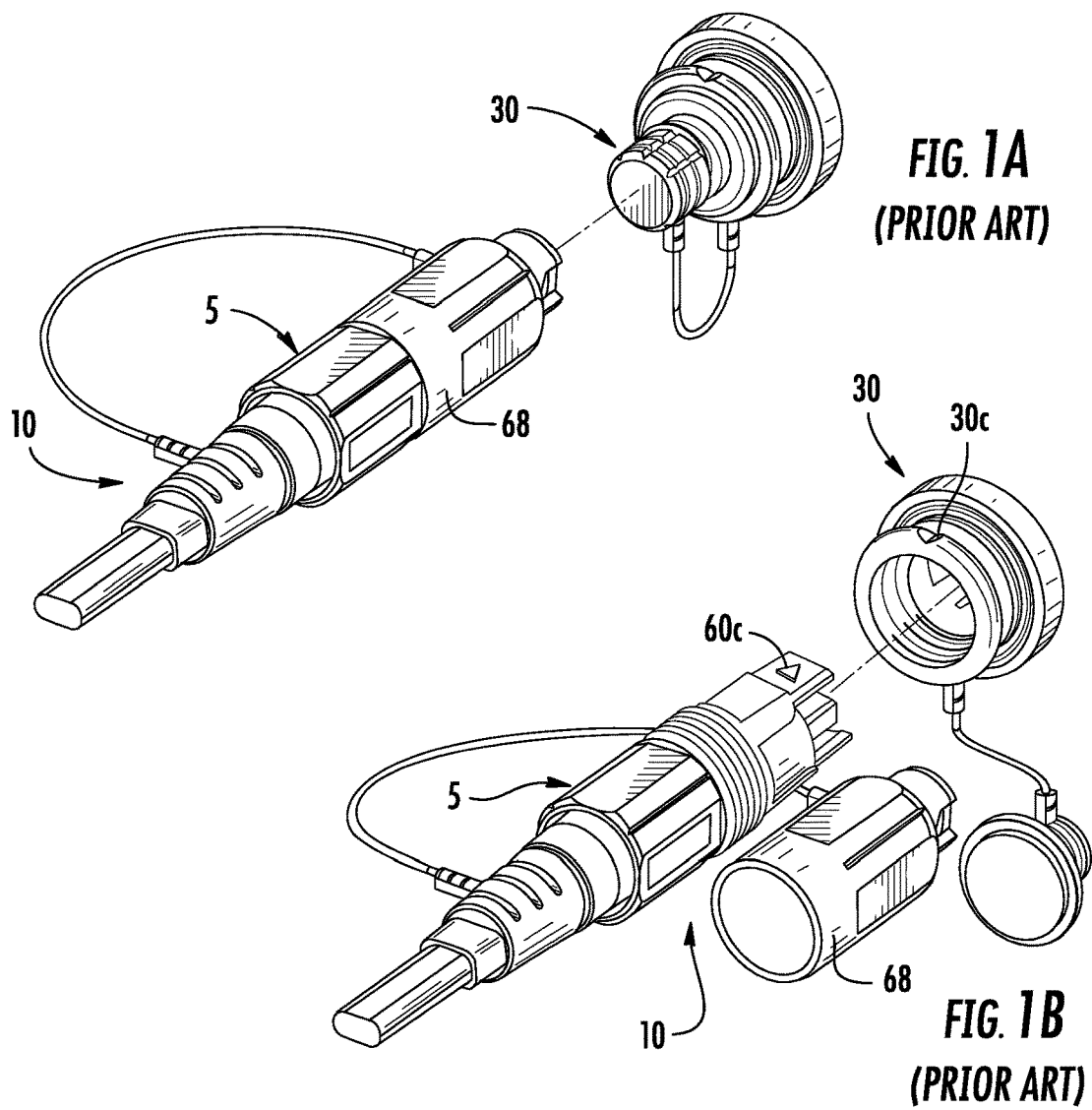
FIG. 1A (PRIOR ART)
FIG. 1B (PRIOR ART)
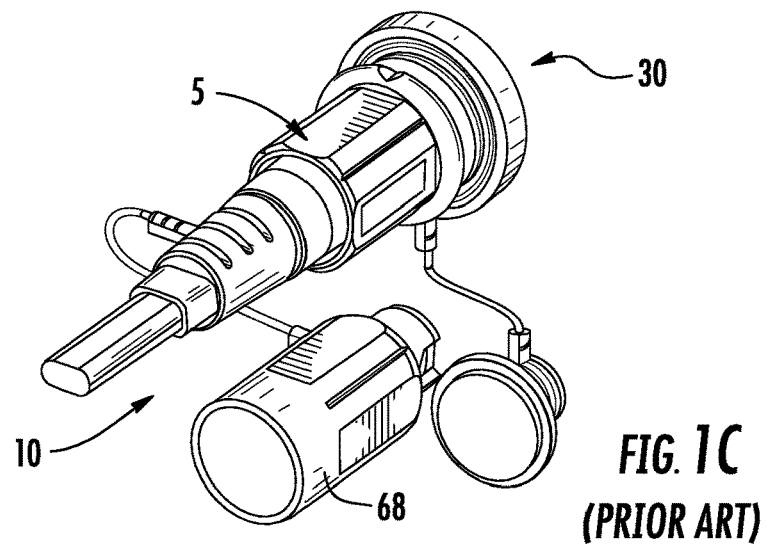
FIG. 1C (PRIOR ART)

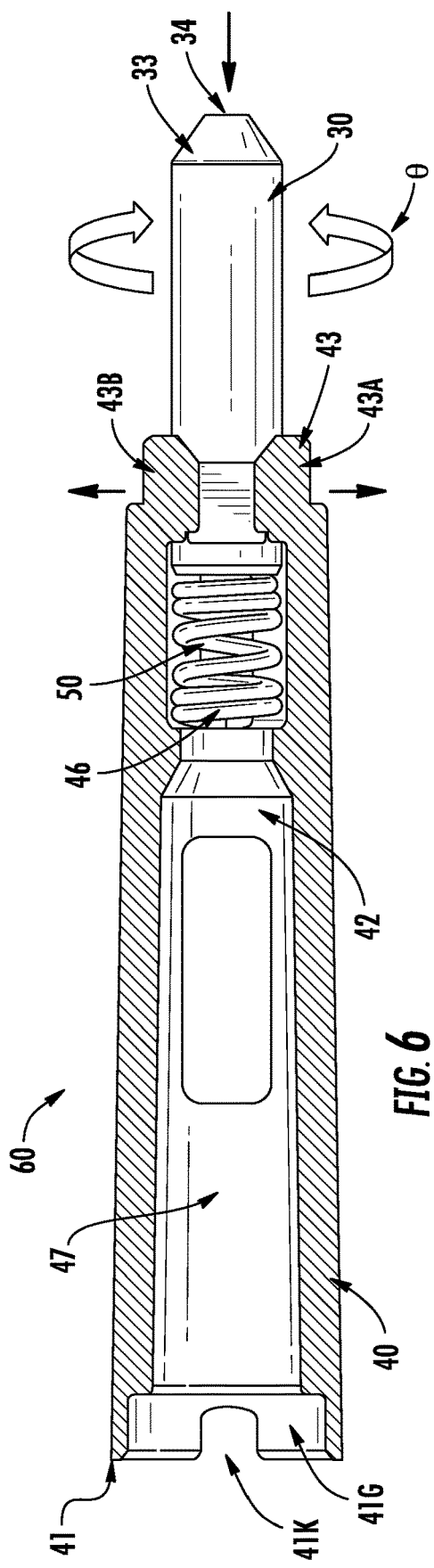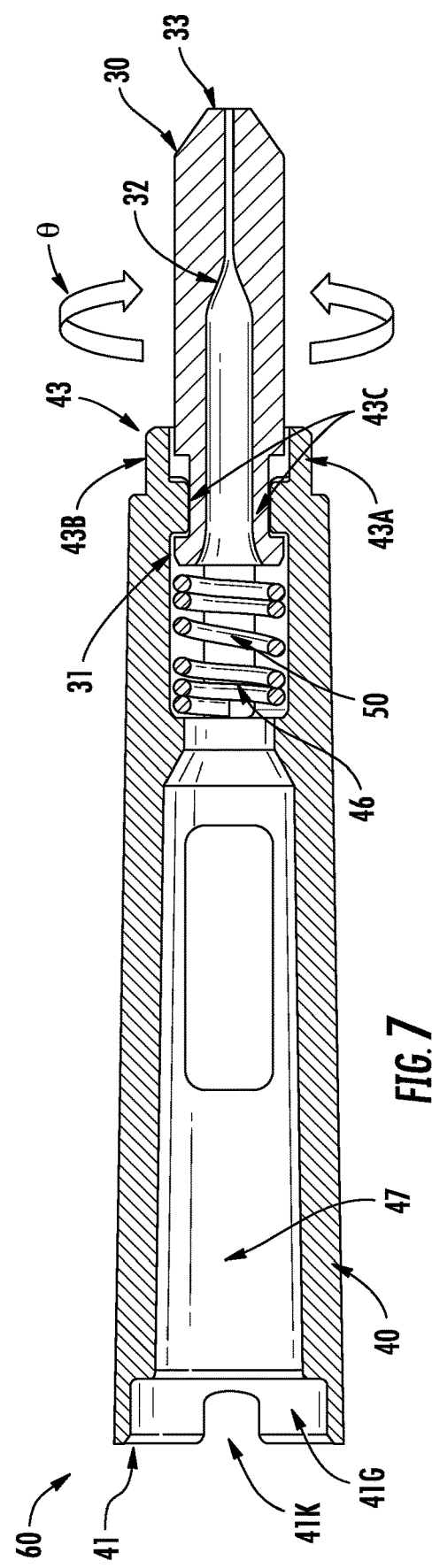

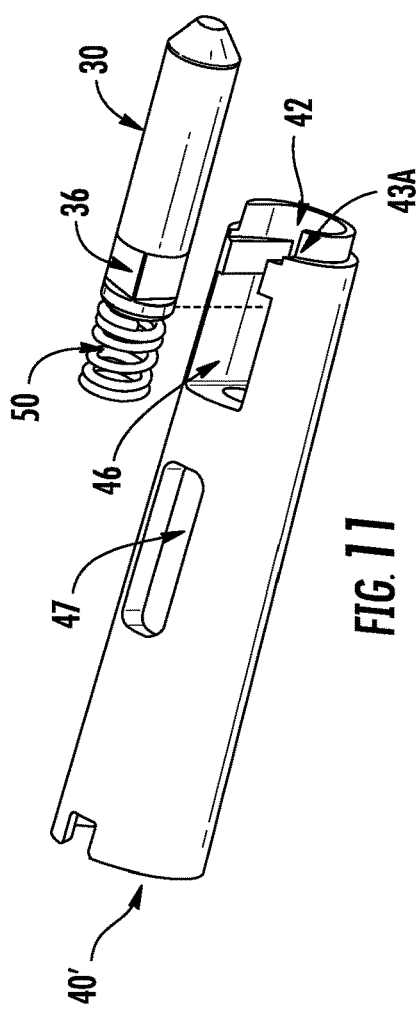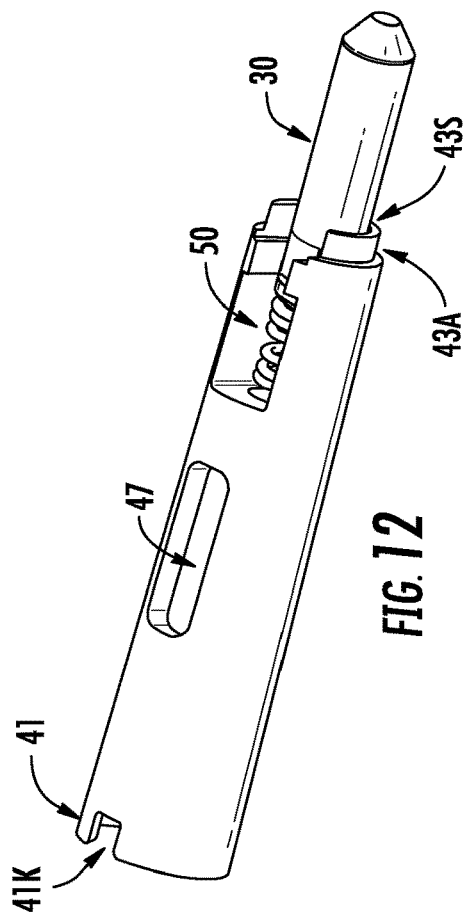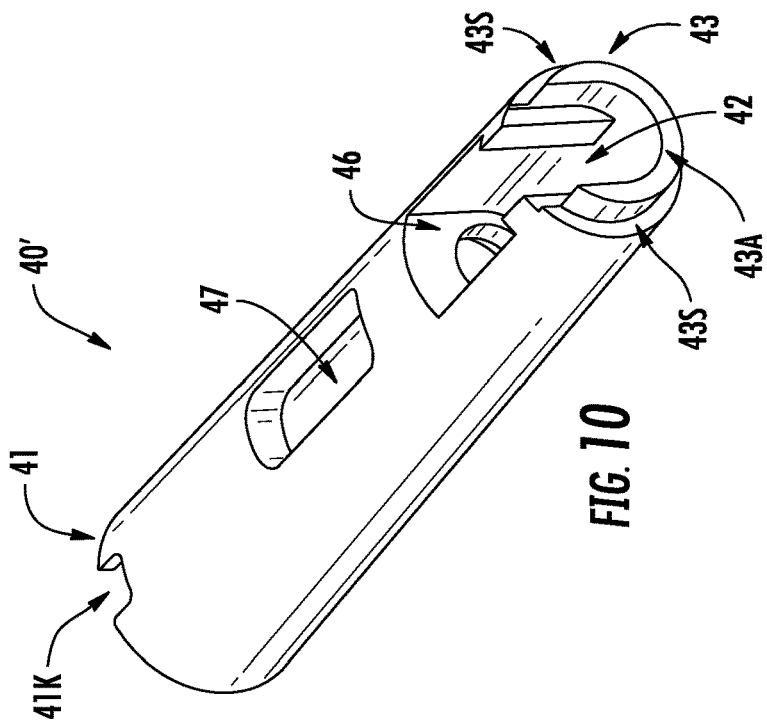

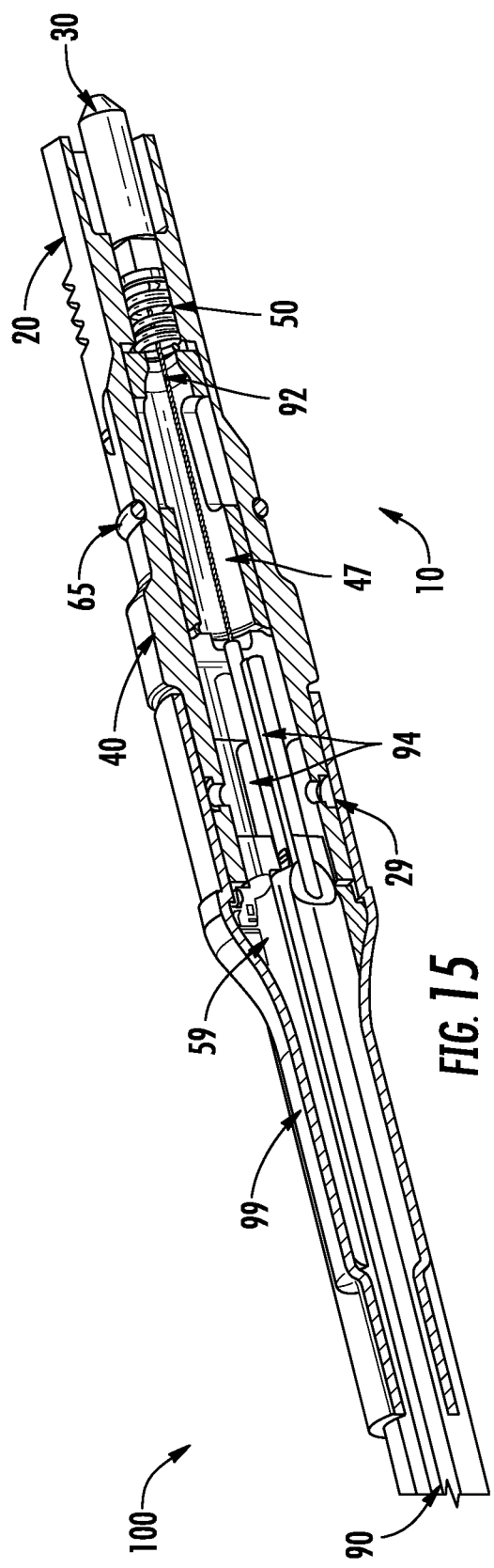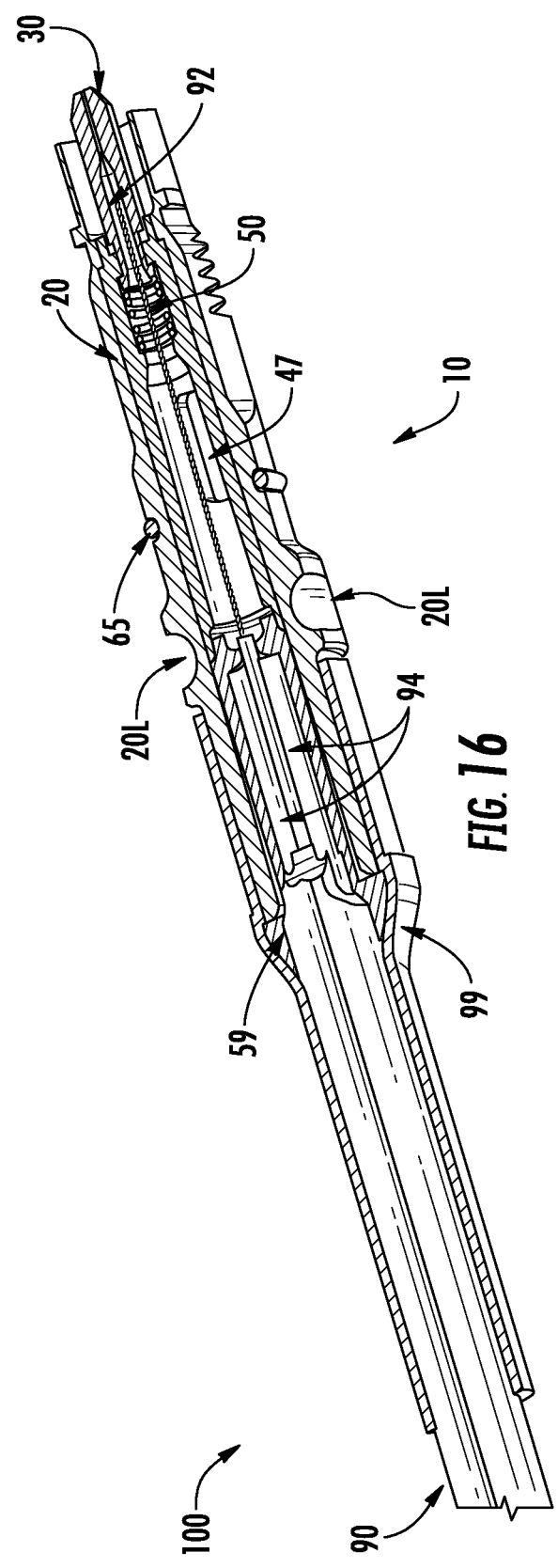

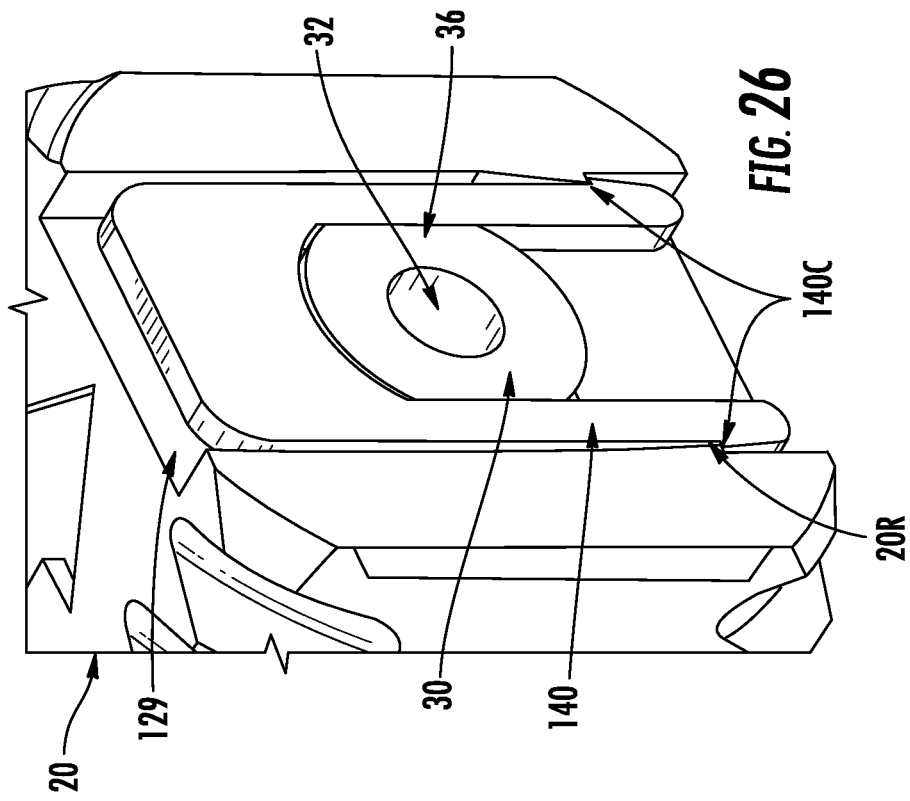
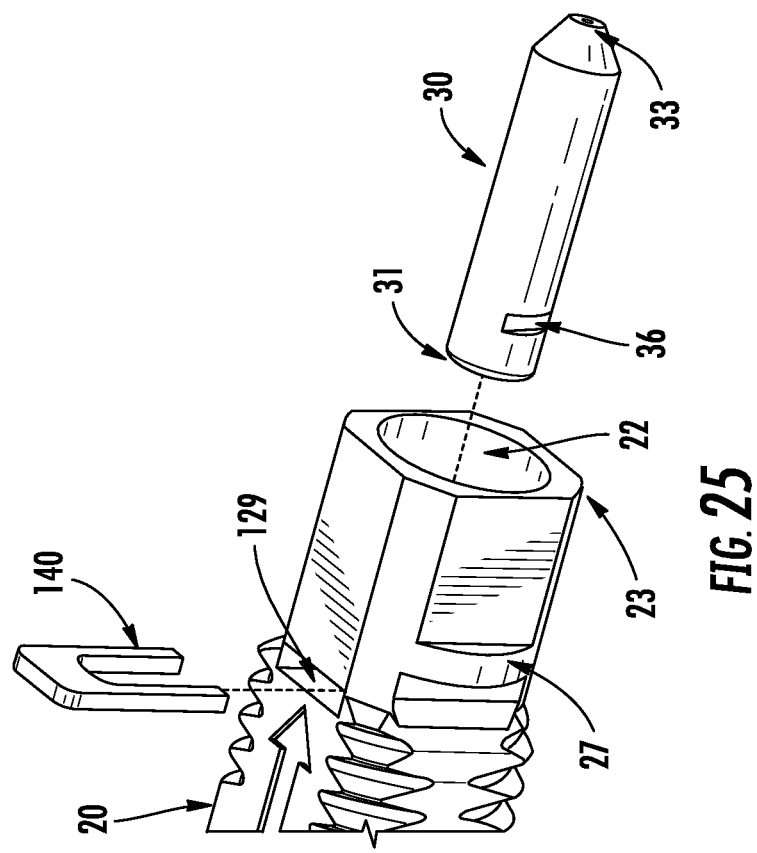

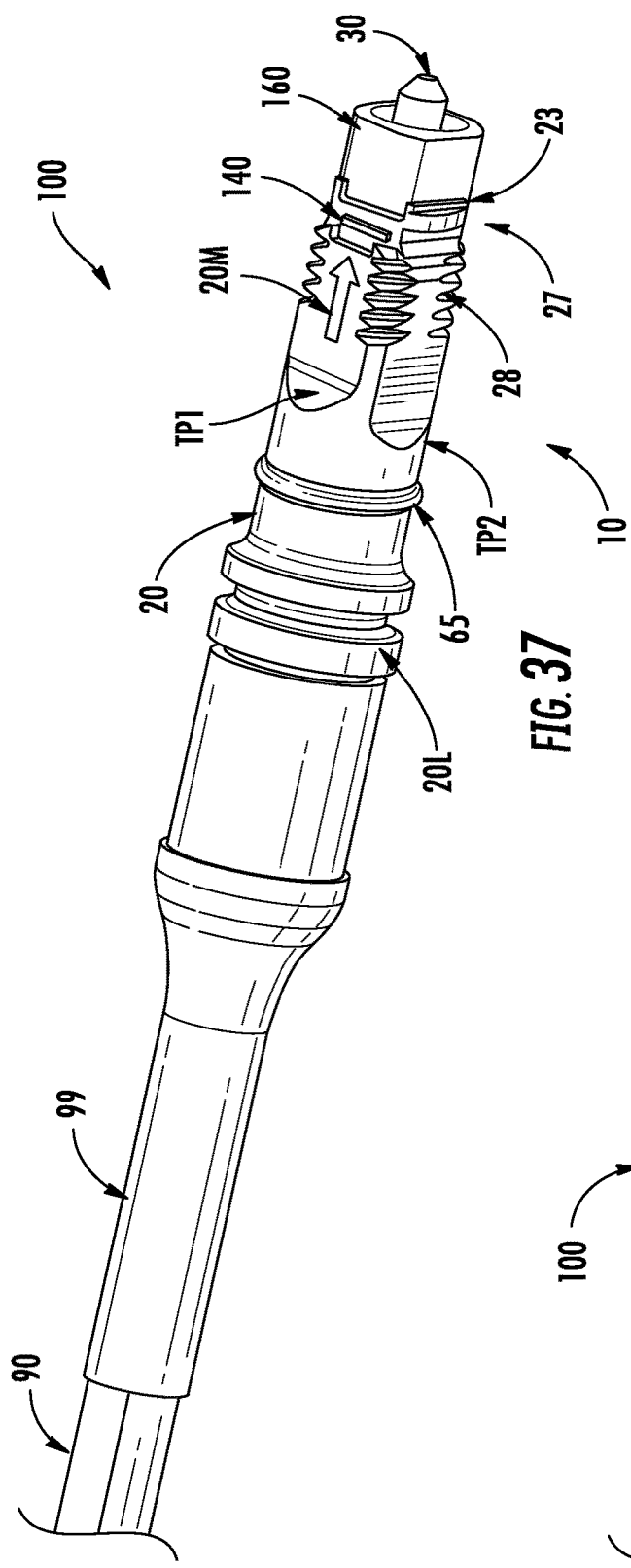
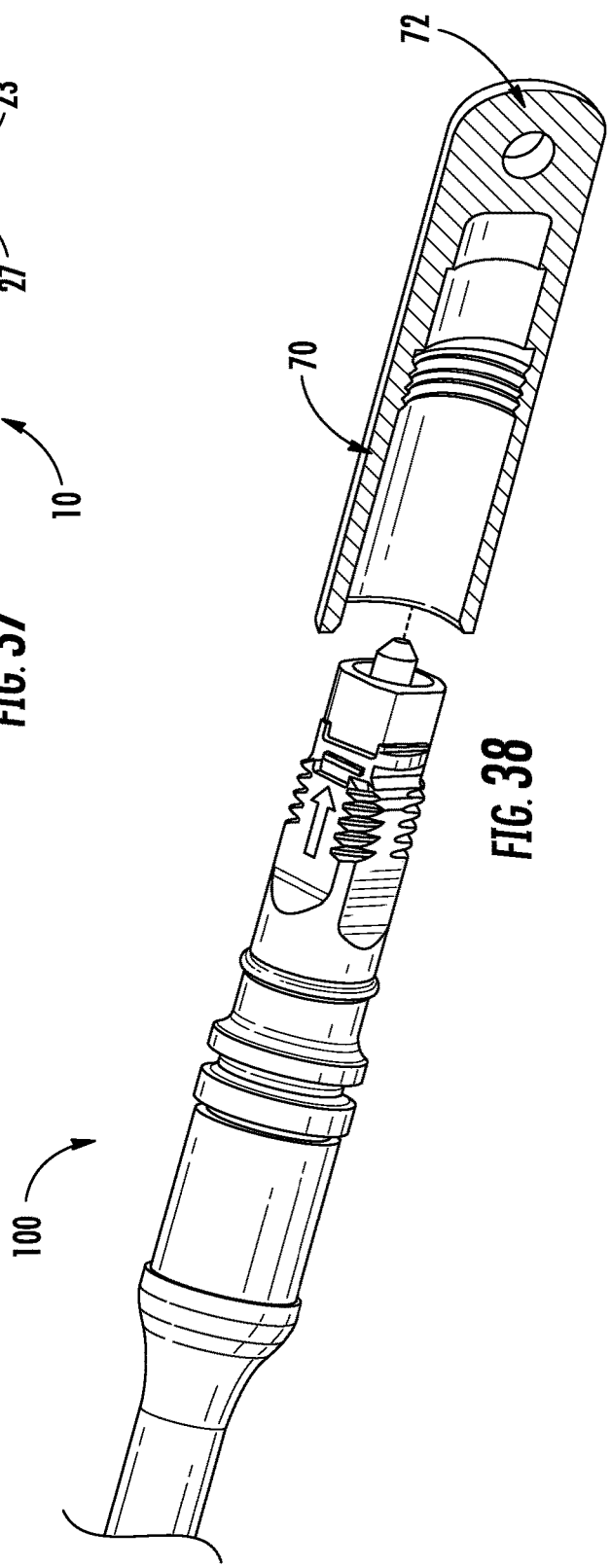
FIG. 37
FIG. 38

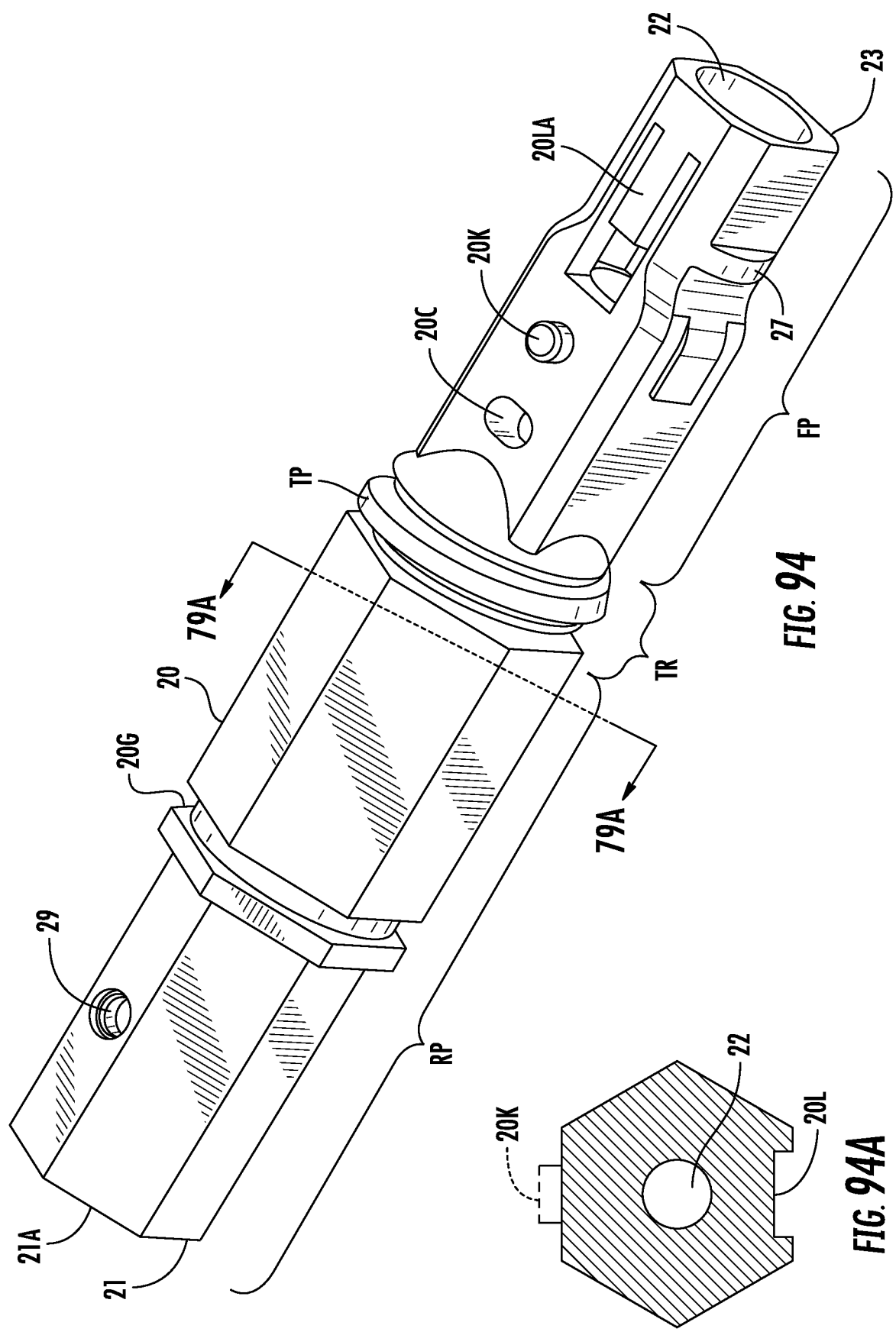

MULTIFIBER FIBER OPTIC CONNECTORS, CABLE ASSEMBLIES AND METHODS OF MAKING THE SAME

CROSS-REFERENCE TO RELATED APPLICATIONS

This application is a continuation of International Application No. PCT/US2017/064063, filed Nov. 30, 2017, which claims the benefit of U.S. Application No. 62/526,011, filed on Jun. 28, 2017, U.S. Application No. 62/526,018, filed on Jun. 28, 2017, and U.S. Application No. 62/526,195, filed on Jun. 28, 2017, the content of which is relied upon and incorporated herein by reference in entirety.

BACKGROUND

The disclosure is directed to fiber optic connectors along with methods for making fiber optic connectors. More specifically, the disclosure is directed to fiber optic connectors having improved or simplified designs along with methods of making.

Optical fiber is increasingly being used for a variety of applications, including but not limited to broadband voice, video, and data transmission. As bandwidth demands increase optical fiber is migrating toward subscribers in outdoor communication networks such as in fiber to the premises applications such as FTTx and the like. To address this need for making optical connections in communication networks for outdoor environments hardened fiber optic connectors were developed. One of the most commercially successful hardened fiber optic connector is the OptiTap® connector sold by Corning Optical Communications LLC of Hickory, N.C., such as disclosed in U.S. Pat. Nos. 7,090,406 and 7,113,679 (the '406 and '679 patents). The OptiTap® connector is a hardened male plug connector for terminating a fiber optic cable and the assembly is configured for optical connection such as with a complementary receptacle. As used herein, the term "hardened" describes a connector or receptacle port intended for making an environmentally sealed optical connection suitable for outdoor use, and the term "non-hardened" describes a connector or receptacle port that is not intended for making an environmentally sealed optical connection such as the well-known SC connector.

FIGS. 1A-1C are prior art depictions showing various stages of mating of a preconnectorized cable 1 having a plug connector 5 such as an OptiTap® connector with a receptacle 3. Receptacle 3 mates plug connector 5 with a standard SC connector (i.e., a non-hardened connector) at a second end (not visible in these views) using an adapter sleeve for aligning ferrules when mating plug connector 5 with the a non-hardened connector. Protection of the non-hardened connector side of the receptacle is typically accomplished by mounting the receptacle 3 through a wall of an enclosure or the like so that the non-hardened end of the receptacle is disposed inside the enclosure for environmental protection of the non-hardened connector. As shown by FIGS. 1A-1C, the other end of the receptacle 3 is accessible for receiving the plug connector 5 at the wall of the enclosure. Other applications may mount the receptacle 3 inside an enclosure on a bracket or the like.

Receptacle 3 allows an optical connection between the hardened connector such as the OptiTap® male plug connector with a non-hardened connector such as the SC connector at nodes in the optical network that typically transition from an outdoor space to an enclosed and protected space. Receptacle 3 is described in further detail in U.S. Pat. No. 6,579,014. Receptacle 3 includes a receptacle housing and an adapter sleeve disposed therein. The receptacle 3 receives a non-hardened connector at a second end as represented by the arrow pointing to the left. The receptacle 3 typically requires mounting through a wall of a closure, or inside the closure, such as a closure mounted on the side of subscribers premises, disposed in an underground vault or on a pole for protecting the non-hardened connector for outside plant deployments.

Network operators face many challenges for building, deploying and connecting subscribers to outside plant communication networks such as Fiber-to-the-Home (FTTH) or Fiber-to-the-location (FTTx) networks. Besides right of way access for the communication networks, network operators may have limited space to available on existing poles or in existing vaults for mounting devices. Initially, conventional hardened fiber optic connectors were typically mounted on robust and relatively stiff fiber optic cables, and slack storage for these fiber optic cables may also consume limited space or become unsightly in aerial deployments. Further as outside plant deployments evolved many network operators desired to route the fiber optic cable assembly with the connector through an existing wall of a subscriber premises and into the building or route the fiber optic cable assembly with the connector through a buried duct. Thus, network operators because sensitive to the size of the fiber optic connector for these types of deployment applications.

Consequently, there exists an unresolved need for fiber optic connectors that allow quickly and easy deployment and connectivity in a simple and efficient manner while still being cost-effective.

SUMMARY

The disclosure is directed to fiber optic connectors and methods of making fiber optic connectors as described and recited in the claim. The concepts disclosed allow a compact form-factor for an optical fiber connector suitable for numerous applications and variations as desired.

One aspect of the disclosure is directed a fiber optic connector comprising a housing and a multifiber ferrule comprising a plurality of bores. The housing comprises a rear end and a front end, and a longitudinal passageway extending from the rear end to the front end, where a part of the rear portion of the housing comprises a round cross-section and a part of the front portion of the housing comprises a non-round cross-section with a transition region disposed between the rear portion and the front portion, and the housing comprises a locking feature integrally formed in the housing.

Another aspect of the disclosure is directed a fiber optic connector comprising a housing and a MPO ferrule comprising a plurality of bores. The housing comprises a rear end and a front end, and a longitudinal passageway extending from the rear end to the front end, where a part of the rear portion of the housing comprises a round cross-section and a part of the front portion of the housing comprises a non-round cross-section with a transition region disposed between the rear portion and the front portion, and the housing comprises a locking feature integrally formed in the housing.

Yet another aspect of the disclosure is directed a fiber optic connector comprising a housing, a MPO ferrule comprising a plurality of bores, and a cable adapter. The housing comprises a rear end and a front end, and a longitudinal passageway extending from the rear end to the front end, where a part of the rear portion of the housing comprises a round cross-section and a part of the front portion of the housing comprises a non-round cross-section with a transition region disposed between the rear portion and the front portion, and the housing comprises a locking feature integrally formed in the housing. The cable adapter receives a portion of a resilient member and a portion of a ferrule holder, and a ferrule holder retainer is attached to the cable adapter.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

BRIEF DESCRIPTION OF THE FIGURES

FIGS. 1A-1C are prior art depictions showing various stages of mating of a prior art preconnectorized cable having a conventional hardened plug connector with a receptacle;

FIGS. 6 and 7 are longitudinal sectional views of the ferrule subassembly cable assembly of FIG. 3;

FIG. 10 is a perspective view of an alternative ferrule carrier that may be used with the ferrule subassemblies disclosed herein;

FIGS. 11 and 12 respectively are a partially exploded view and an assembled view of the alternative ferrule carrier depicted in FIG. 10;

FIGS. 15 and 16 are longitudinal sectional views of the fiber optic cable assembly of FIG. 2 showing details of the construction;

FIG. 25 is a detailed exploded view of the front end and of the fiber optic connector of FIG. 22;

FIG. 26 is a cross-sectional view taken at an opening of the housing and showing a transverse ferrule retention member securing the ferrule of the fiber optic connector of FIG. 22;

FIG. 37 is a perspective view of another fiber optic cable assembly with still another alternative fiber optic connector having a nosepiece;

FIG. 38 is a perspective view of the fiber optic cable assembly of FIG. 37 showing a sectional view of a dust cap having a pulling eye and that may be secured to the threads disposed on the housing;

FIG. 51A-53A are various views of a portion of another fiber optic cable assembly having a cable adapter with flexures for cable bend-strain relief;

FIGS. 94 and 94A respectively are a perspective view and a cross-sectional view of another connector housing comprising a non-round rear portion.

DETAILED DESCRIPTION

Reference will now be made in detail to the embodiments of the disclosure, examples of which are illustrated in the accompanying drawings. Whenever possible, like reference numbers will be used to refer to like components or parts.

The concepts disclosed advantageously provide fiber optic connectors that allow streamlined manufacture and assembly along with easy and intuitive connectivity with other devices while still having a compact footprint. The fiber optic connectors disclosed are explained and depicted with several different embodiments and various other alternative components or optional features that may be incorporated into one or more of the fiber optic connector concepts as desired. By way of explanation, several different variations of housings are disclosed that can be modified to use with connector constructions where the ferrule loads from either the rear end of the housing or the ferrule load from the front end of the housing. Some embodiments may advantageously use fewer parts while providing robust and reliable optical performance. For instance, some of the embodiments disclosed may have the ferrule cooperate directly with an housing (e.g., assembled) without using a ferrule holder like conventional fiber optic connectors. Other constructions may increase the part count of the connectors for various reasons or could use a ferrule holder if desired.

In one aspect the fiber optic connectors (hereinafter "connector") disclosed advantageously comprise a housing and a ferrule. The housing provides a first connector footprint that interfaces with other devices for making an optical connection and various different first connector footprints are disclosed herein that may be used with the connector constructions disclosed. The first connector footprints may be defined by a housings having a rear portion (RP) and a front portion (FP). First connector footprints may also be further defined by a transition region (TR) disposed between the rear portion (RP) and the front portion (FP) of the housing.

In one explanatory example, the housing comprises a part of the rear portion (RP) having a round cross-section (RCS) and a part of the front portion having a non-round cross-section (NRCS). The front portion (FP) or the rear portion (RP) of the housing may be further defined in various configurations as disclosed herein while retaining a part of the rear portion (RP) with the round cross-section (RCS) and a part of the front portion (FP) having a non-round cross-section (NRCS). By way of explanation, the front portion (FP) may have a rectangular cross-section that provides a first orientation feature for the connectors for alignment during mating and inhibit insertion into a non-compliant device or port.

Figure 79:
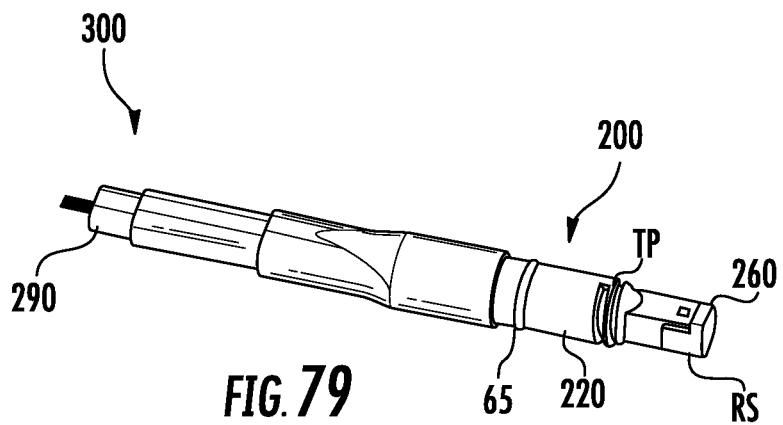
FIG. 79 is an assembled perspective view of a cable assembly comprising a multifiber optic connector comprising a housing with a transition region with a threaded portion.

However, other variations of housings according to the concepts disclosed are possible. As an example of another housing disclosed herein for use with the connector constructions disclosed, the housing may be defined as comprising a part of the rear portion (RP) having a polygonal cross-section (PCS) and a part of the front portion having a non-round cross-section (NRCS). The front portion (FP) or the rear portion (RP) of this explanatory housing may be further defined in various configurations as disclosed herein while retaining a part of the rear portion (RP) with the polygonal cross-section (PCS) and a part of the front portion (FP) having a non-round cross-section (NRCS) such as shown in FIGS. 79 and 79A. By way of example, the polygonal cross-section (PCS) may be a hexagon, a rectangle, a square or other suitable polygon as desired.

Housings disclosed herein define the mating interface for a complimentary device suitable for mating with the connector and the connector footprints disclosed are useful for inhibiting insertion into a non-compliant port or device and damaging either the connector or the device along with assuring a suitable optical operation for the optical connection since the connector and device are matched. Moreover, the housings may have features that aid in the proper alignment or orientation of the connector with the complimentary device such as markings, keys, keyways, etc. without significantly changing the primitive form-factors of the housings that are disclosed and claimed herein. By way of example, even though a round cross-section may include another feature such as a key or a keyway it is still considered to be a round cross-section. Additionally, housing may have other features such as locking features for securing the optical mating with a complimentary device or threads for securing a dust cap.

The housing footprints disclosed herein may be further defined by other geometry of the housing(s). By way of example, the transition region (TR) disposed between the rear portion (RP) and the front portion (FP). The transition region (TR) may have different configurations according to the concepts disclosed. In one embodiment, the transition region (TR) may comprise a first transition portion (TP1) disposed on a first side of the housing and a second transition portion (TP2) disposed on a second side of the housing. The first transition portion (TP1) and the second transition portion (TP2) may be spaced apart by an offset distance (OD) in the longitudinal direction. However, other embodiments of housings disclosed herein may have all of the transition portions of the transition region (TR) aligned along a common transverse plane of the connector as desired. In still other embodiments, the transition region (TR) of the housing may comprise a threaded portion (TP).

Other variations may further define the housing footprints disclosed herein. By way of example and explanation for use with appropriate housings disclosed, the first transition portion (TP1) comprises a first riser dimension (FRD) from the non-round cross-section (NRCS) to the round cross-section (RCS), and the second transition portion (TP2) comprises a second riser dimension (SRD) from the non-round cross-section (NRCS) to the round cross-section (RCS), where the first riser dimension (FRD) is different that the second riser dimension (SRD).

By way of another example of non-round cross-section (NRCS) for use with appropriate housings disclosed herein, a part of the front portion (FP) of the housing having the non-round cross-section (NRCS) comprises a rectangular cross-section having rounded corners (RC). The rectangular cross-section with rounded corners (RC) is a non-round cross-section (NRCS) due to the rectangular cross-section. The rounded corners (RC) may be sized so they have a similar outer dimension (OD) as a dimension (D) for the round cross-section (RCS) or not. The rounded corners (RC) may provide stability and snug fit for the mated connector within a port or device when side-pull forces are experienced to inhibit undue optical attenuation by having the round corners transition between the front portion (FP) to the rear portion (RP). However, other geometry is possible such as chamfers or the like such as when the rear portion (RP) has a polygon cross-section (PCS).

The housing footprints disclosed herein may be still further defined by other geometry of the housing(s). For instance, the front portion (FP) of the housing may comprise another cross-section portion (ACSP). By way of explanation, the another cross-sectional portion (ACSP) may comprise a SC footprint. The SC footprint can, in part, be similar to the inner housing of a conventional SC connector. This particular housing footprint is useful for allowing the connectors disclosed to be backwards compatible into existing devices or ports using well-established connector footprints as desired.

Housings may also define further features such as a transition region disposed between the rear portion and the front portion with the transition region comprising an asymmetric transition with respect to a longitudinal axis of the housing. Likewise, other features on the housing may define the housing as asymmetric for orientation or mating with compliant devices or ports.

Another aspect for some of the advantageous connectors disclosed herein comprise one or more features allowing for rotation of the ferrule during assembly for tuning the connector and improving optical performance. Some of the connector designs disclosed also offer multi-stage tuning of the ferrule/assembly or infinite tuning of the ferrule/assembly to any desired rotational position for improving optical performance.

The concepts described herein are suitable for making both indoor and outdoor fiber optic cable assemblies using the connectors disclosed such as drop or distribution cables. Further, the fiber optic connectors disclosed may allow for the use of one or more additional components for changing the connector form-factor defined by the particular housing. By way of example, a conversion housing may cooperate with the housing of the connector for changing the fiber optic connector from the first connector footprint defined by the housing to a second connector footprint at least partially defined by the conversion housing. Consequently, the connectors disclosed herein may be converted to be compatible as other well-known commercial connectors for Fiber-to-the-Home applications such as an SC connector or an OptiTap® connector such as available from Corning Optical Communications of Hickory, N.C. Of course the concepts disclosed herein may be used with other fiber optic connector types whether hardened or not and are not limited to these particular connector conversions. Likewise, the connector designs disclosed may be hybrid designs with both optical and electrical connectivity. Electrical connectivity may be provided by contacts on or in a portion of the housing of the connector and may be useful for power or data as desired for applications such as FTTx, 5G networks, industrial applications or the like. These and other additional concepts are discussed and disclosed in illustrative detail with reference to FIGS. herein.

Figure 43:
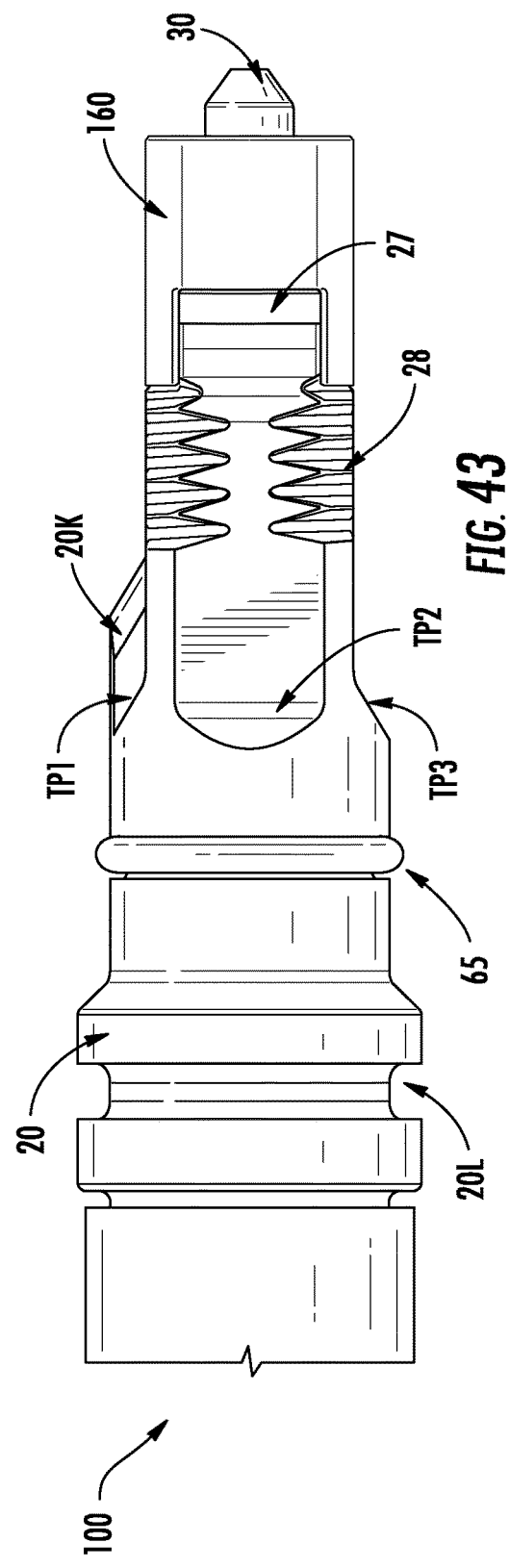
Figure 44:
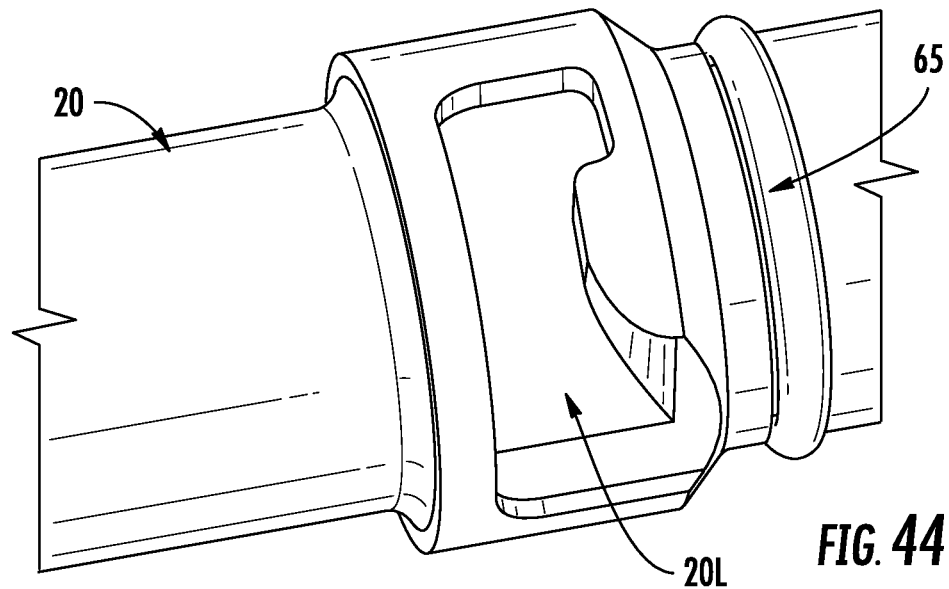
FIGS. 44 and 45 are perspective views of alternative housings depicting other locking feature designs for use with the fiber optic connectors disclosed.
Figure 45:
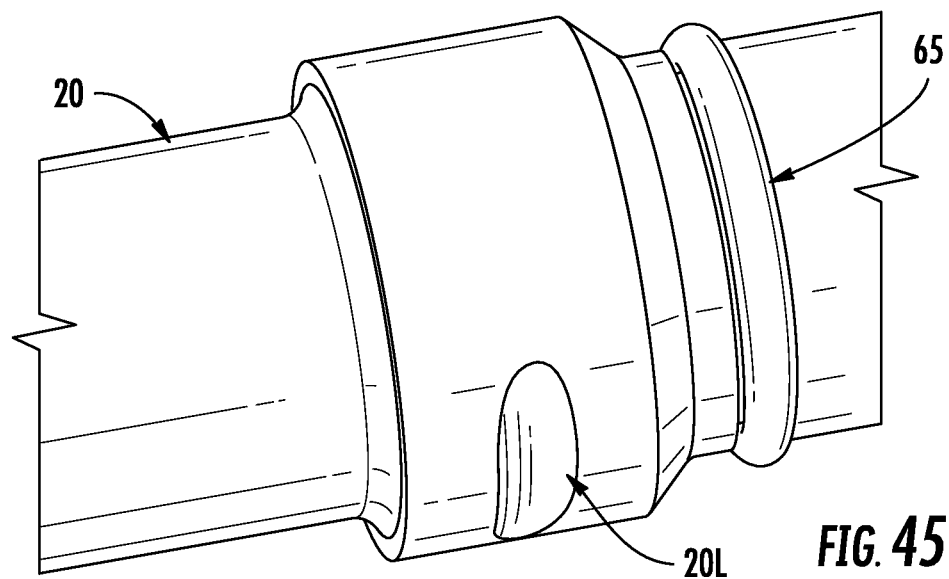

Several different constructions of fiber optic cable assemblies 100 (hereinafter "cable assemblies") comprising connector 10 and variations of connector 10 are disclosed herein. The connectors 10 may use any of the suitable housings or different connector constructions as desired and appropriate. By way of explanation, FIGS. 2, 2A, 3 and 5-17 disclose connectors where a ferrule 30 is inserted from a rear end 21 of housing 20, and FIGS. 19-43 and FIGS. 46-53 disclose connectors where ferrule 30 is inserted from a front end 23 of the connector 10. However, housings 20 may be modified for using connector designs. FIGS. 4A-4E depict an explanatory housing 20 for discussing geometry that generally speaking may be used with any appropriate connector construction as well as have the housing modified or altered for the desired housing design or connector construction. Likewise, housing 20 of FIG. 2A with the threaded transition portion (TP) may be modified or altered for the desired housing design or connector construction. FIGS. 44 and 45 disclose concepts related to alternative locking features 20L for use with housings 20 as appropriate. FIGS. 46-53 disclose another cable assembly 100 comprising connector 10 concepts disclosing another cable adapter that may be used with appropriate connectors 10 disclosed herein. FIG. 54 depicts connector 10 according to the concepts disclosed having another housing footprint. FIGS. 56-61 disclose cable assemblies 100 comprising connectors 10 having a first connector footprint Where the connectors 10 may be convertible to connectors 10' having a second connector footprint using a conversion housing 80,82. FIGS. 62-69 disclose cable assemblies 100 comprising connectors 10 having a first connector footprint where the connectors 10 may be convertible to connectors 100" having a second connector footprint using a different conversion housing 82. FIGS. 70-78 disclose a connectors where ferrule 30 is disposed within a ferrule holder 49 and inserted from a front end 23 of the connector 10.

Figure 2:
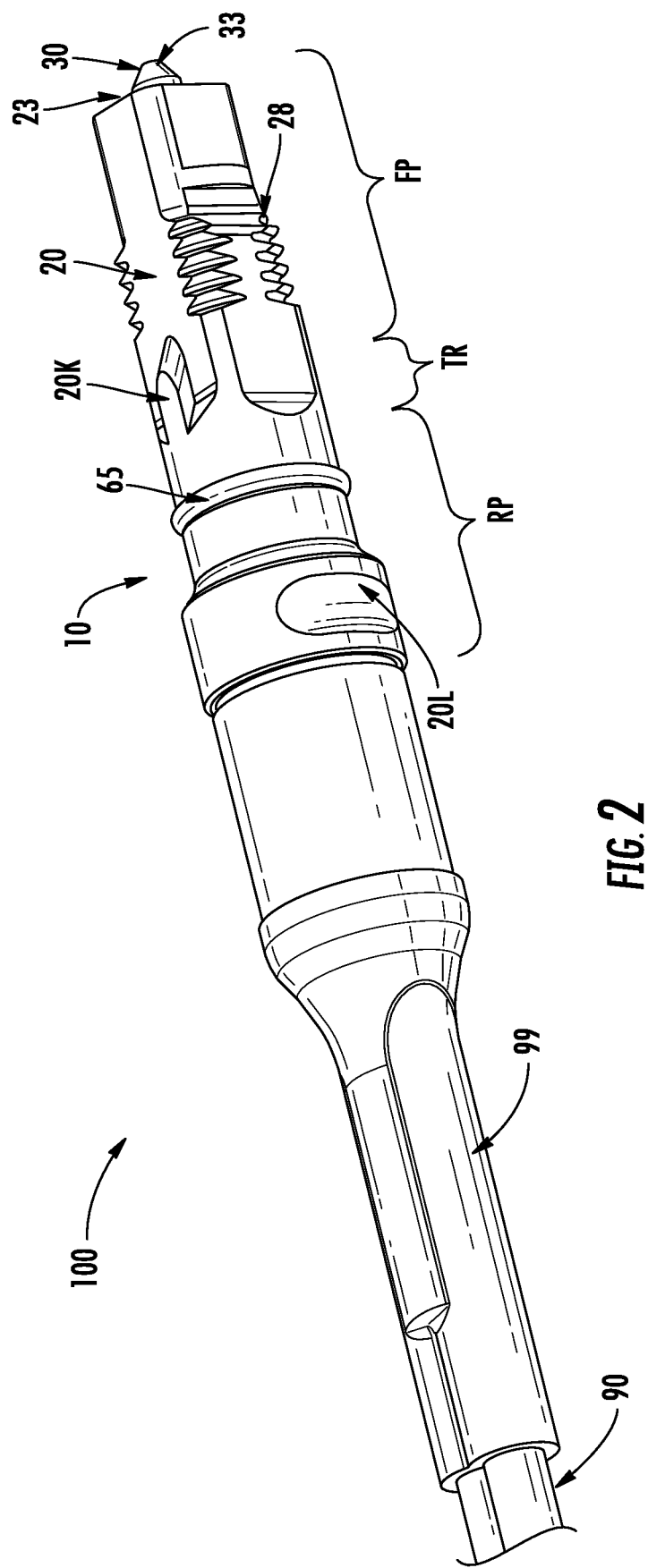
FIG. 2 is a perspective view of a fiber optic cable assembly having a fiber optic connector with a housing according to one aspect of the disclosure.
Figure 2A:
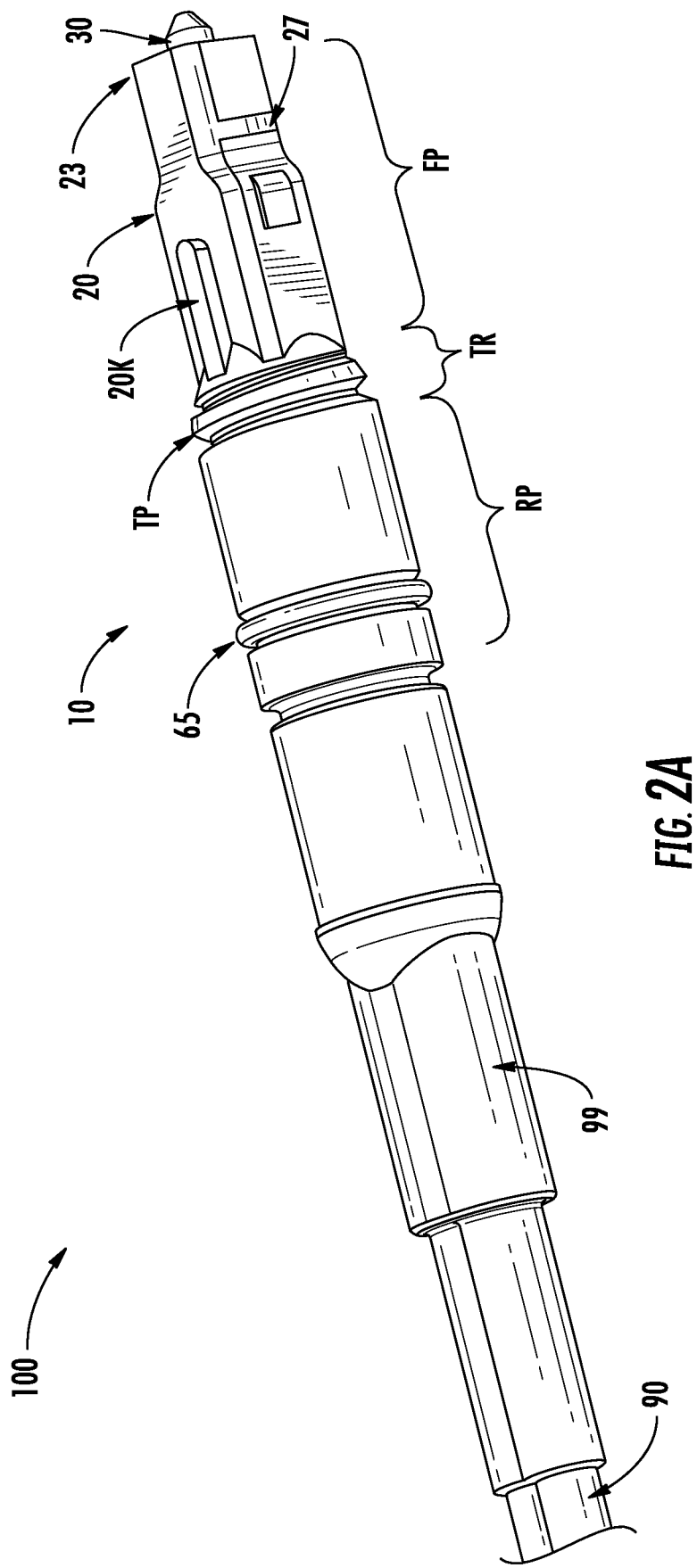
FIG. 2A is a perspective view of another fiber optic cable assembly having a fiber optic connector with alternative housing according to one aspect of the disclosure.
Figure 3:
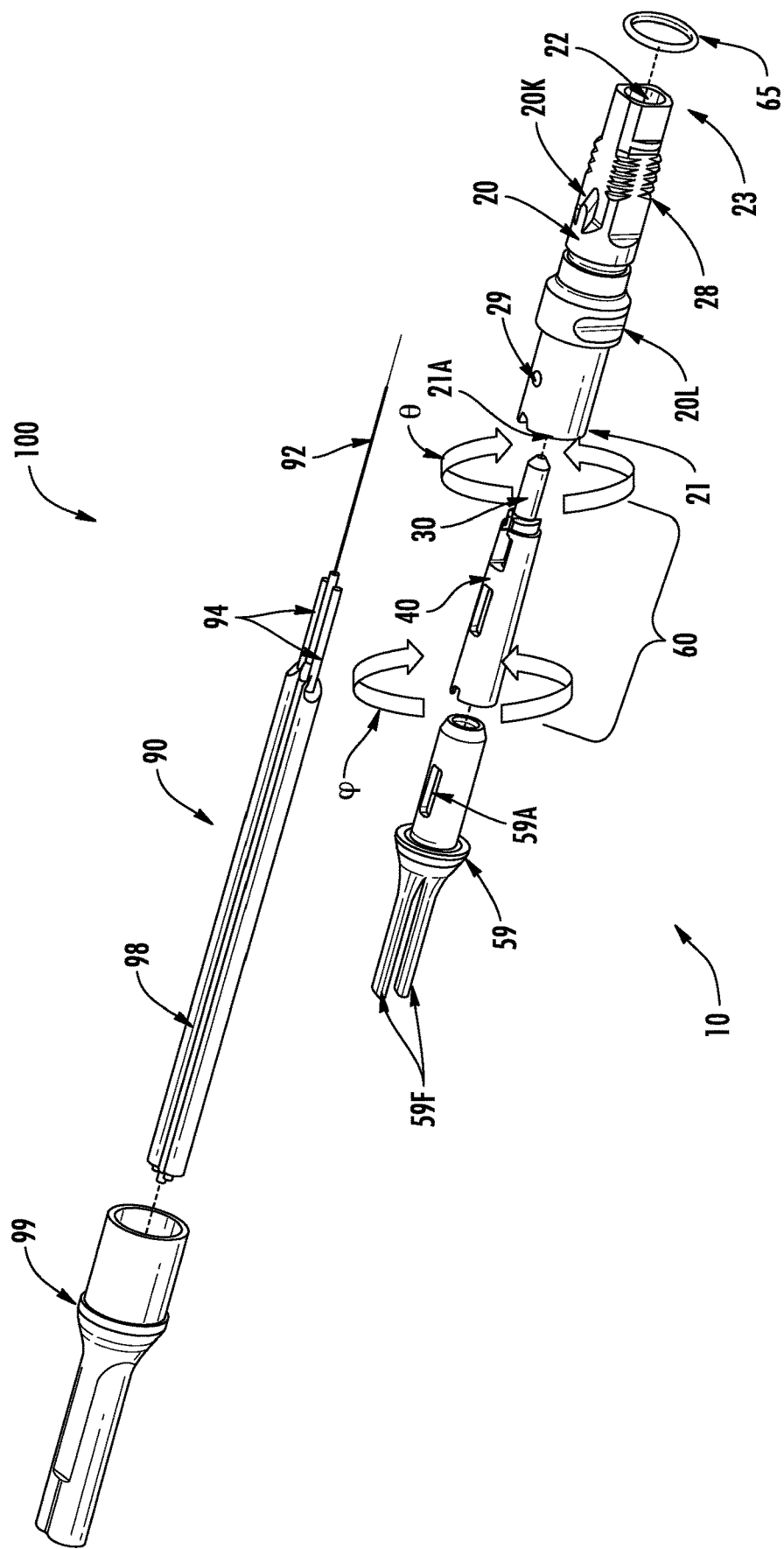
FIG. 3 is an exploded view of the fiber optic cable assembly of FIG. 2.

FIG. 2 is a perspective view and FIG. 3 is an exploded view of cable assembly 100 having connector 10 and a fiber optic cable 90 (hereinafter "cable"). FIGS. 15 and 16 are longitudinal sectional views of the cable assembly 100 of FIG. 2 showing details of the construction. FIG. 2A depicts cable assembly 100 having connector 10 with a housing 20 that is similar to the housing 20 for connector 10 of FIG. 2, but the housing 20 of FIG. 2A has a different transition region TR. Specifically, the housing 20 of FIG. 2A has a transition region TR with a threaded portion TP and may be used with the connector constructions disclosed herein as appropriate.

Connector 10 comprises housing 20 and a ferrule 30. Housing 20 comprises a rear end 21 and a front end 23 with a longitudinal passageway 22 extending from the rear end 21 to the front end 23. As best shown in FIG. 7, ferrule 30 comprises a fiber bore 32 extending from a rear end 31 to a front end 33. Passageway 22 allows one or more optical fibers of cable 90 to pass through the housing 20 for insertion into fiber bore 32 of ferrule 30 such as depicted in FIG. 7. Cable 90 comprises at least one optical fiber 92, one or more strength components 94 and a cable jacket 98.

Connector 10 or components of connector 10 as depicted in FIGS. 2, 2A, 3 and 5-17 allows ferrule 30 to be inserted into housing 20 from rear end 21 of housing 20. Specifically, ferrule 30 is inserted into an opening 21A at the rear end 21 of housing 20. Housing 20 depicted in FIG. 2A is similar to the housing 20 FIG. 2, except it has a different transition region (TR). Specifically, the transition region (TR) of the housing 20 of FIG. 2A comprises a threaded portion; otherwise the concepts of the connector are similar to the other disclosed herein. The thread portion (TR) allows the securing of an appropriate dust cap 70 and also allows for the conversion of the connector footprint such as to a hardened connector footprint such as shown in FIGS. 62-69. However, the concepts of the rear inserted connector constructions may be used with any suitable housing disclosed herein.

As depicted, connector 10 of FIG. 3 comprises housing 20, ferrule sub-assembly 60 and cable adapter 59. In this embodiment, ferrule 30 is a portion of ferrule sub-assembly 60. An opening 21A at the rear end 21 of housing 20 is sized for receiving a portion of ferule sub-assembly 60. Ferrule sub-assembly 60 is configured to cooperate with the housing 20 for inhibiting the rotation of the ferrule sub-assembly 60 with respect to housing 20 when assembled. However, ferrule sub-assembly 60 may be configured to allow rotation of ferrule 30 for tuning as represented by arrows and angle θ as desired before the ferrule sub-assembly 60 is fully-seated within housing 20 as discussed herein.

Ferrule sub-assembly 60 also comprises a ferrule carrier 40. Ferrule carrier 40 may have different configurations as disclosed herein. Ferrule 30 is tunable relative to housing 20 if desired and may have step-tuning in defined increments based on the ferrule geometry. However, other features or designs disclosed herein for the connectors may allow infinite tuning of the ferrule to any desired rotation position. Tuning ferrule 30 allows improved optical performance by turning the ferrule so that any eccentricity in the optical fiber, ferrule or connector is rotated to a known rotational position or quadrant in a uniform manner. Consequently, connectors or other mating devices can be tuned to similar relative rotational positions for improving optical performance such as reducing optical insertion loss of due to optical fiber core misalignment or the like as understood in the art. Embodiments disclosed herein may also have a plurality of interfaces between components for tuning of the connector as desired.

The design of connector 10 of FIG. 3 may also advantageously allow multi-stage tuning if desired. Ferrule 30 or other components/assemblies may be tunable in step increments such as by quadrants or be infinitely tuned as desired. By way of example, ferrule sub-assembly 60 may be may be configured to allow rotation of the sub-assembly with respect to cable adapter 59 (or other components) as desired for tuning ferrule 30 as represented by the arrows and angle φ as depicted. Moreover, multi-stage tuning may result in infinite tuning, which means that any desired rotational position desired for any eccentricity of the fiber core within the ferrule 30 is possible. The step or degree of tuning at different component interfaces may depend on the particular construction of the ferrule, ferrule carrier, cable adapter or housing with respect to the permitted of rotation and the possible increments of rotation for the components.

By way of example, a first-stage of tuning may be step-tuning by quadrant and a second-stage of tuning may be infinite tuning to allow infinite rotation as desired. More specifically, the first-stage step-tuning may be used for gross tuning of the eccentricity of the fiber core such as to the desired quadrant of the and then the second-stage provides infinite tuning by allowing the fine tuning of the eccentricity of the fiber core within the quadrant for precise rotational positioning. By way of explanation, infinite tuning may accomplished by having one or more components rotate through an angle of ±180 degrees without step increments, thereby allowing any rotational position for ferrule 30. Of course, other tuning schemes are possible using the concepts disclosed herein. Likewise, variations of ferrule carrier 40 or ferrule subassembly 60 are possible and disclosed herein for use with any suitable housing 20.

Connector 10 of FIG. 3 allows ferrule 30 to be rotated or tuned within the ferrule subassembly 60 as depicted. Ferrule 30 may be configured to rotate as a step rotation or infinite rotation depending on the particular design. For instance, ferrule 30 could have a selectively tunable surface 36 that is round for providing infinite rotational positioning or selectively tunable surface of ferrule 30 could comprise a plurality of planar surfaces 36 for step tuning by only allowing certain rotation positions. Moreover, infinite tuning of ferrule 30 may be accomplished by tuning or rotating though an angle θ of ±180 relative to the ferrule carrier 40 if desired. Being able to rotate one or more components in either direction allows for flexibility in tuning and inhibits excessive twisting of the optical fiber, which is generally undesirable.

Connector 10 of FIG. 3 also allows ferrule carrier 40 to be rotated for tuning the ferrule relative to housing 20 as depicted. In this embodiment, ferrule carrier 40 is tunable relative to the housing 20 by way of the rotational position of ferrule carrier 40 relative to cable adapter 59 or rotational position of the cable adapter 59 with respect to the housing. Specifically, ferrule carrier 40 may be tunable though an angle φ of ±180 relative to the housing 40 or in step-increments such as using ferrule carrier rotational key 41K (FIG. 5) or the like as desired. For instance, a ferrule carrier rear end 41 may have one or more keys for cooperating with cable adapter 59 and only allowing certain positions for tuning, or the ferrule carrier rear end 41 may simply cooperate with the cable adapter 59 for providing infinite rotational positions for tuning. The details of tuning will be discussed in more detail below.

Likewise, it is possible for connector 10 of FIG. 3 to have to a third interface for tuning. Specifically, the cable adapter 59 may be tunable relative to the rear end 21 of housing 20. Like the ferrule carrier rear end 41, a flange portion (not numbered) of cable adapter 59 may have one or more keys for cooperating with the rear end 21 of housing 20 and only allowing certain positions for tuning, or the flange portion of cable adapter 59 may simply cooperate with the rear end 21 of housing 20 for providing infinite rotational positions for tuning. Thus, connector 10 of FIG. 3 provides several different tuning options for manufacturing depending on the desired requirements for the connector.

Figure 4:
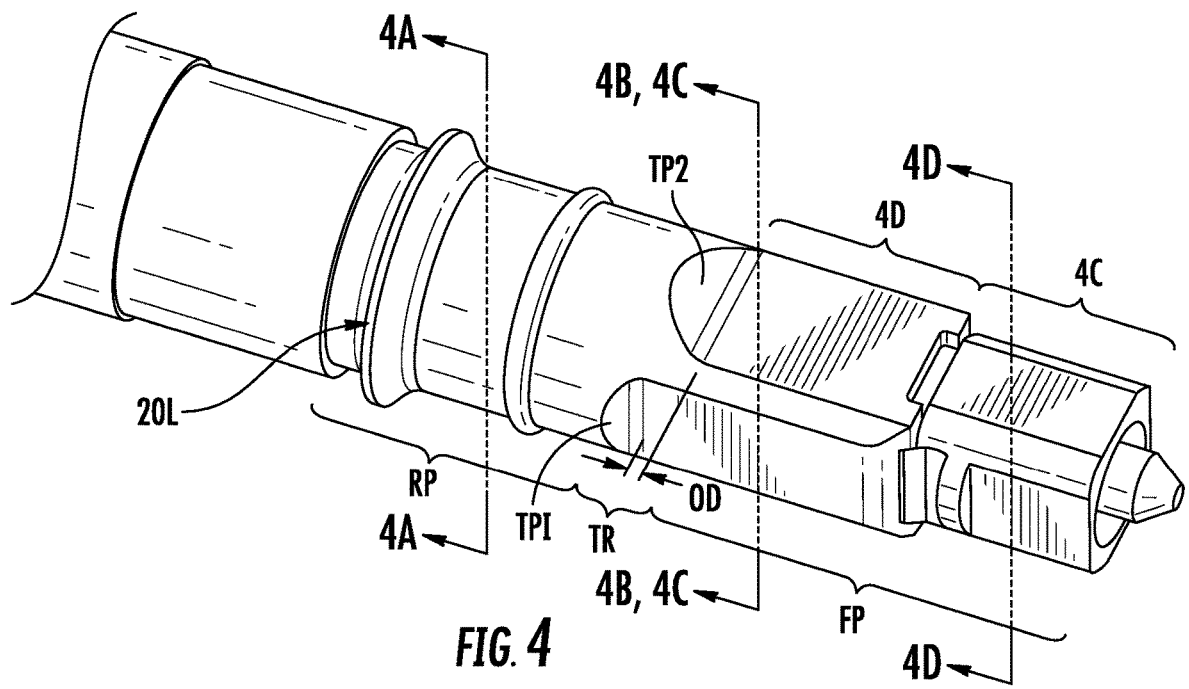
FIG. 4 is a close-up perspective view of a fiber optic connector having a housing that is similar to the housing of FIG. 2 and depicting geometric features of the housing according to one aspect of the disclosure.
Figure 4A:
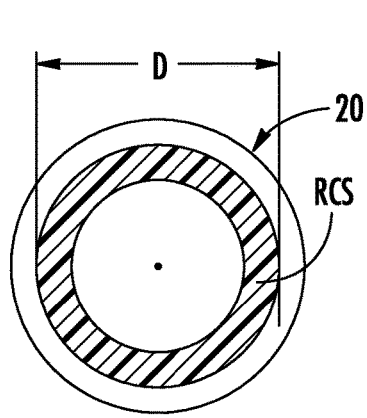
FIGS. 4A-4D are respective cross-sectional views of the housing of FIG. 4 taken along respective planes defined by lines 4A-4A, line 4B-4B, line 4C-4C and line 4D-4D.
Figure 4B:
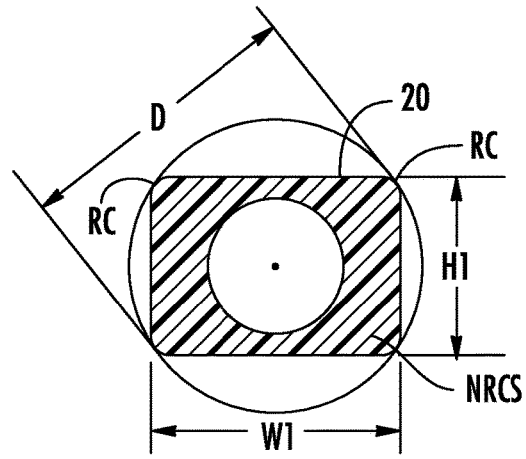
Figure 4C:
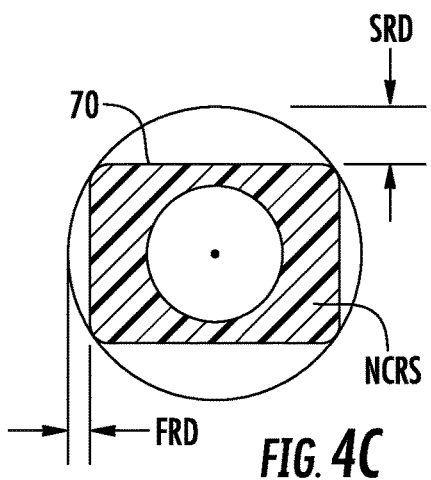
Figure 4D:
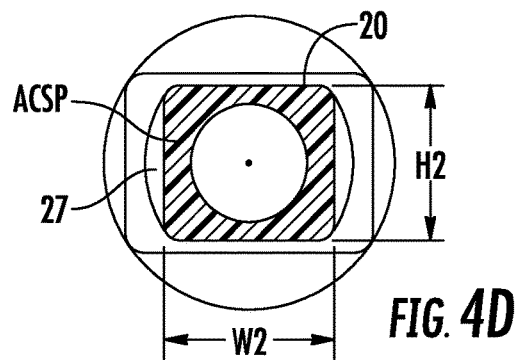
Figure 4E:
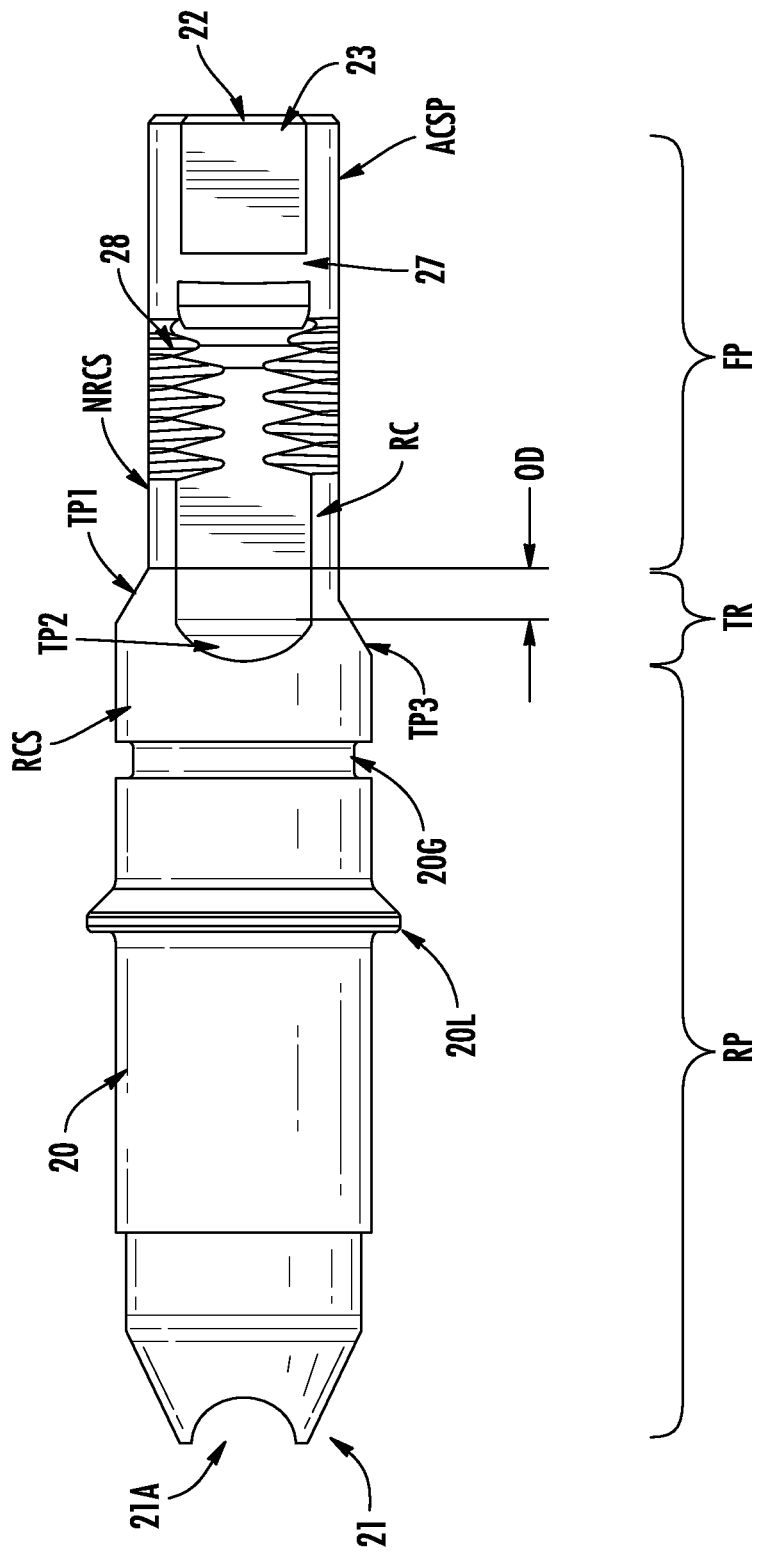
FIG. 4E is a side view of an explanatory housing that is similar to housing shown in the fiber optic connector FIG. 4 and further include threads that are discontinuous on the front portion.

FIGS. 4-4E depict an explanatory housing 20 for connectors and will be described in further detail to explain concepts and geometry of housings 20 suitable for use with connector concepts disclosed herein. Although the housing of FIG. 4 is a close-up perspective view of connector 10 having a different construction than the housing 20 depicted in FIGS. 2 and 3, the housing 20 of FIG. 4 is similar to housing 20 of the connector of FIGS. 2 and 3. Generally speaking, the footprint of housing 20 of FIG. 4 may be used with connector constructions that insert the ferrule 30 from the rear end 21 of housing 20 or connector constructions that insert the ferrule 30 from the front end 23 of housing with appropriate modification(s) for the connector construction. By way of explanation, the longitudinal passageway 22 of the housing 20 may need to be modified for the different connector constructions as appropriate.

Connectors 10 disclosed herein may use any suitable housing 20 with the desired footprint or construction. The disclosure describes several different housings that may be used with connector constructions as appropriate and other variations are also possible. FIG. 4 depicts housing 20 and connectors 10 may use a variety of different variations of the housing shown in FIG. 4 or other housings such as the housing 20 shown in FIG. 54 which has the locking feature on a separate component. Likewise, housing 20 may comprise one or more features for alignment during mating and may also comprise other features for securing or locking the connector in a suitable complimentary port or device. Housing 20 has a relatively compact form-factor such as having a length L of about 40 millimeters (mm) or less and a cross-section dimension of about 15 mm or less such as 12 mm or less, but other suitable dimensions are possible for the housing.

FIGS. 4A-4D are respective cross-sectional views of the housing of FIG. 4 taken along respective planes defined by line 4A-4A, line 4B-4B, line 4C-4C and line 4D-4D. Lines 4B-4B and 4C-4C are taken at the same cross-section. FIG. 4E is a side view of housing 20 that is similar to housing 20 shown in FIG. 4, but further includes threads 28 like housing 20 depicted in FIGS. 3 and 4. Threads 28 are disposed on the front portion FR of housing 20 and are discontinuous.

Housing 20 comprises the rear end 21 and the front end 23 with a longitudinal passageway 22 extending from the rear end 21 to the front end as shown in FIG. 4E. Housing 20 of FIGS. 4A-4E comprises a part of the rear portion RP having a round cross-section RCS and a part of the front portion having a non-round cross-section NRCS. Transition region TR is disposed between the rear portion RP and the front portion FP of housing 20. Transition region TR comprises a first transition portion TP1 disposed on a first side of the housing and a second transition portion TP2 disposed on a second side of the housing. In this version, the first transition portion TP1 and the second transition portion TP2 are spaced apart by an offset distance OD in the longitudinal direction of the housing 20 as best shown in FIG. 4E. The offset distance OD for the transition portion TP is useful since it allows connector only to fully-seat into complimentary devices or ports having the matching geometry. However, other housings 20 for connectors disclosed herein may omit the offset distance if desired.

Housings 20 may also have suitable features or structures for sealing connectors 10. The sealing plane should be located at a suitable location along the housing 20 for providing suitable environmental protection as necessary for the desired environment. Illustratively, housing 20 may include one or more grooves 20G for receiving an appropriately sized O-ring 65. Housings 20 may include other feature or structures for aiding in sealing. For instance, the housing 20 may have a suitable surface for receiving a portion of a heat shrink 99 or the like for sealing between a portion of the cable 90 and the connector 10. Any suitable heat shrink 99 may be used such as a glue-lined heat shrink. Moreover, other structures or features are possible for aiding in providing a robustly sealed cable assembly 100.

As used herein, the transition region TR is disposed between the rear end 21 and the front end 23 where the housing 20 makes a transformational shift in the primitive cross-sectional shapes from a part of a rear portion RP to a part of the front portion FP. As used herein, a primitive cross-section means the outer perimeter of the cross-section without regard for the internal features of the cross-section. Further, portions of the cross-sections may include other features that modify the shape of the primitive cross-sections as desired such as a keying feature, retention feature or a locking feature, while still practicing the concepts of the transition region TR or front/rear portions as disclosed herein. For instance, a front portion FP may have rounded corners or chamfered corners while still being a rectangular cross-section.

In this embodiment of housing 20, the front portion FP of housing 20 has a rectangular cross-section that provides a first orientation feature for the connectors for alignment during mating and inhibit insertion into a non-compliant device or port. The non-round cross-section NRCS has the rectangular cross-section with a width W1 and a height H1 as shown in FIG. 4B. The rectangular cross-section provides the first orientation feature since the rectangular portion may only be inserted into a complimentary device or port in certain orientations due to its rectangular shape, thereby inhibiting incorrect insertion or insertion into non-compliant devices or ports.

As best shown in FIG. 4C, housing 20 of FIGS. 4A-4E has the first transition portion TP1 that comprises a first riser dimension FRD from the non-round cross-section NRCS to the round cross-section RCS, and the second transition portion TP2 comprises a second riser dimension SRD from the non-round cross-section NRCS to the round cross-section RCS, where the first riser dimension FRD is different that the second riser dimension SRD. The riser dimensions are measured perpendicular from the mid-point of the cord defined by the surface of non-round cross-section NCRS as shown in FIG. 4C to the outer surface of the round cross-section RCS.

The geometry of housing 20 of FIGS. 4A-4E also comprises the non-round cross-section NRCS comprising a rectangular cross-section having rounded corners RC, and the rounded corners RC are sized so they have a similar outer dimension OD as a dimension D for the round cross-section RCS. The rounded corners (RC) may provide stability and snug fit for the mated connector 10 within a port or device when side-pull forces are experienced to inhibit undue optical attenuation by having the round corners transition between the front portion FP to the rear portion RP.

The front portion FP of housing 20 depicted has more than one primitive cross-sectional shape over its length. Specifically, the front portion FP of housing 20 of FIGS. 4-4E also comprises another cross-section portion ACSP. By way of explanation, the another cross-sectional portion (ACSP) may comprise a SC footprint. The SC footprint can, in part, be similar to the inner housing of a conventional SC connector. This particular housing footprint is useful for allowing the connectors disclosed to be backwards compatible into existing devices or ports using well-established connector footprints as desired. Other embodiments may have connectors configured for LC connector or other known connector footprints as desired.

As best shown in FIGS. 4 and 4O, the front portion FP of housing 20 may comprise another cross-section portion ACSP with a primitive cross-section that is different than the non-round cross-section NRCS depicted in FIG. 4O. More specifically, the non-round cross-section NRCS changes to another cross-section portion ACSP as shown. As depicted in FIG. 4D, the another cross-section portion comprises a rectangular cross-section with a width W2 that is less than W1 and a height H2 is similar to height H1. By way of example, height H2 may be equal to height H1. In one embodiment, the another cross-section portion ACSP has a primitive cross-section that is similar to a cross-section near a front end of a SC connector.

Figure 71:
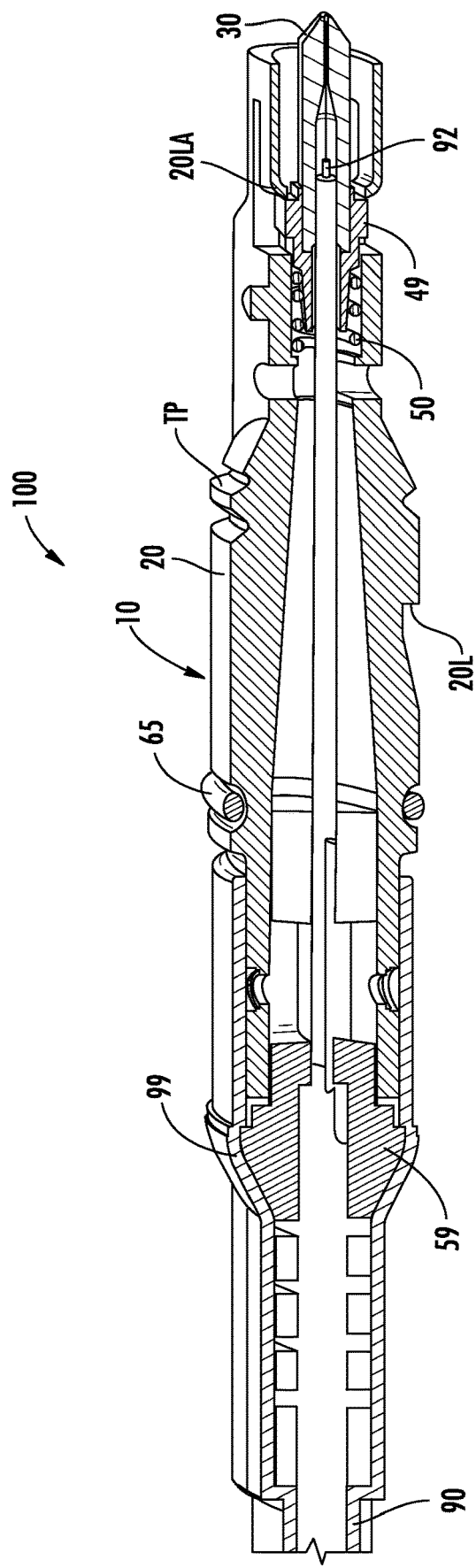

Likewise, the rear portion RP may have more than one primitive cross-section shape over its length as desired. Moreover, rear portion RP may include one or more retention features or locking features that alter or modify the cross-section. For instance, housing 20 may also include locking feature 20L so that the connector may secured in an adapter, port or other suitable device. For instance, locking feature 20L may comprise features integrated into the housing such as one or more of a groove, a shoulder such as shown in FIG. 4E and FIG. 45, a scallop such as shown in the housing 20 of FIG. 3, a reverse bayonet such as depicted in FIG. 44, or a ramp with a ledge such as shown in FIG. 71. In these examples, the locking features 20L advantageously are integrated into the housing 20 and do not require extra components and may be used with any of the disclosed concepts. In some embodiments, the locking features 20L are subtractive portions from the primitive geometry of the rear portion RP such as a notch in the round rear portion RP. Consequently, having the locking features integrated into the housing 20 (e.g., monolithically formed as part of the housing) may allow denser arrays of connectors in complimentary devices. Moreover, these locking features integrated into the housing 20 are rearward of the sealing location of connectors 10. For example, the integrated locking features of housing 20 are disposed rearward of at least one groove 20G that seats O-ring 65. Locking feature 20L may cooperate with features of a complimentary mating device for securing the mating of the connector 10 with the complimentary mating device.

Housing 20 may also have features that aid in the proper alignment or orientation of the connector with the complimentary device such as markings, keys, keyways, etc. without changing the primitive form-factors of the housings that are disclosed and claimed herein. Additionally, housing may have other features for mating with a complimentary device or threads for securing a dust cap. FIG. 2 is a perspective view of connector 10 with a housing 20 similar to the housing 20 depicted in FIG. 4, but it further includes threads 28 and keying feature 20K. FIGS. 25 and 26 depict a fiber optic connector similar to FIG. 20 having an alternative housing 20A that may be used with any suitable fiber optic connector disclosed herein. Housing 20 further comprises a keying feature 20K. Keying feature 20K has a predetermined location with respect to an orientation of housing 20 for aligning the form-factor of the housing with a respective mating device. For instance, the housing 20 or keying feature 20L provides a proper orientation for connection in one orientation, which may be desired for connectors having angled ferrules. In this embodiment, keying feature 20K ensures correct rotational orientation of the connector 10 during insertion and mating with another device.

Figure 39:
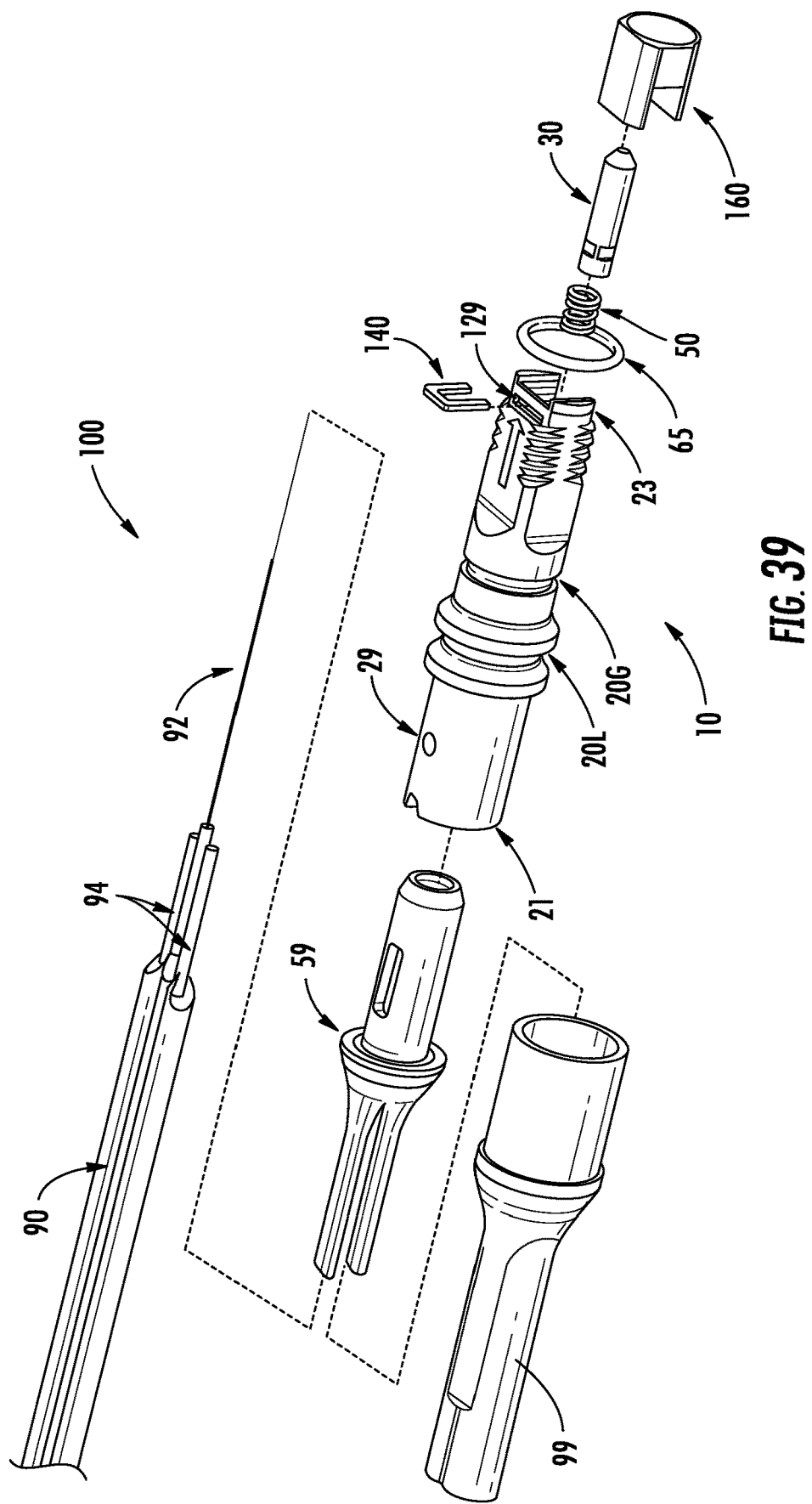
FIG. 39 is an exploded view of the cable assembly of FIG. 37.
Figure 40:
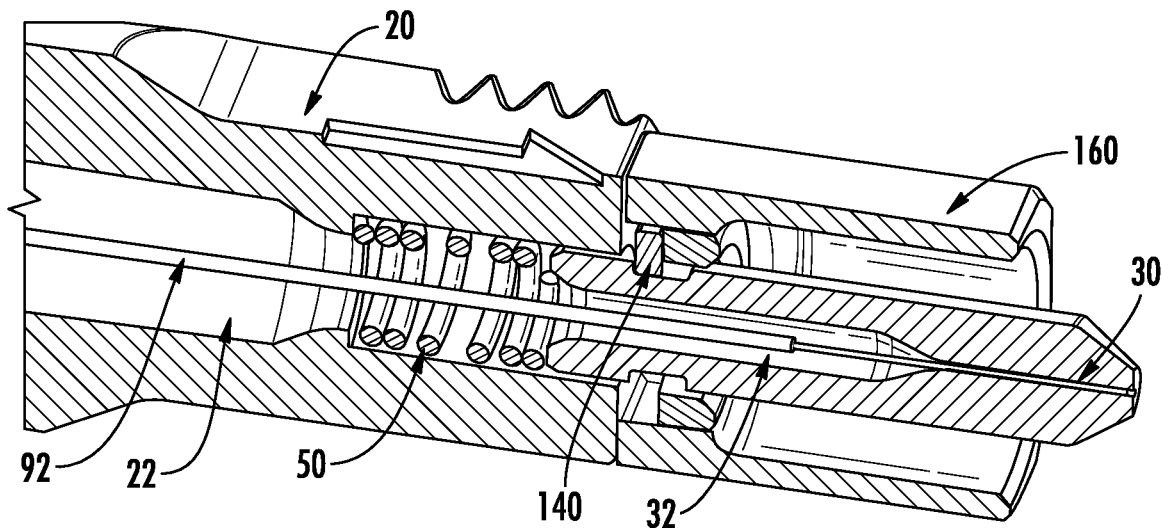
FIG. 40 is a front end sectional view of the fiber optic connector of FIG. 37 showing the nosepiece attached to the front end of the housing.

In this particular embodiment, housing 20 is monolithically formed; however, other embodiments could have designs where the housing was formed from one or more components as desired. Housing 20 having a plurality of components could be assembled by snap-fitting, adhesive, welding or the like. Illustratively, FIGS. 39 and 40 depict a housing 20 having a plurality of components.

Figure 5:
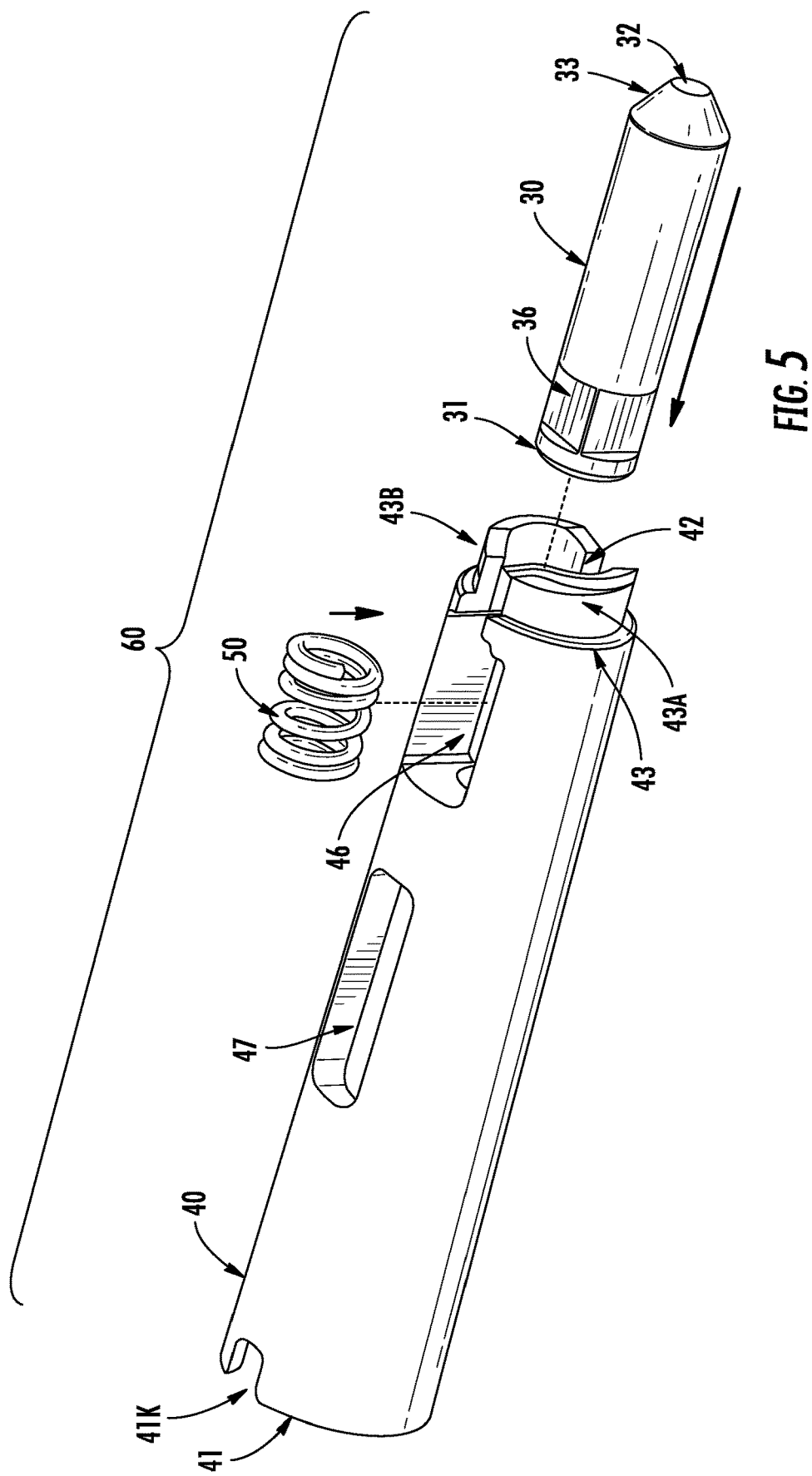
FIG. 5 is an exploded view of a ferrule subassembly of the fiber optic connector of FIG. 3.

Returning to the description of connector 10 of FIG. 3 and its components, FIG. 5 is an exploded view of ferrule subassembly 60 shown in connector 10 of FIG. 3. Ferrule subassembly 60 may have several different constructions as depicted herein and still practice the concepts disclosed. For instance, ferrule subassemblies 60 may use different ferrule carrier 40 constructions such as disclosed or desired while still practicing the concepts disclosed.

Ferrule 30 is a portion of ferrule subassembly 60. In these embodiments, an opening 21A at the rear end 21 of the housing 20 is sized for receiving a portion of the ferrule subassembly 60. When assembled, the ferrule subassembly 60 is configured to cooperate with the housing 20 for inhibiting the rotation of the ferrule subassembly 60 with respect to the housing 20. For instance, the ferrule subassembly may have a friction fit or interlocking structure that cooperates with the passageway 22 of the housing 20 that inhibits rotation of the ferrule subassembly 60 with respect to housing 20. However, in other embodiments the ferrule subassembly 60 may be free to rotate for tuning or the like until the ferrule subassembly 60 is fixed in position relative to housing 20 such as with an adhesive or the like.

As depicted in FIG. 5, ferrule subassembly 60 comprises a ferrule carrier and a resilient member 50. Some embodiments of the ferrule subassembly 60 may omit the resilient member 50 and not bias the ferrule 30 forward. If a resilient member 50 is used, ferrule carrier 40 may further comprise a resilient member pocket 46 as shown. As depicted, the resilient member pocket 46 may be configured for receiving the resilient member 50 in a direction transverse to a longitudinal direction of the ferrule carrier 40 (e.g., transverse to the optical fiber passageway) as represented by the arrow.

As shown in FIG. 5, ferrule carrier 40 comprises a ferrule carrier rear end 41, a ferrule carrier front end 43 and a ferrule carrier passageway 42 extending from the ferrule carrier rear end 41 to the ferrule carrier front end 43, where the ferrule carrier passageway 42 comprises a fiber buckling zone 47. The fiber buckling zone allows the optical fiber 92 to have room to move rearward during mating without causing undue optical attenuation. In other words, during mating the ferrule 30 may be pushed rearward slightly cause the optical fiber 92 of the cable 90 to deflect and in order to inhibit optical attenuation the fiber buckling zone 47 provided for allowing fiber movement.

Ferrule carrier 40 may have several different designs. In one embodiment, the ferrule carrier comprises a ferrule carrier front end 43 with the ferrule carrier front end 43 comprising at least one cantilevered portion such as shown in FIG. 10. Generally speaking, the at least one cantilevered portion extends from a medial portion of the ferrule carrier and allows the assembly of the ferrule 30 into the ferrule carrier 40. The at least one of the first cantilevered portion 43A may also be configured to cooperate with the housing 20 for inhibiting the rotation of the ferrule 39 with respect to the housing 20 when the ferrule subassembly 60 is fully-seated in the housing 20, and allow rotation of the ferrule 30 for tuning when the ferrule subassembly 60 is not seated in the housing 20.

By way of explanation and example, the front portion of the longitudinal passageway 22 of housing 20 may be sized for snuggly fitting to shoulders 43S disposed on the ferrule carrier front end 43 so that one or more of the cantilevered portions either squeeze the ferrule 30 and inhibit rotation or inhibit the deflection of the at least one cantilevered portion so that the ferrule 30 is inhibited from rotating beyond its desired location. However, the ferrule carrier 40 still allows the ferrule 30 to "float" to the desired degree so it can translate such as in the rearward direction (i.e., z-direction) or X-Y directions for allowing the ferrule to move slightly to the desired location for precise alignment during mating. For instance, the ferrule 30 is biased and may "float" on the resilient member.

Figure 17:
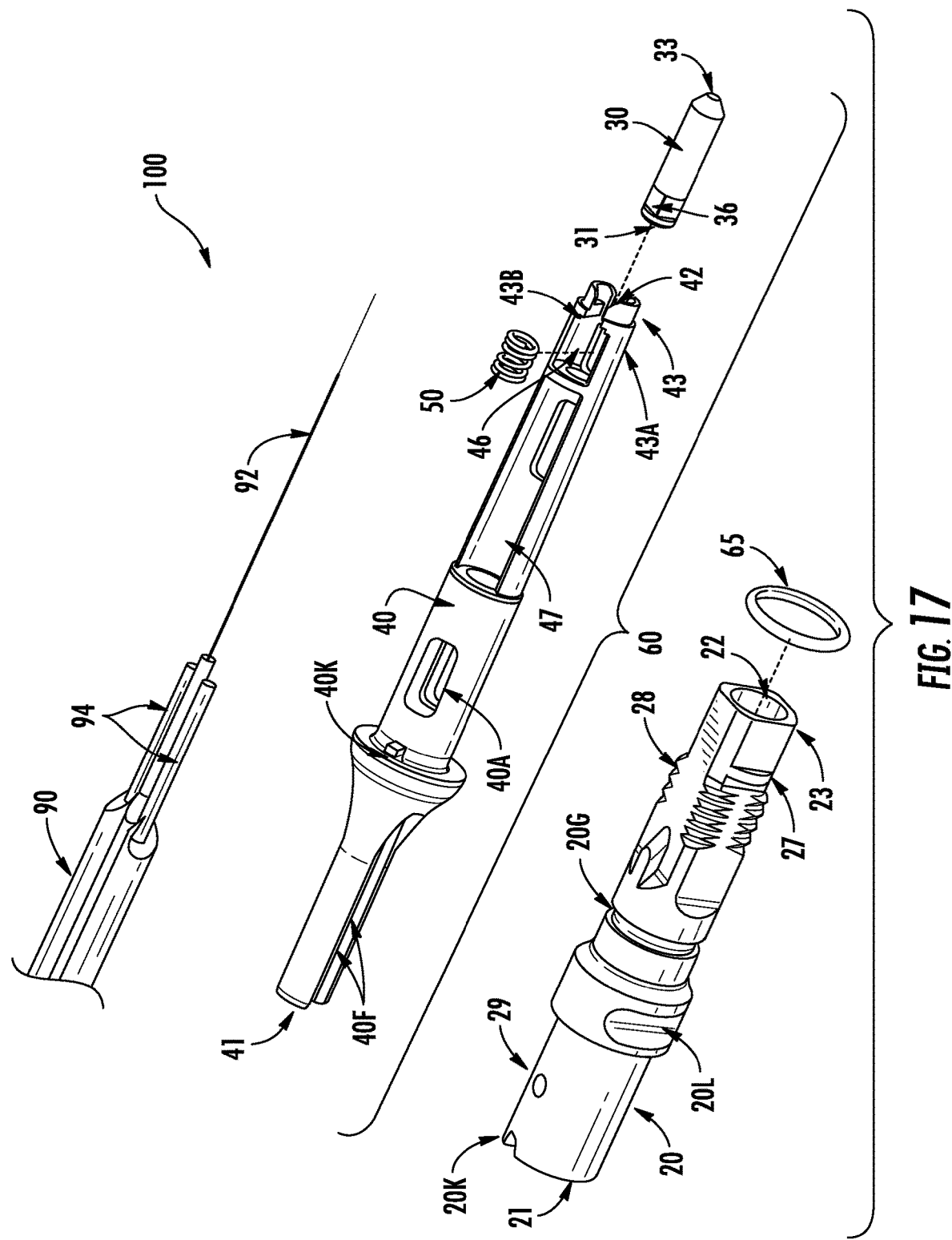
FIG. 17 is an exploded view of another fiber optic cable assembly that is similar to the fiber optic cable assembly of FIG. 2 with a fiber optic connector having a different ferrule subassembly.
Figure 21:
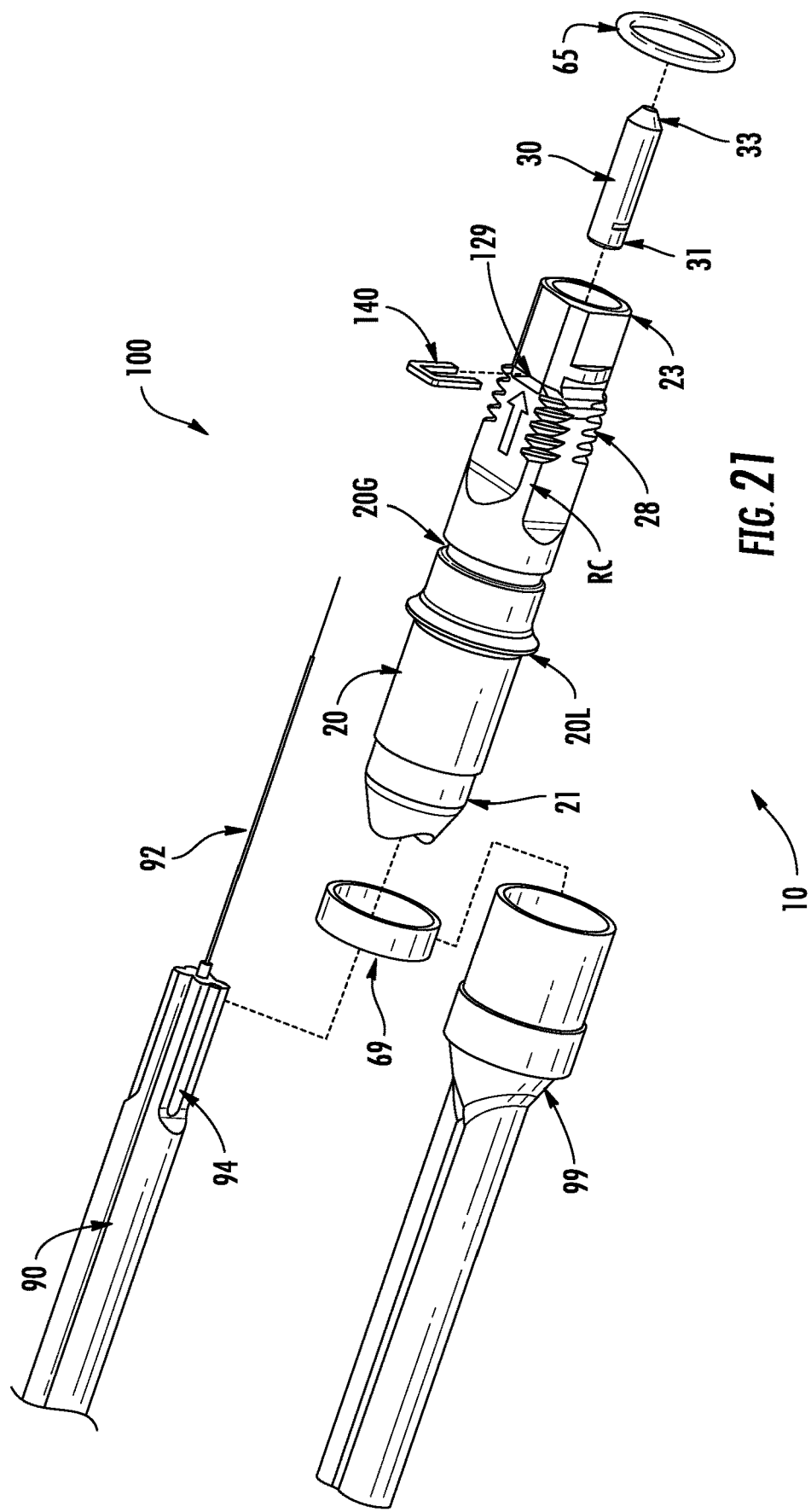
FIG. 21 is an exploded view of another fiber optic cable assembly similar to that of FIG. 19 with a fiber optic connector having a housing having threads that are discontinuous according to another aspect of the disclosure.

The use of the ferrule carrier described herein should not be confused with a ferrule holder that fixes a conventional ferrule directly to the ferrule holder so there is no appreciable movement between the ferrule and the ferrule holder. Conventional connectors allow the entire assembly of the ferrule holder/ferrule to be biased by a spring. On the other hand, embodiments such as depicted in FIG. 3, FIG. 17 and FIG. 21 allow the ferrule to float without using a ferrule holder. Moreover, the use of the ferrule holder/ferrule assembly is another component interface where stack-up of tolerances may exist and impact geometry. Consequently, connectors disclosed herein may eliminate the conventional ferrule holder along with the expense and manufacturing time required by using a conventional ferrule holder.

Figure 8:
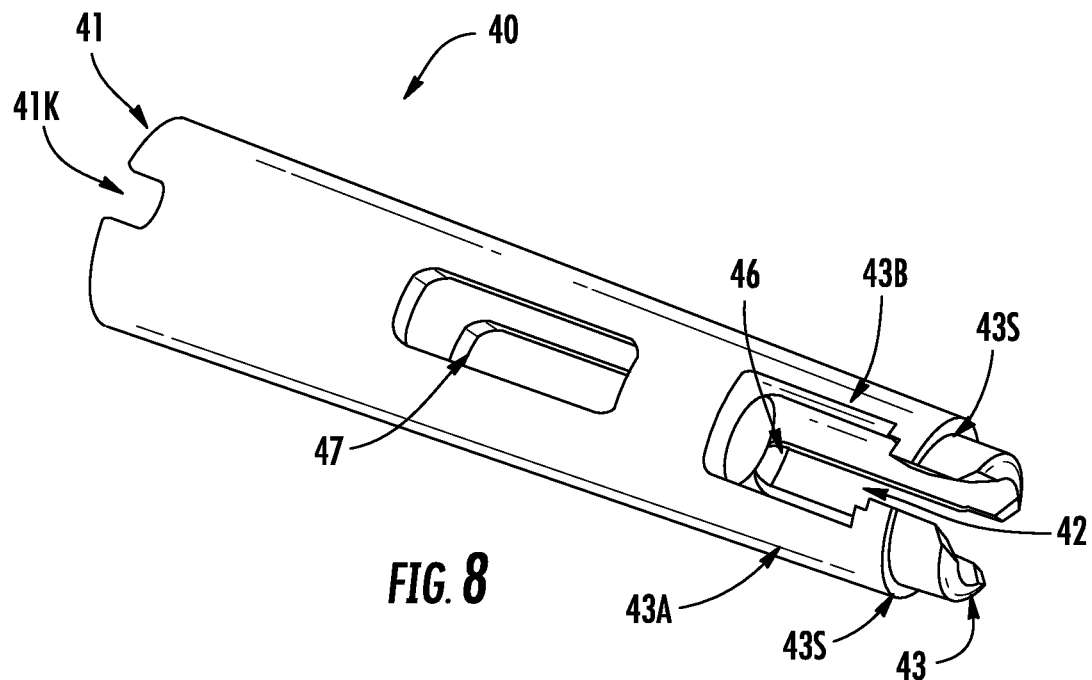
FIG. 8 is a perspective view of the ferrule carrier of the ferrule subassembly of FIG. 3.
Figure 9:
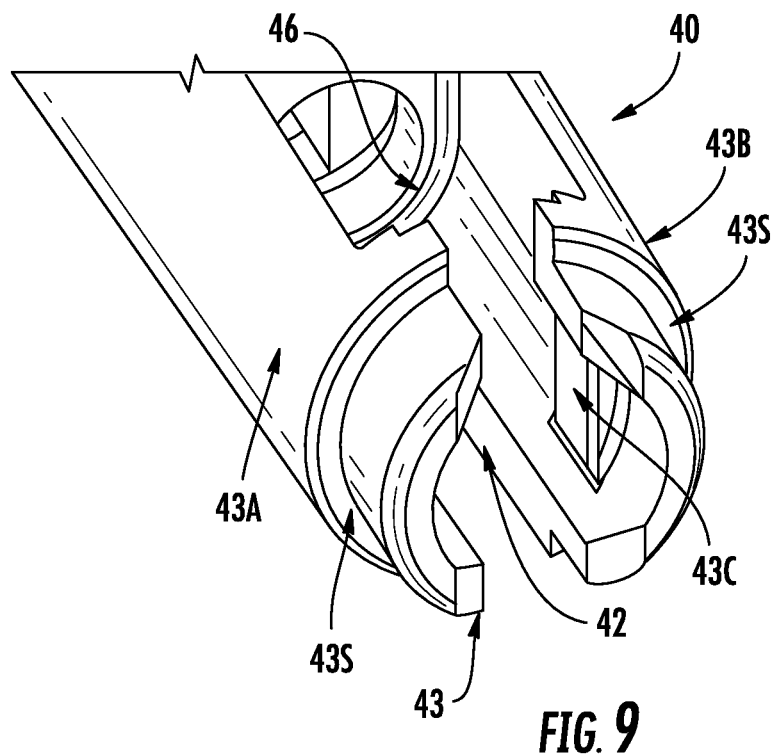
FIG. 9 is a close-up perspective view of the front end of the ferrule carrier of FIG. 8.

FIG. 5 depicts the ferrule carrier front end 43 comprising a first cantilevered portion 43A and a second cantilevered portion 43B. FIGS. 6 and 7 are longitudinal sectional views of ferrule subassembly 60 of FIG. 3 showing details of the design and assembly. FIGS. 8 and 9 respectively are a perspective view and close-up perspective view of ferrule carrier 40 of FIGS. 5-7 depicting details of the ferrule carrier.

In this embodiment, at least one of the first cantilevered portion 43A or the second cantilevered portion 43B are configured to cooperate with the housing 20 for inhibiting the rotation of the ferrule 30 with respect to the housing 20 when the ferrule subassembly 60 is fully-seated in the housing 20, and allow rotation of the ferrule 30 for tuning when the ferrule subassembly is not seated in the housing 20. By way of explanation, ferrule carrier front end 43 of FIG. 5 may be sized to cooperate with the housing 20 by fitting into a passageway 22 that inhibits the cantilevered portions 43A,43B from deflecting outwards, thereby inhibiting the rotation of the ferrule 30 with respect to the ferrule carrier 40 when the ferrule carrier front end 43 is fully-seated in the housing 20 since some of the selectively tunable surfaces 36 (in this case the planar surfaces 36S) of ferrule 30 cooperate with ferrule retention structure 43C of the ferrule carrier 40.

Ferrule subassembly 60 is assembled by placing the resilient member 50 into the resilient member pocket 46 by inserting the spring in the transverse direction to the ferrule carrier passageway as best shown in FIG. 5. Ferrule carrier 40 of FIG. 5 allows ferrule 30 to be inserted from the ferrule carrier front end 43 as represented by the arrow. As ferrule 30 is inserted into the ferrule carrier front end 43 the first cantilevered portion 43A and the second cantilevered portion 43B deflect outward as represented by the arrows shown in FIG. 6. As the ferrule 30 is seated in the ferrule carrier front end 43 the first cantilevered portion 43A and the second cantilevered portion 43B spring back toward their original positions to capture the ferrule 30. As best shown in FIGS. 7 and 9, one of the first cantilevered portions 43A or the second cantilevered portions 43B comprise a ferrule retention structure 43C. Consequently, when the first and second cantilevered portions 43A,43B are inhibited from deflecting, then ferrule 30 is inhibited from rotating such as when the ferrule subassembly 60 is fully-seated within housing 20. However, when the first and second cantilevered portions 43A, 43B are allow to deflect outwards such as shown in FIG. 6, then the ferrule 30 may be rotated thru any desired angle θ for tuning.

Further, the rear end of ferrule carrier 40 may have other features that allow tuning if desired. For instance, ferrule carrier rear end 41 may have a ferrule carrier groove 41G or shoulder for cooperating with the cable adapter 59, thereby allowing rotation between the two components in either step increments or infinite increments as desired and discussed herein. By way of example, ferrule carrier 40 may comprise one or more ferrule carrier rotational keys 41K to allow rotational step increments or the ferrule carrier 40 may omit ferrule carrier rotational keys 41K and allow infinite rotational positions relative to the cable adapter 59, which may be keyed to the rear end 21 of housing 20. Ferrule carrier 40 may be attached to cable adapter in any suitable manner such as adhesive, welding, mechanical fitment, etc.

Other embodiments may integrate the ferrule carrier 40 and cable adapter 59 into a monolithic component. However, using separate cable adapter 59 allows the connectors 10 to be adapted to different cables such as round, flat, different sizes by merely selecting the appropriate sized cable adapter 59 for the desired cable type. Additionally, cable adapter may include one or more flexures 59F at the rear portion for providing cable bending strain-relief if desired instead of using a conventional boot. The flexures as depicted are suitable for flat cables that have a preferential bend-characteristic.

Again, the connectors disclosed herein may allow the ferrule 30 to have a small amount of "float" within ferrule carrier or housing without using a ferrule holder like conventional fiber optic connectors. Conventional connectors mount the ferrule within a ferrule holder in a fixed position and then typically the ferrule holder is biased by a spring. On the other hand, some of the connector designs disclosed by the present application have the resilient member 50 directly bias the ferrule, which eliminates parts and also allows more flexibility for ferrule selection or tuning. Moreover, the ferrule may be tuned relative to the ferrule carrier or the housing depending on the connector design. Further, the high precision geometry ferrule holder is eliminated along with the tolerance stack-up using a conventional connector with a ferrule holder. However, the housings concepts disclosed herein may be used with connectors having ferrule holders such as disclosed in FIGS. 70-78.

Ferrule retention structure 43C is configured to cooperate with geometry on ferrule 30. Specifically, ferrule 30 depicted in FIG. 5 has at least one selectively tunable surface 36 that cooperates with the ferrule retention structure 43C. Ferrule retention structure 43C is sized for snugly-fitting to one or more selectively tunable surfaces 36 of ferrule 30 as shown in FIG. 7. However, when the ferrule carrier 40 is not seated in housing 20, the ferrule 30 may be rotated within ferrule carrier 40 about an angle θ for optically tuning the assembly. Ferrule 30 may have a round selectively tunable surface 36 for infinite tuning, but that requires a tight fit between the ferrule carrier front end 43 and the appropriate portion of the passageway 22 of the housing 20. If the ferrule 30 uses selectively tunable surfaces 36 comprising a plurality of planar surfaces 36S, then the appropriate portion of the passageway 22 merely has to inhibit deflection of the at least one cantilever arm so that the ferrule 30 is inhibited from rotation when fully assembled. FIGS. 8 and 9 depict detailed views of the ferrule carrier 40 of FIG. 5. As depicted, the first and second cantilevered portions 43A,43B of ferrule carrier 40 may have stepped down portions forward of shoulder 43S, thereby allowing robust seating and inhibiting of deflection of the cantilevered arms 43A,43B.

Ferrule 30 may have any suitable number of plurality of planar surfaces 36S as desired. By way of explanation, four planar surface 36S allows quadrant tuning and further planar surfaces allows finer tuning in a first-stage. However, ferrules 30 may have any number of planar surfaces as desired such as six or eight planar surfaces to increase the number of steps for tuning the ferrule. Generally speaking, quadrant tuning is sufficient and if coupled with an infinite second-stage tuning interface, then the connector advantageously may be tuned to any desirable rotational position in a quick and easy manner during manufacturing.

FIG. 10 is a perspective view of an alternative ferrule carrier 40' that may be used in the ferrule subassembly 60 and FIGS. 11 and 12 respectively are a partially exploded view and an assembled view of the alternative ferrule carrier 40' in ferrule subassembly 60. This ferrule carrier 40' is similar to ferrule carrier 40, but only has first cantilevered arm, and requires loading of the ferrule 30 from the transverse direction like the resilient member 50. Ferrule 30 may still be rotated with respect to ferrule carrier 40', but it may require a slightly larger rotational force to deflect the U-shaped portion or a slightly upward translation of the ferrule 30 to help reduce the rotational force required for the rotation.

Figure 13:
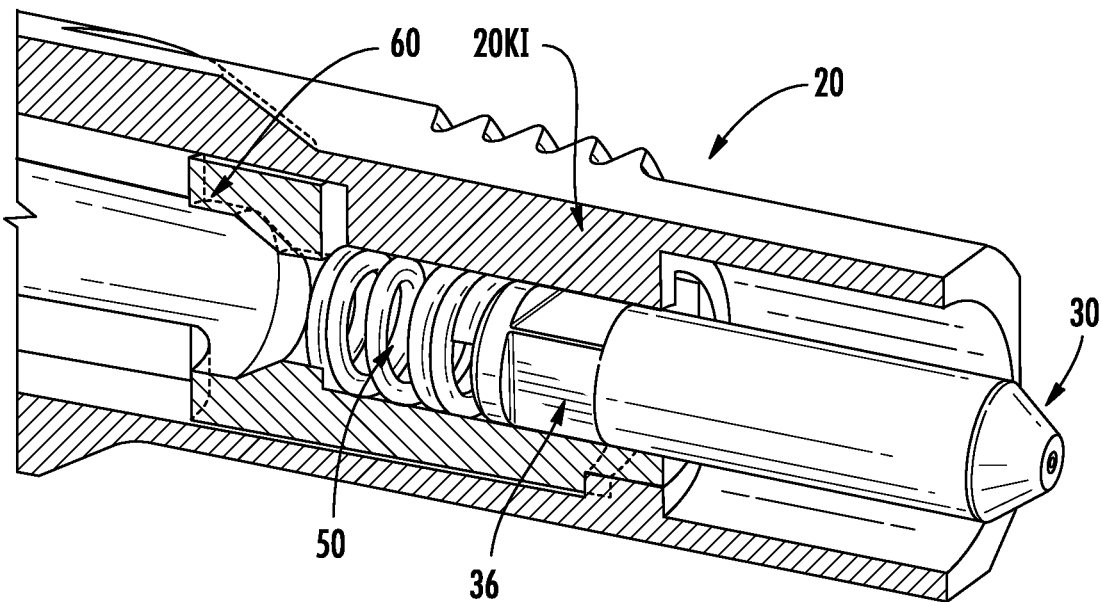
FIGS. 13 and 14 respectively are a partial sectional view and a cross-sectional view of the alternative ferrule carrier of FIGS. 10-12 depicted assembled in a housing of a fiber optic connector.
Figure 14:
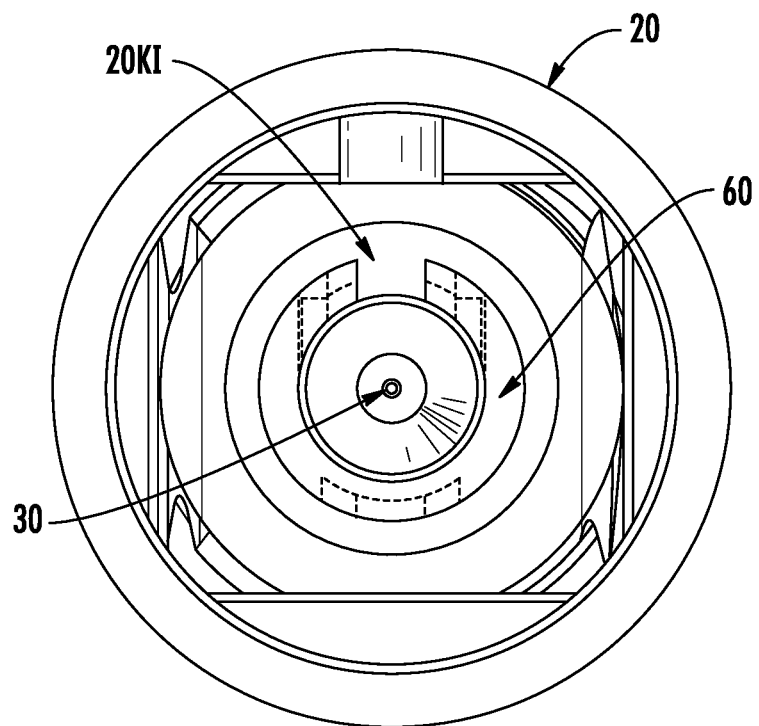

FIGS. 13 and 14 respectively are a partial sectional view and a cross-sectional view of the alternative ferrule carrier 40' of FIGS. 10-12 depicted assembled into ferrule subassembly 60 and disposed in housing 20 of fiber optic connector. As depicted, the passageway 22 of housing 20 may include different geometry for seating the ferrule subassembly 60 within the housing and inhibiting the rotation of ferrule 30 relative to the housing 20 using the alternative ferrule carrier 40'. As depicted, housing 20 comprises a passageway 22 with an internal key 20KI that cooperates with the U-shaped portion of the alternative ferrule carrier 40'. Consequently, the alternative ferrule carrier is inhibited from further rotation with respect to the housing 20.

Figure 18:
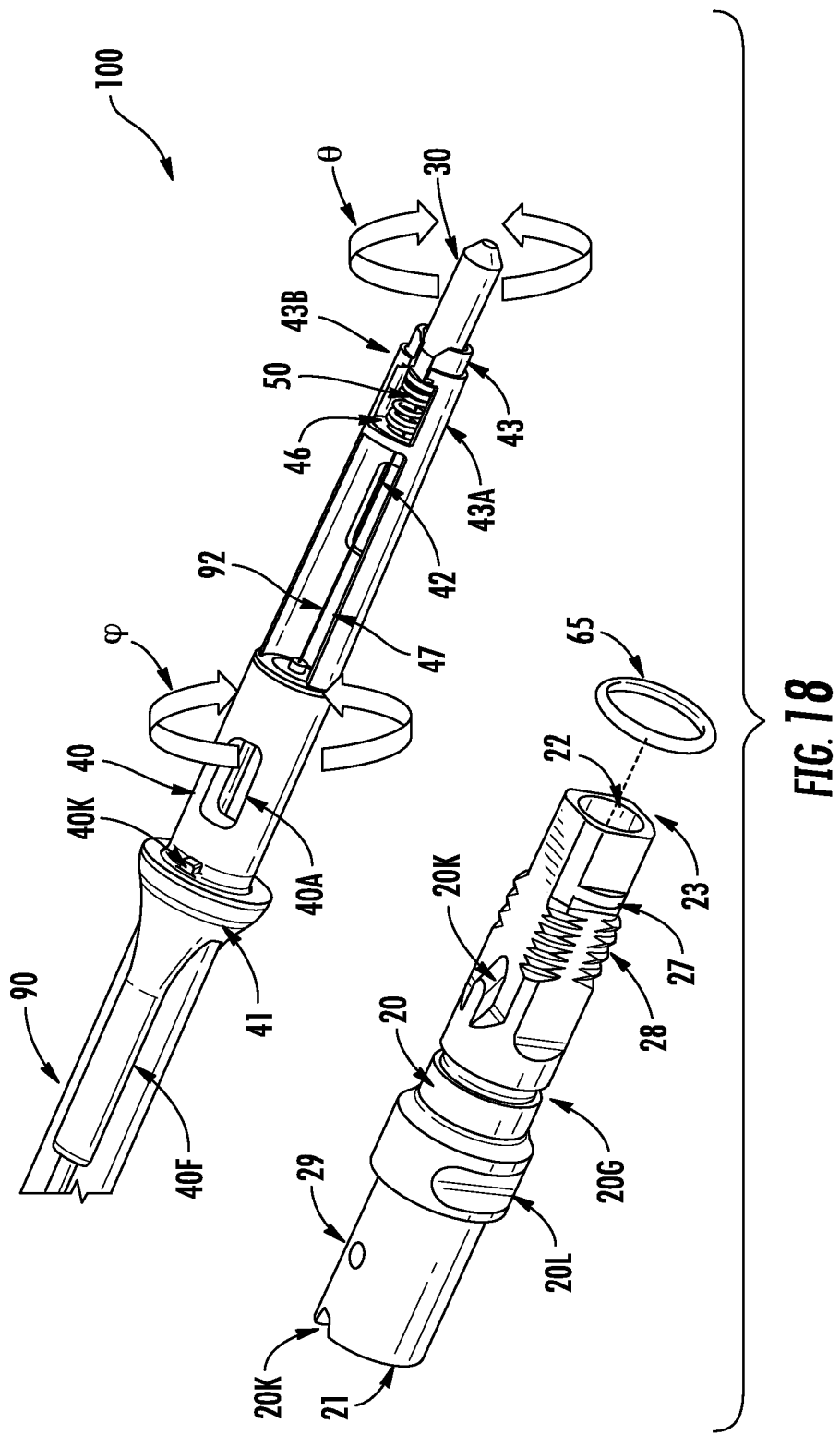
FIG. 18 is a partially exploded view of the fiber optic cable assembly of FIG. 17 with the fiber optic cable attached to the ferrule subassembly.

FIG. 17 is an exploded view of another cable assembly 100 that is similar to the cable assembly 100 of FIG. 2 with a fiber optic connector having a different ferrule subassembly 60 and FIG. 18 is a partially exploded view of the cable assembly 100 of FIG. 17 with the fiber optic cable attached to the ferrule subassembly 60. This cable assembly 100 comprises a connector 10 that has a ferrule carrier 40 that is monolithically formed with the cable adapter as depicted. Otherwise, the cable assembly 100 is similar to the cable assembly 100 of FIG. 2.

The concepts disclosed herein may be used with other types and designs of connectors. For instance, FIGS. 19-43 and FIGS. 46-53 disclose connectors where ferrule 30 is inserted from a front end 23 of the connector 10. These connectors designs are depicted without a ferrule holder as generally discussed herein, but may be used with a ferrule holder if desired. These connector designs are different from the earlier connector designs since they do not use a ferrule carrier; however, these designs can still be optically tuned if desired. Specifically, these connector designs comprise a ferrule 30 that "floats" relative to the housing 20 and uses a different structure for securing the ferrule while allowing the ferrule float. Any suitable housings 20 as described herein may be used for these connectors so long as they are suitably modified for securing the ferrule 30 as disclosed in more detail below.

Figure 19:
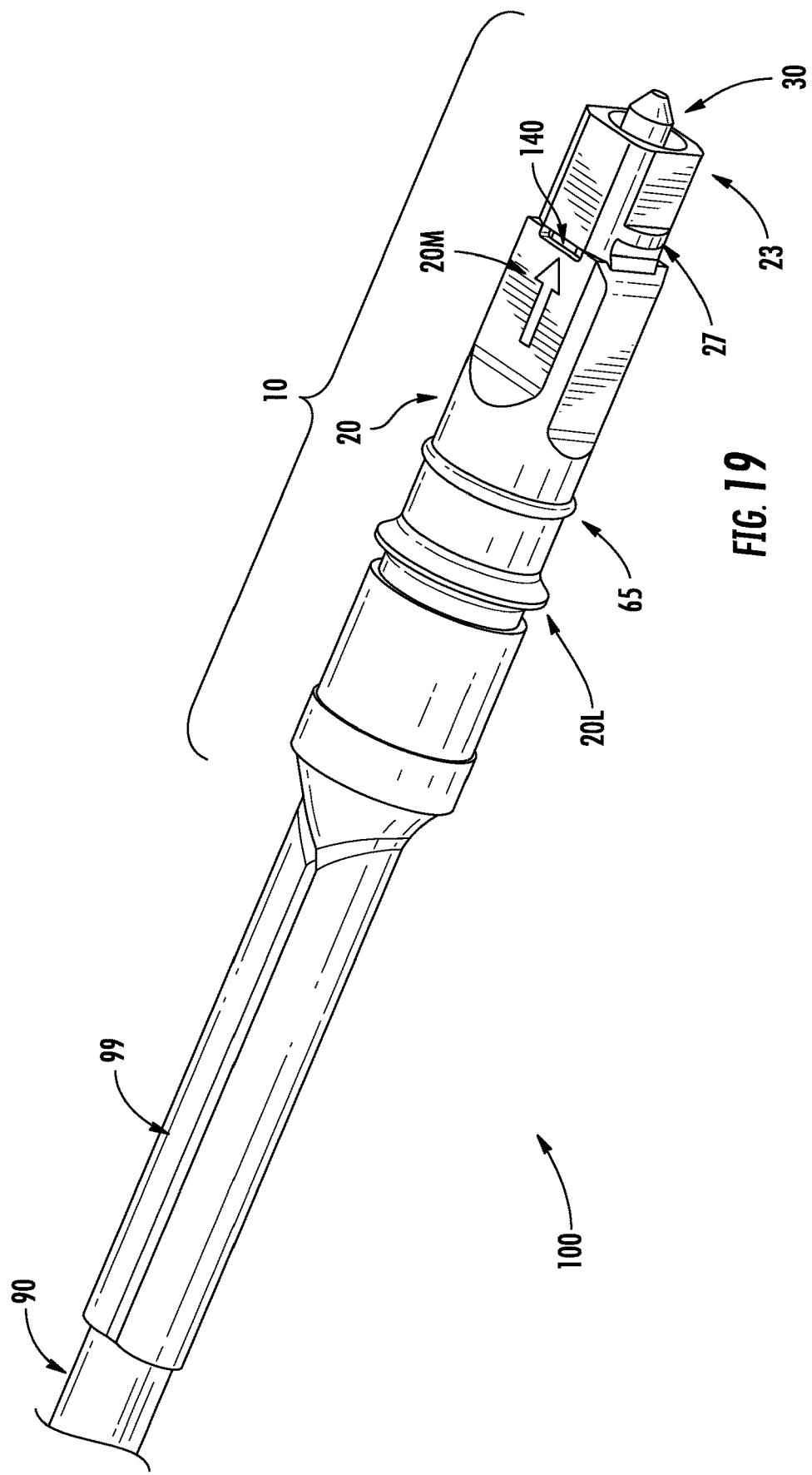
FIG. 19 is a perspective view of another cable assembly having a different fiber optic connector with a housing that is similar to the housing shown with the fiber optic connector of FIG. 2 according to another aspect of the disclosure.
Figure 20:
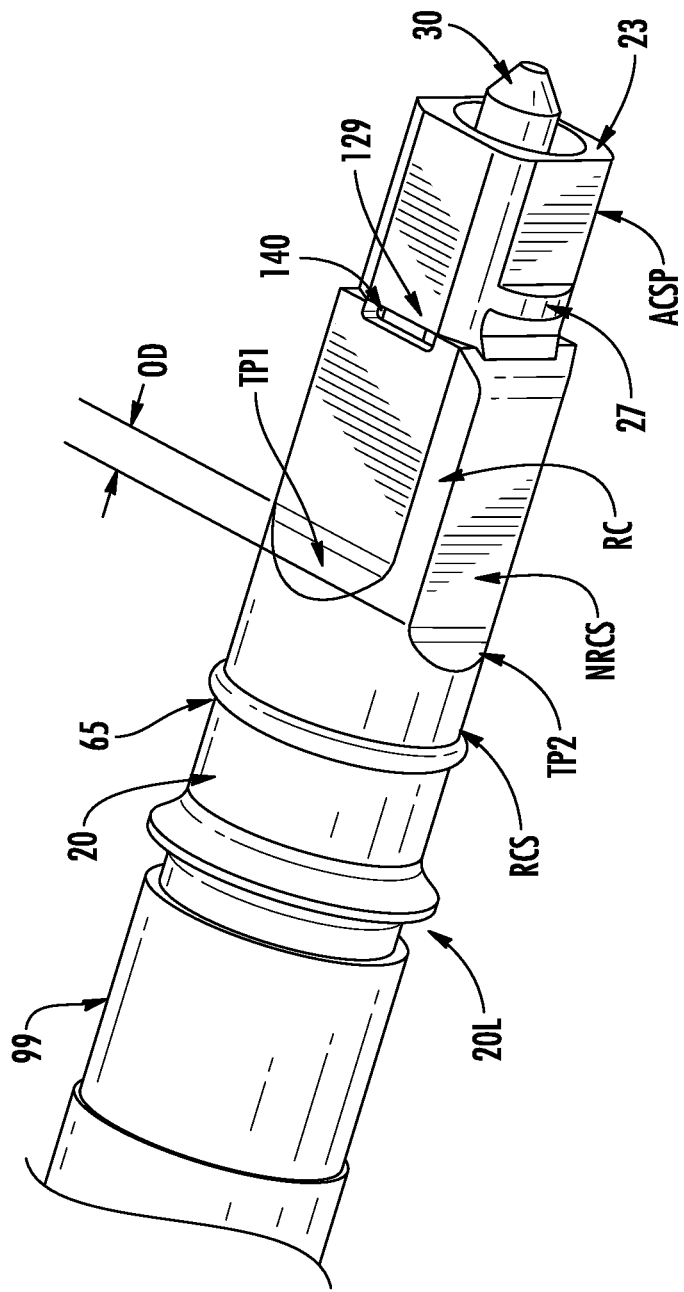
FIG. 20 is a close-up perspective view of the fiber optic connector of FIG. 19 depicting geometric features of the housing.
Figures 22, 23:
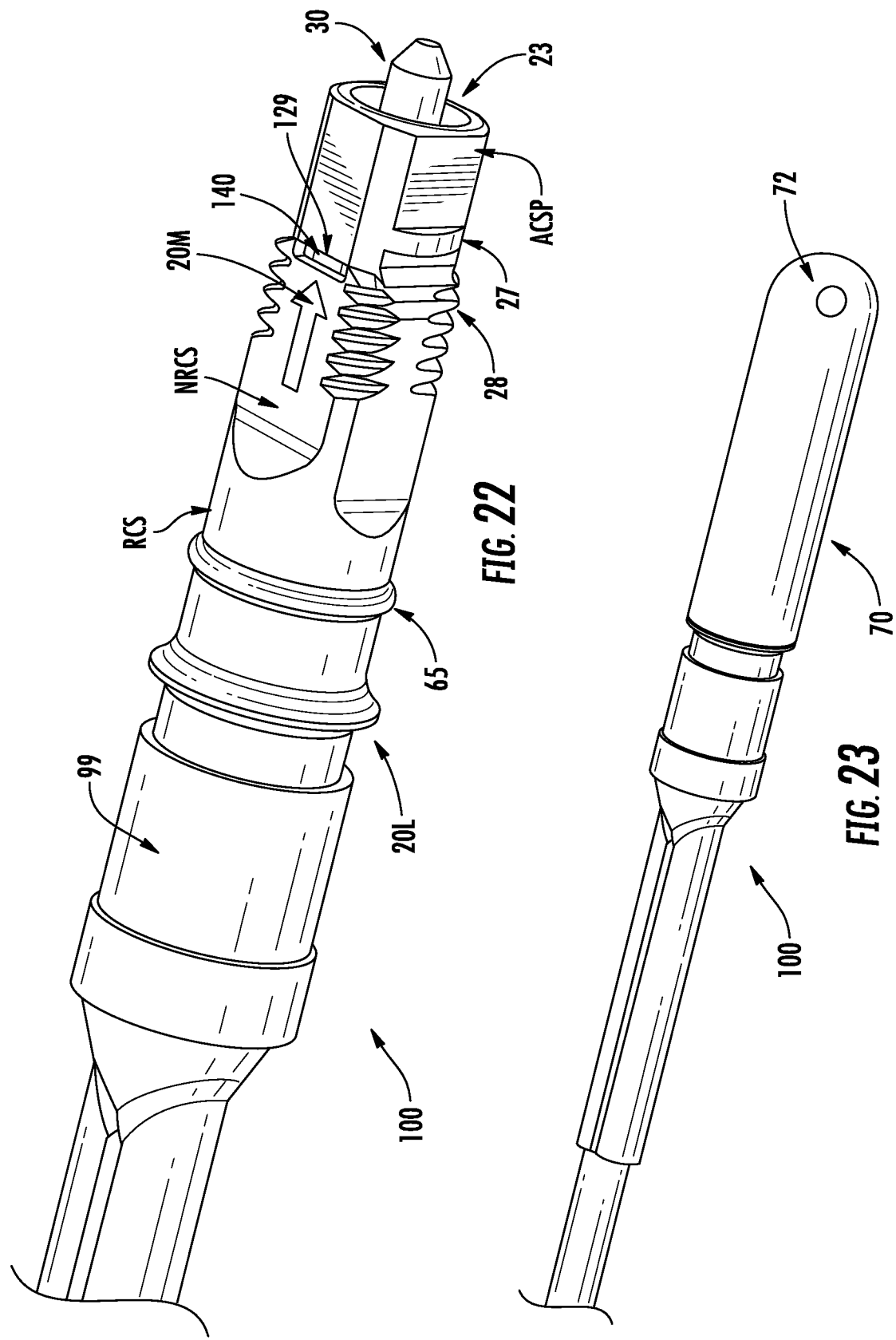
FIG. 22 is an perspective assembled view of the fiber optic cable assembly of FIG. 21.
FIG. 23 is a perspective view of the cable assembly of FIG. 22 with a dust cap installed on the fiber optic connector.
Figure 24:
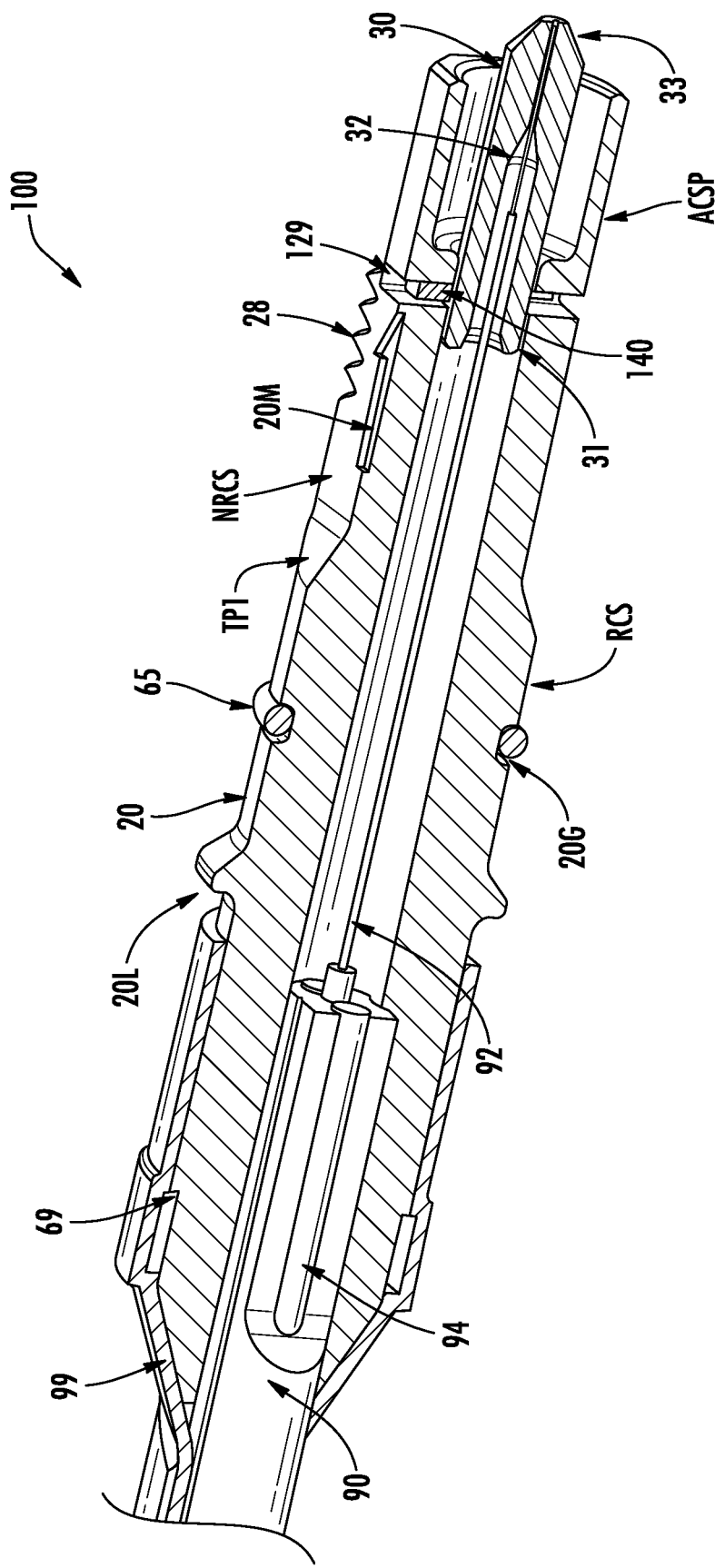
FIG. 24 is a longitudinal sectional view of the cable assembly of FIG. 22 in a vertical direction.
Figure 29:
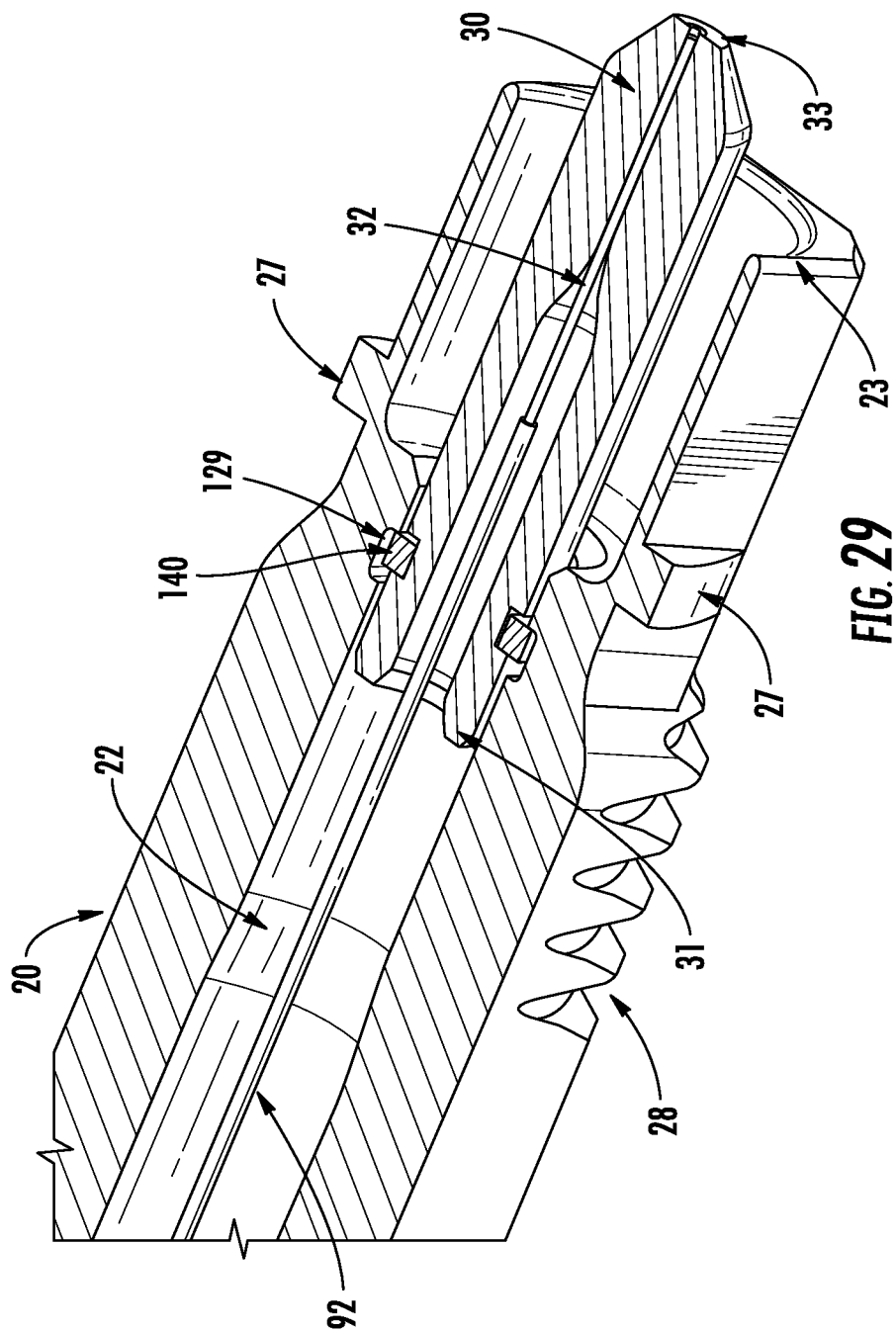
FIG. 29 is a longitudinal sectional view of a front portion of the fiber optic connector of FIG. 22 in a horizontal direction.

Illustratively, FIGS. 19 and 20 are perspective views of cable assembly 100 having a different fiber optic connector 10 with housing 20 that is similar to the housing shown with the fiber optic connector of FIG. 2, but having ferrule 30 that loads from the front end 23 of housing 20 and secured a transverse ferrule retention member 140. FIG. 21 is an exploded view of another cable assembly 100, that is similar to that of FIG. 19 with the connector having a housing having threads on the housing that are discontinuous. FIG. 22 is an perspective assembled view of the cable assembly 100 of FIG. 21 and FIG. 23 is a perspective view of the cable assembly 100 of FIG. 22 with a dust cap 70 installed. FIG. 24 is a longitudinal sectional view of the cable assembly 100 of FIG. 22 in a vertical direction and FIG. 29 is a longitudinal sectional view of a front portion of the fiber optic connector 100 in a horizontal direction.

With reference to FIG. 21, connector 10 comprises housing 20, ferrule 30 and transverse ferrule retention member 140. Housing 20 is similar to the other housings disclosed herein, but further comprises an opening 129 in an outer surface that is transverse to the longitudinal passageway 22 of housing 20. The opening 129 is sized for receiving the transverse ferrule retention member 140 and securing the ferrule 30 in a manner that allows suitable movement so it may float as appropriate as depicted in FIG. 24. Connector 10 may also comprise a band 69 for securing a cable 90 to the connector if desired.

FIG. 25 is a detailed exploded view of the front end of the cable assembly 100 of FIG. 22 and FIG. 26 is a cross-sectional view taken at the opening 129 of the housing 20 of FIG. 19 showing transverse ferrule retention member 140 securing the ferrule 30. As depicted in FIG. 25, ferrule 30 is loaded into the passageway 22 of housing 20 from the front end 23 and secured by the cooperation of the ferrule 30 with the transverse ferrule retention member 140 that is inserted into opening 129 for cooperating with at least one surface of the ferrule 30. Specifically, ferrule 30 is inserted into the passageway 22 until the cooperating surface such as a ferrule retention feature aligns with the opening 129 so that the transverse ferrule retention member 140 may engage the surface and securing the ferrule. Additionally, the at least one surface of the ferrule 30 that serves as the ferrule retention feature cooperates with the transverse ferrule retention member 140 is sized relative to the transverse ferrule retention member so that the ferrule 30 may float. The ferrule retention feature may also be the same feature as the at least one selectively tunable surface 36.

Figure 28:
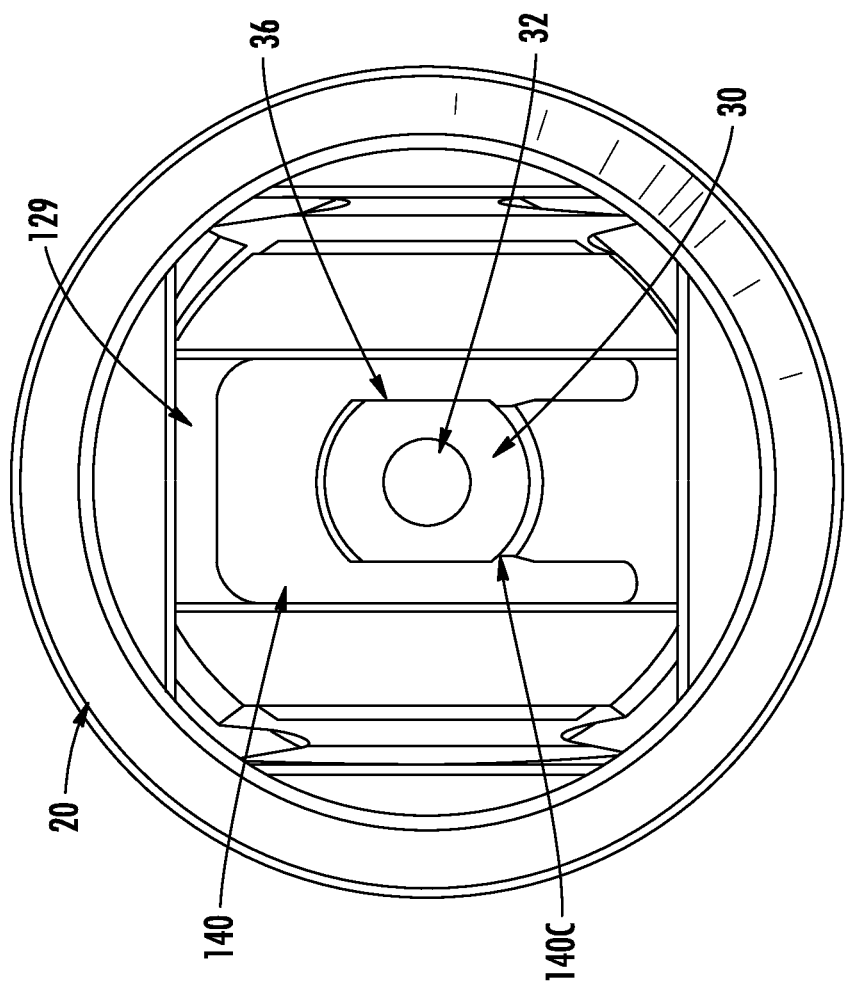
FIGS. 27 and 28 respectively are a detail view of an alternative transverse ferrule retention member and cross-sectional view showing the alternative transverse ferrule retention member for securing the ferrule.
Figure 27:
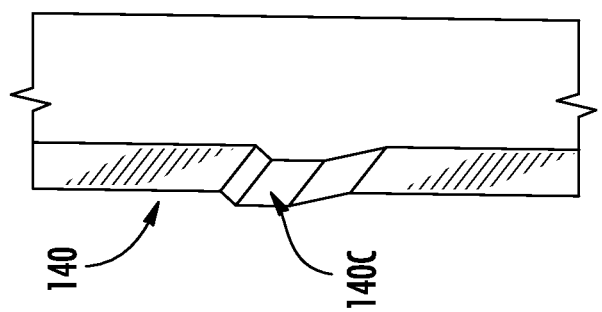
Figure 30:
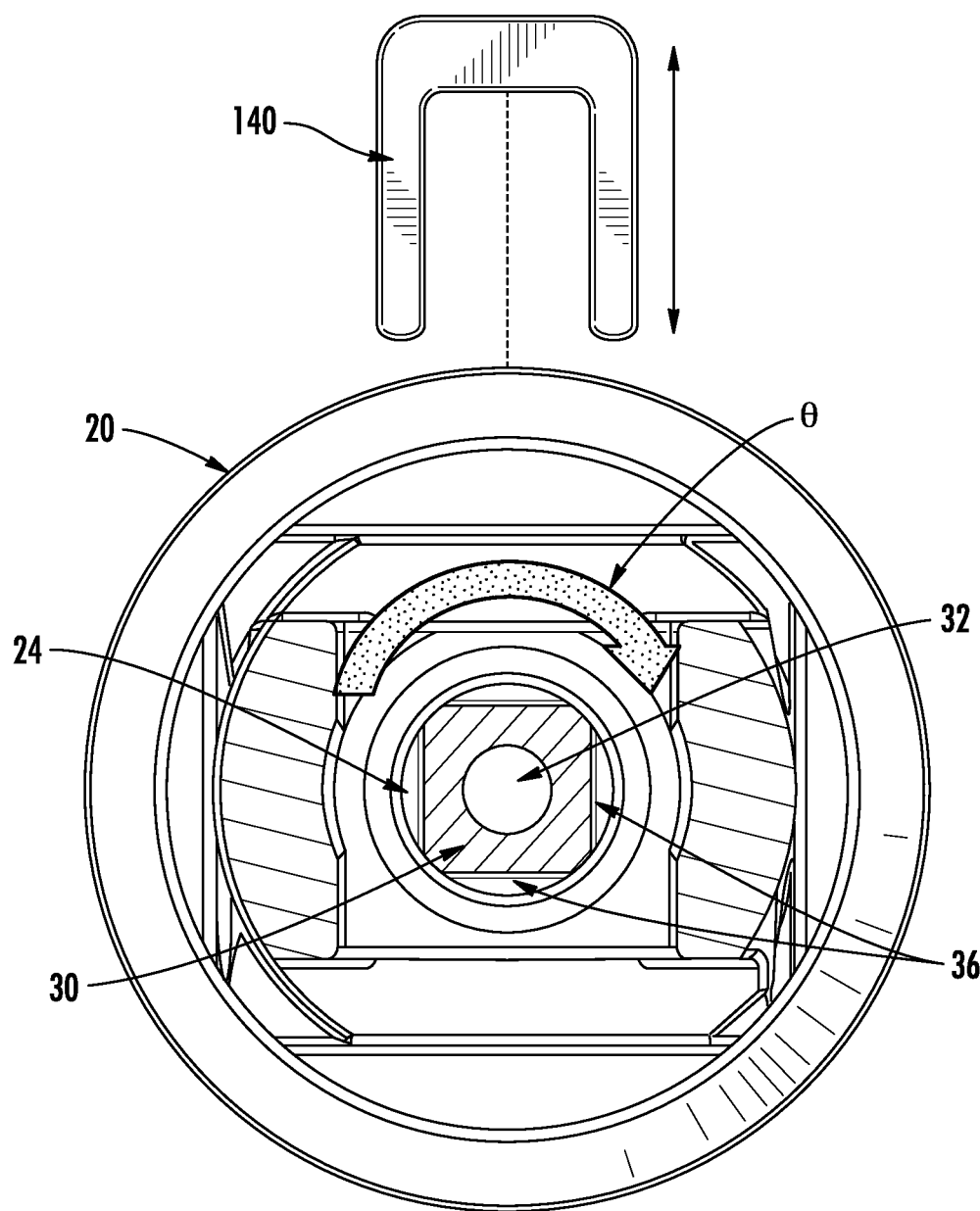
FIG. 30 is a front end sectional view of a housing having a tuning pocket that allows rotational tuning of the ferrule during manufacture for improving optical performance.

In this embodiment, ferrule has at least one selectively tunable surface 36 so that ferrule 30 may have at least two rotational orientations with respect to the housing 20 (and which acts as the ferrule retention feature). However, ferrules 30 may have any suitable numbers of selectively tunable surfaces 36 so the ferrule 30 may have the desired number of rotational positions for tuning the ferrule. By way of example, ferrule may have four, six, eight or any suitable number of selectively tunable surfaces 36 as desired. More specifically, the longitudinal passageway 22 of housing 20 extending from the rear end 21 to the front end 23 also comprises a tuning pocket 24 in cooperation with the longitudinal passageway 22. The tuning pocket 24 allow the rotation or manipulation of the ferrule 30 within the housing as needed. In this embodiment, the transverse ferrule retention member 140 is secured to the housing 20 using a pair of catches 140C disposed on the arms of the transverse ferrule retention member 140. Catches 140C may snap-fit to portions of the housing 20 disposed in opening 129 such ledges. However, other variations for securing the ferrule 30 are possible. By way of example, FIGS. 27 and 28 respectively depict a detailed view of an alternative transverse ferrule retention member 140 having catches 140C and cross-sectional view showing the alternative transverse ferrule retention member 140 for securing ferrule 130. As best depicted in FIG. 27, the catches 140C are disposed on a medial portion of the arms of this alternative transverse ferrule retention member 140. Consequently, the catches 140C cooperate with a portion of ferrule 30 as depicted in FIG. 28, instead of the housing 20 as depicted in FIG. 26. FIG. 29 is a sectional view of a portion of the housing 20 having a width of opening 129 being larger than the width of the transverse ferrule retention member 140 so that the ferrule 30 may float. FIG. 30 is a sectional view depicting tuning pocket 24 of housing 20 that allows rotational tuning of the ferrule 30 during manufacture for improving optical performance. Specifically, when transverse ferrule retention member 140 is disengaged, then the ferrule 30 may be rotated relative to the ferrule. As depicted, tuning pocket 24 allows ferrule 30 to be rotated by a suitable angle ↓ for optical tuning to a preferred rotational position as represented by the arrow. By way of example, ferrule 30 may be rotated by an angle $\theta$ of $\pm 180$ degrees, but other suitable angles are possible.

Figure 31:
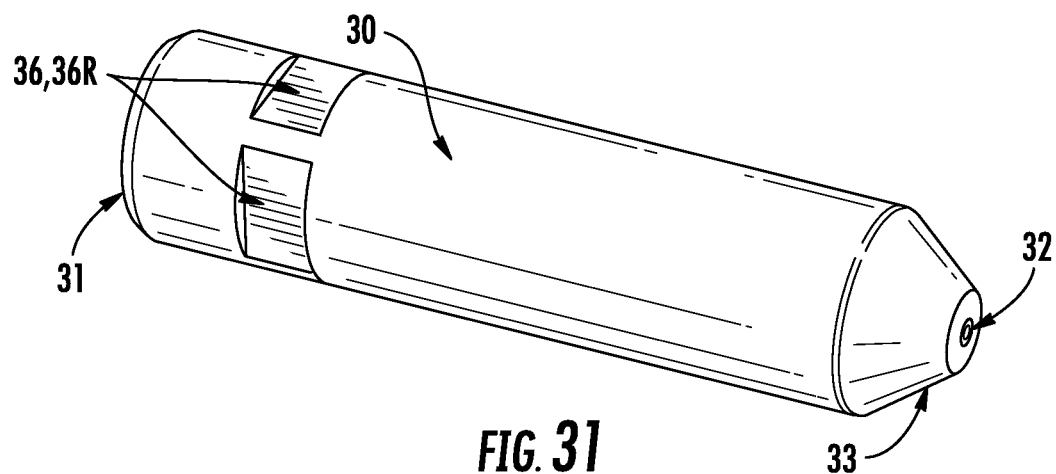
FIGS. 31 and 32 depict explanatory ferrules having at least one selectively tunable surface.
Figure 32:
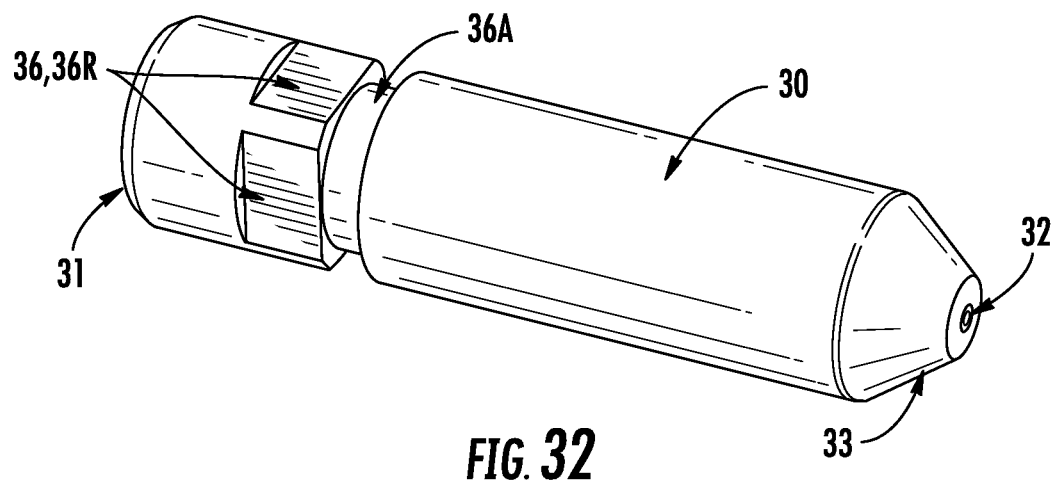
Figure 33:
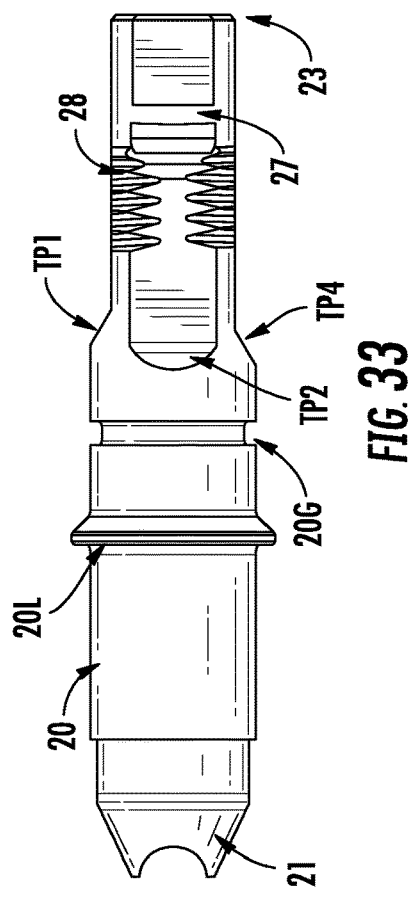
FIGS. 33-36 are various views of depicting the housing of the fiber optic connector of FIG. 23.
Figure 34:
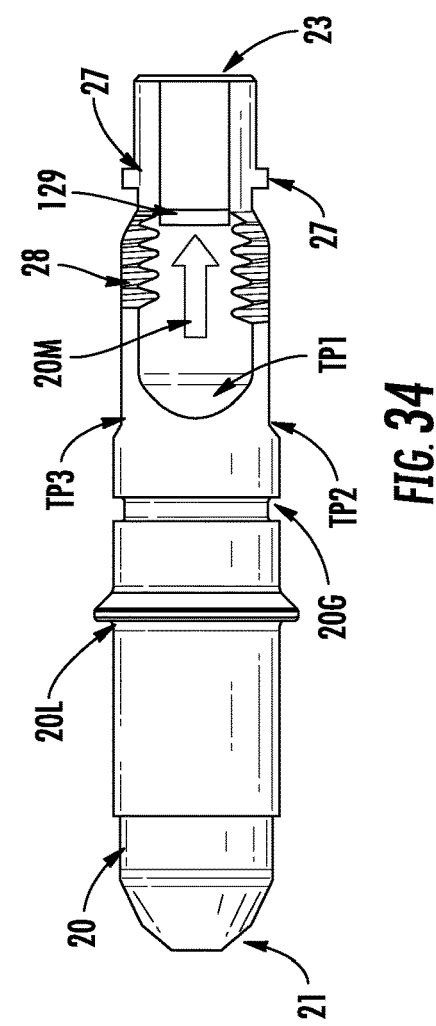
Figure 35:
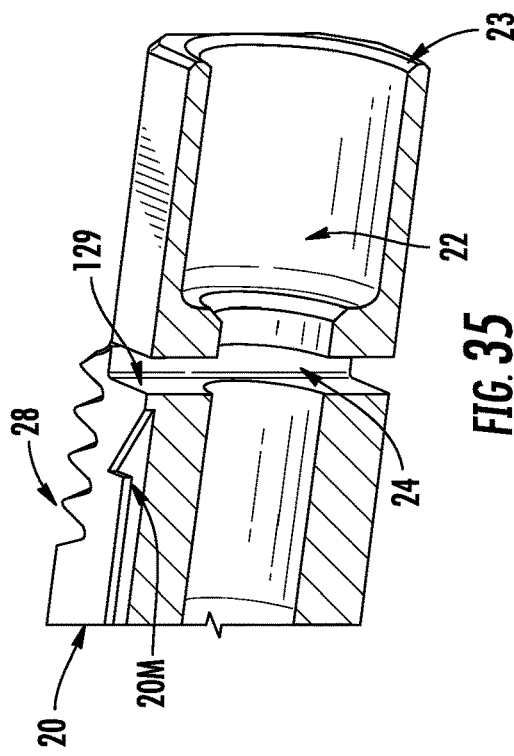
Figure 36:
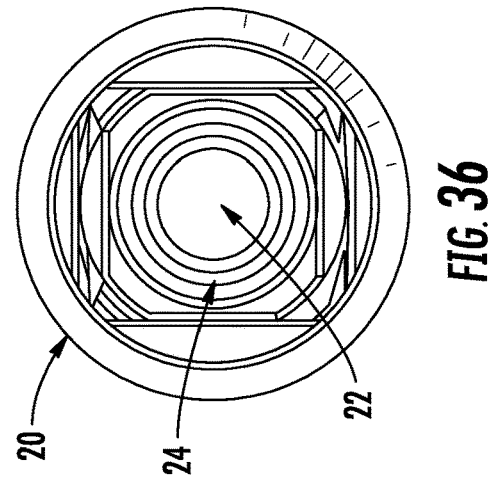

FIGS. 31 and 32 depict explanatory ferrules 30 having at least one selectively tunable surface 36. FIG. 31 shows a ferrule that may be tuned to quadrants with four selectively tunable surfaces 36. Generally speaking, the selectively tunable surfaces 36 are configured as planar surfaces as shown. More specifically, the selectively tunable surfaces 36 are formed by a plurality of planar surfaces that are recessed on the ferrule 30. Finer tuning is possible with the concepts disclosed by having more selectively tunable surfaces such as six, eight, ten or twelve, thereby providing more rotational positions for securing the ferrule 30. FIG. 32 depicts a ferrule 30 where the selectively tunable surfaces 36 are disposed adjacent to a free rotation portion 36A of the ferrule 30, thereby allowing rotation of the ferrule for tuning during assembly without removing the transverse ferrule retention member 140. By way of explanation, the ferrule 30 in FIG. 32 may be secured by transverse retention member 140 and when rotational tuning is required, then the ferrule 30 may be displaced rearward until free rotation portion 36A is aligned with the transverse retention member 140 allowing rotation of the ferrule in either direction and when the desired rotational position is reached the ferrule 30 is allowed to translate to the forward position where the selectively tunable portions 36 engage and cooperate with the transverse ferrule retention member 140 to inhibit rotation of the ferrule 30. Consequently, the transverse ferrule retention member 140 does not need to be removed from housing 20 for tuning.

FIGS. 33-36 are various views of depicting the housing 20 of the connector 10 of FIG. 23 comprising opening 129 and tuning pocket 24. As depicted, housing 20 is similar to the other housings and may be modified for the desired housing configuration as desired. For instance, although the housing 20 depicts threads 28 that are discontinuous for attaching dust cap 70 such as shown in FIG. 23, variations are possible that eliminate the threads 28 and use a push-on dust cap. Likewise, other variations to the housing 20 are possible such as changing the mating geometry and using the concepts disclosed with the mating geometry of the housing 20 depicted in FIG. 54. Further, housings 20 may have different retention features or different locking features 20L. By way of comparison, housing 20 of FIG. 3 comprises a locking feature 20L disposed between rear end 21 and a front end 23 configured as a scallop and the locking feature 20L of the housing of FIG. 4 is configured by a shoulder. The shoulder comprises an enlarged annular portion 126 with a flat surface on the rear side.

By way of example, FIG. 37 is a perspective view of another cable assembly 100 with still another alternative connector 10 that is similar to connector 10 of FIG. 19, but further comprises multi-piece housing 20 comprising a nosepiece 160. FIG. 38 is a perspective view of the cable assembly 100 with dust cap 70 and FIG. 39 is an exploded view of the cable assembly 100.

As best depicted in FIG. 39, the connector 10 comprises a housing 20 having nosepiece that fits about a front end 23. In this configuration, using the separate nosepiece 160 provides more access to the passageway 22 of the housing and allows more room and vision for assembly. Moreover, the opening 129 is disposed in a location that is covered by nosepiece 160 so that once the connector is tuned and the nosepiece 160 is secured the transverse ferrule retention member is not visible or accessible. Housing 20 of this embodiment also has a different locking feature 20L compared with the housing depicted in FIGS. 33-36 and an aperture 29. Locking feature 20L is configured as a groove for receiving a clip or other suitable locking feature from a complimentary device for retaining the connector in a mated state when secured. This embodiment of the connector also use cable adapter 59 so that the connector may accommodate different cable types by using the appropriately sized cable adapter for the given cable 90.

Figure 41:
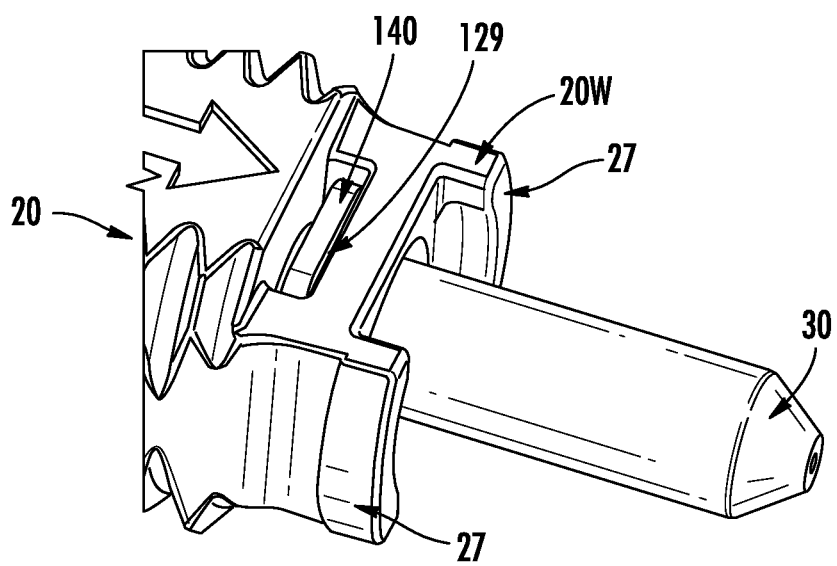
FIG. 41 is a front end view of the housing of FIG. 37 showing a securing surface such as a weld interface on the housing so that the nosepiece may be attached to the housing so that it covers an opening for the transverse ferrule retention member.

FIG. 40 is a front end sectional view of the connector 10 of FIG. 37 showing the nosepiece 160 attached to the front end of housing 20 and FIG. 41 is a front end view of the housing showing an attachment interface (not numbered) such as a weld interface disposed on a front portion of the housing 20. As depicted in FIG. 40, once the nosepiece 160 is installed it inhibits the removal of the transverse ferrule retention member 140. In other words, the transverse ferrule retention member 140 is not visible, nor is it accessible once the nosepiece is installed. Consequently, once the connector is tuned and the nosepiece is suitable installed, the transverse ferrule retention member 140 is tamper-resistant. The attachment interface of the housing provides a surface for attaching nosepiece 160. Nosepiece 160 may be attached in any suitable manner such as adhesive, friction-fit, snap-fit, welding or the like as desired. In one embodiment, the nosepiece 160 is formed from a translucent material. Using a translucent material for nosepiece 160 allows the use of a UV curable epoxy for securing the nosepiece 160.

Figure 42:
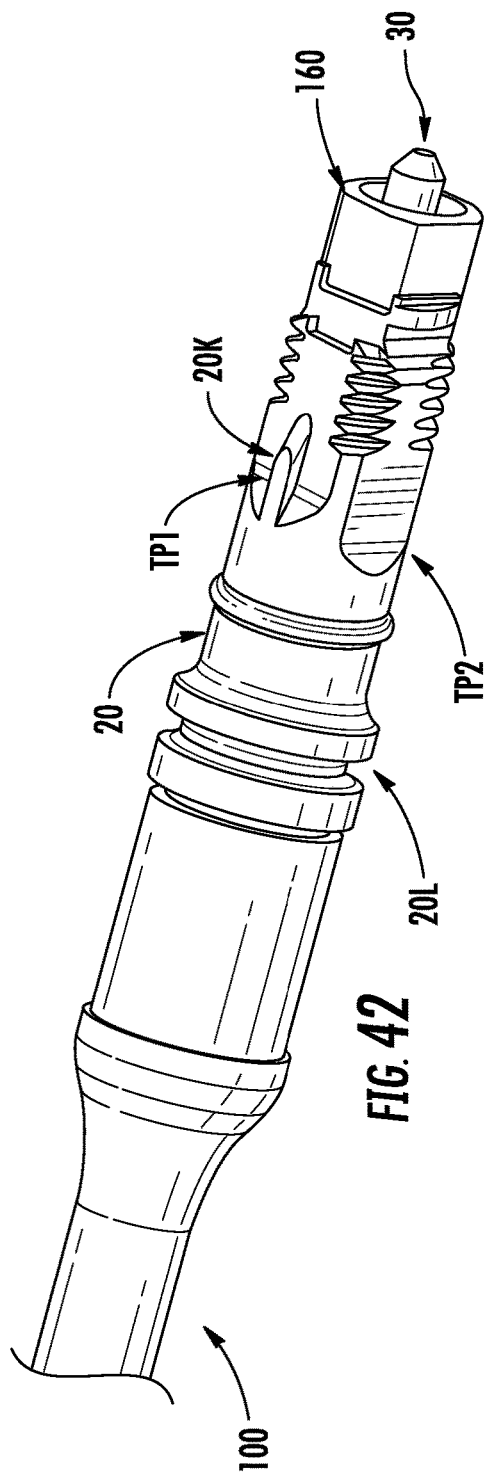
FIGS. 42 and 43 are perspective and side views of a fiber optic connector similar to FIG. 37 having an alternative housing with a keying feature for fiber optic connectors.

Still other variations of connectors are possible using modified housings or other modified components. FIGS. 42 and 43 are perspective and side views of a connector 10 similar to FIG. 37 having an alternative housing 20. Housing 20 in this embodiment does not have an offset distance among transition portions TP1-TP4. In other words, all of the transition portions TP1-TP4 are aligned. Additionally, this housing 20 comprises keying feature 20K for orienting the connector for mating. Keying feature 20K is a key, but other embodiments may use other suitable structure such as a keyway or the like.

Other variations of housings disclosed herein are also possible such as having other shapes for the rear portion RP such as a polygon cross-section PCS, instead of the round cross-section RCS. Polygon cross-sections may have any suitable number of side such as four, five, six, seven or eight, but other suitable number of sides are also possible. Still other variations are possible with the housing concepts disclosed. For instance, the housing 20 of the connectors may be configured to work with other devices so that a retention feature or locking feature of the connector is intended to cooperate with different devices for maintaining the optical connection at the mating interface. By way of example, FIGS. 44 and 45 are perspective views of portions of alternative housings 20 depicting other locking feature designs. The housings 20 depicted in FIGS. 44 and 45 may be used with any suitable connectors disclosed herein. Likewise, locking or retention features may be selected with other features such as keying features 20K. Keying feature 20K has a predetermined location with respect to an orientation of housing 20 for aligning the connector form-factor with a respective mating device. Specifically, the housing 20 provides a proper orientation for connection in one orientation, which may be desired for angled ferrules. In this embodiment, keying feature 20K is disposed on a center line of fiber optic connector 10 and ensures correct rotational orientation during insertion and mating with another device.

Figure 46:
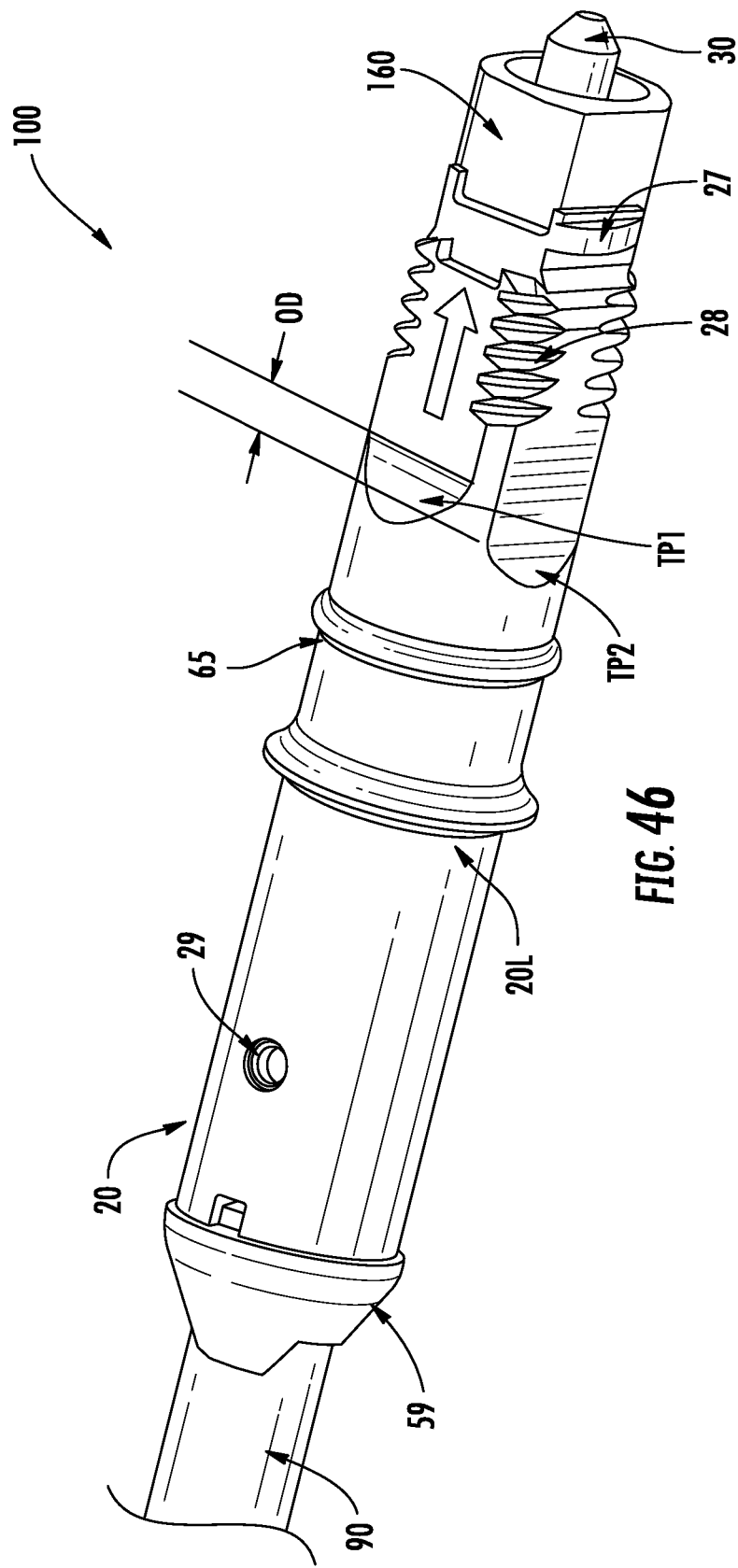
FIG. 46 is a perspective view of still another fiber optic cable assembly having a cable adapter that fits into a rear opening of a housing that can be changed for different types of fiber optic cables.
Figure 47:
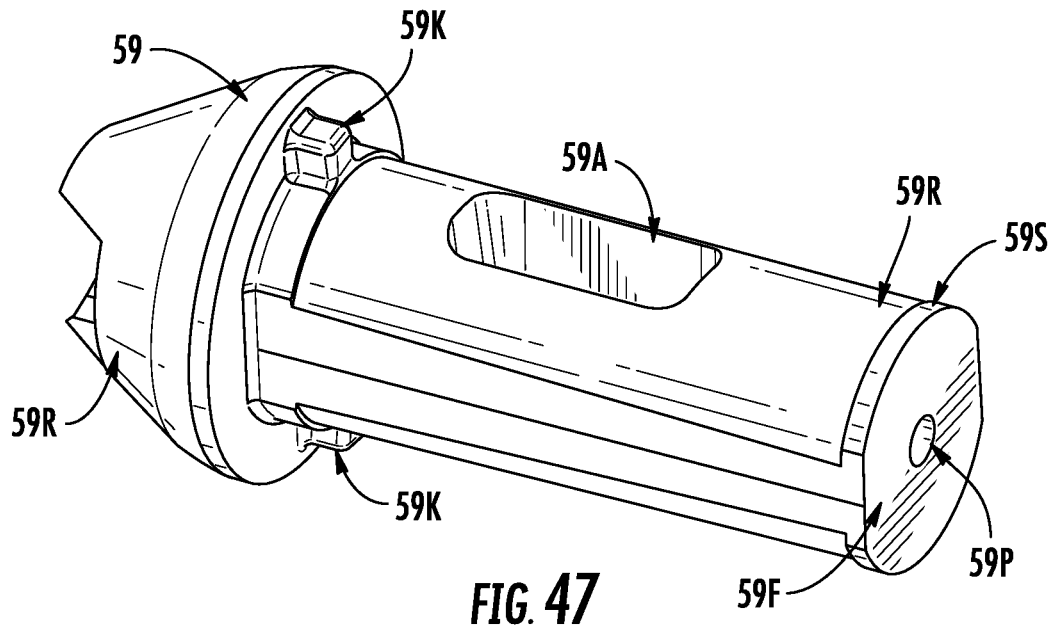
FIGS. 47 and 48 respectively are a perspective view and a cross-sectional view the cable adapter of FIG. 46.
Figure 48:
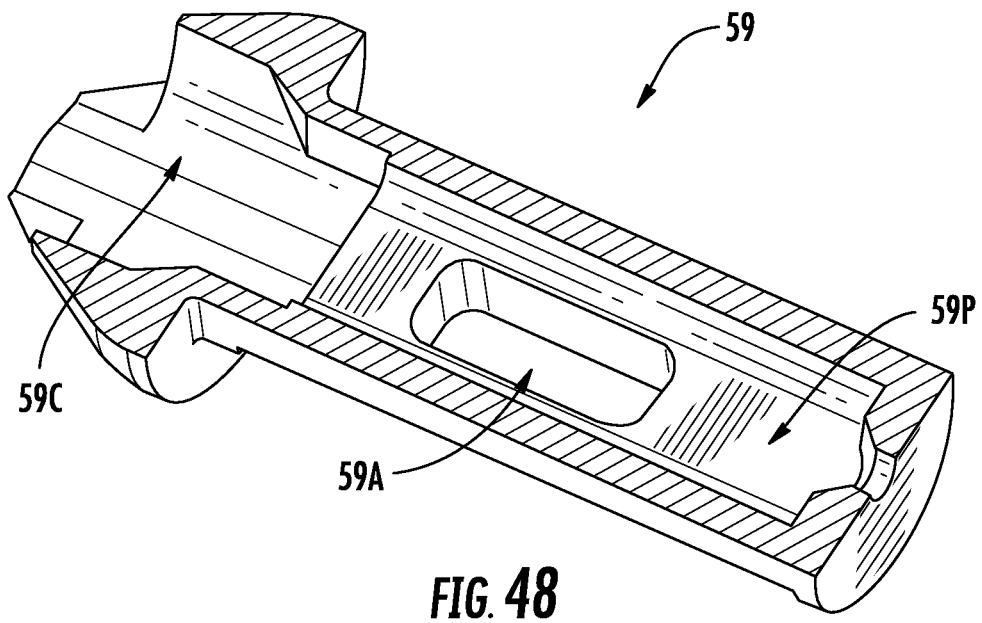
Figure 49:
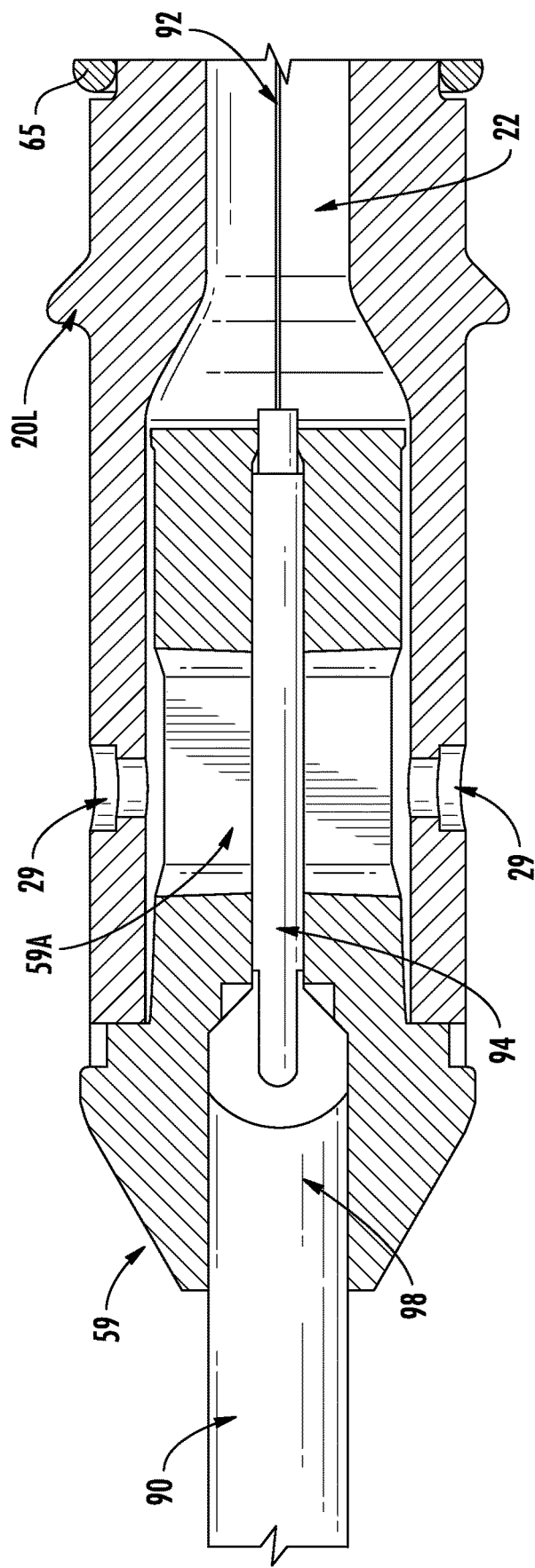
FIG. 49 is a sectional view of the rear portion of an explanatory fiber optic cable assembly showing the fiber optic cable within the cable adapter taken in a vertical direction to depict how the cable may be attached to the fiber optic connectors disclosed herein.
Figure 50:
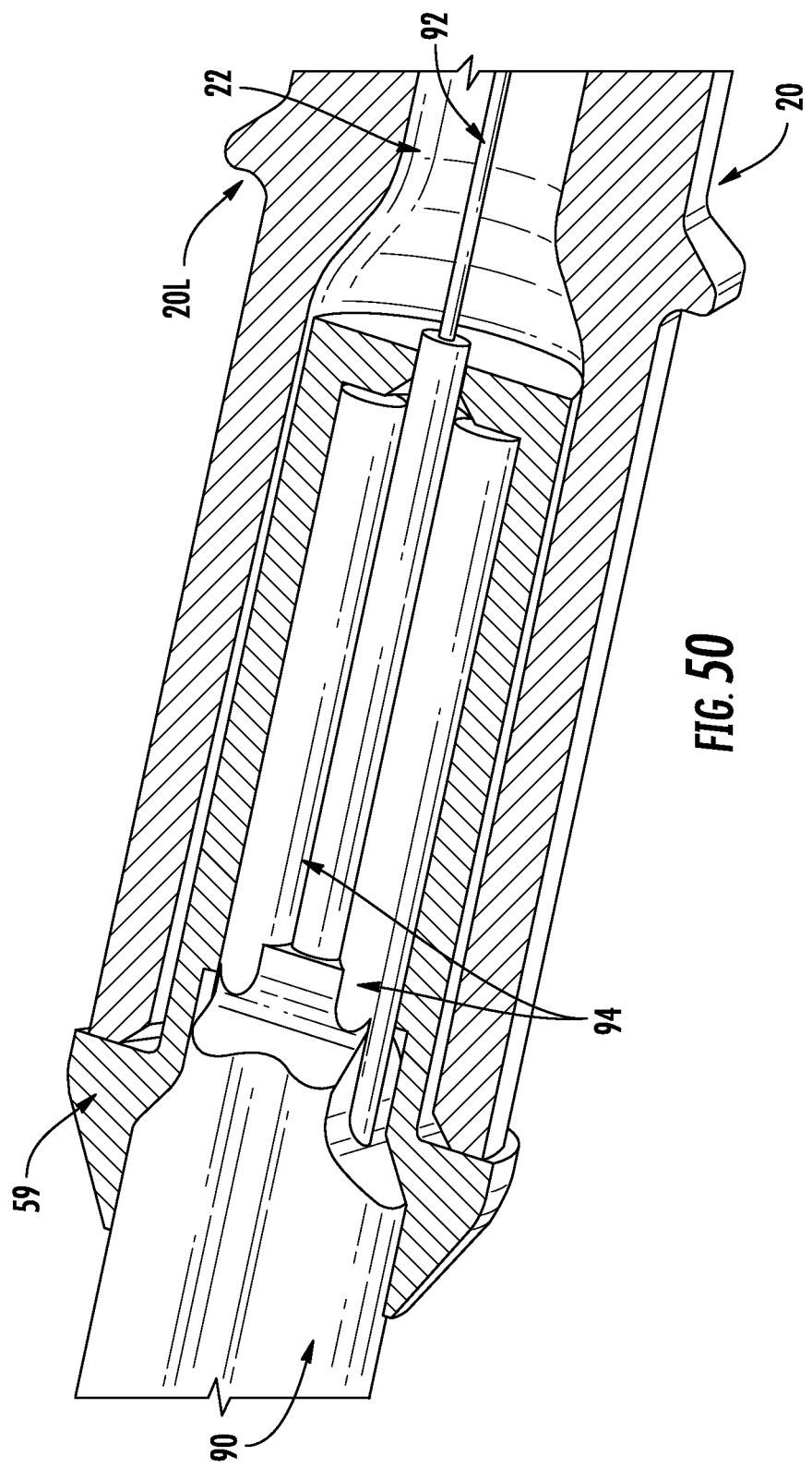
FIG. 50 is a sectional view of the rear portion of the cable assembly of FIG. 46 showing the fiber optic cable within the cable adapter taken in a horizontal direction.

Components or features of connectors may be selected as desired to form other variations of connectors. Illustratively, FIG. 46 is a perspective view of still another cable assembly 100 using a connector similar to the connector of FIG. 37, but having a different cable adapter 59. The connector also has a different type of locking feature 20L than the housing 20 of the connector of FIG. 37. Like the cable adapter 59 of FIG. 37, the cable adapter 59 of this embodiment that fits into a rear opening 21A of the housing 20. As discussed, using connectors with a separate cable adapter 59 allows the connector to be used with different types cables by merely changing out and selecting the cable adapter that is suitable for the desired cable 90. FIGS. 47 and 48 respectively are a perspective view and a cross-sectional view the cable adapter 59 of FIG. 46. FIG. 49 is a vertical sectional view and FIG. 50 is a horizontal sectional view of the rear portion of cable assembly 100 showing the cable 90 disposed within the cable adapter 59.

Figure 47A:
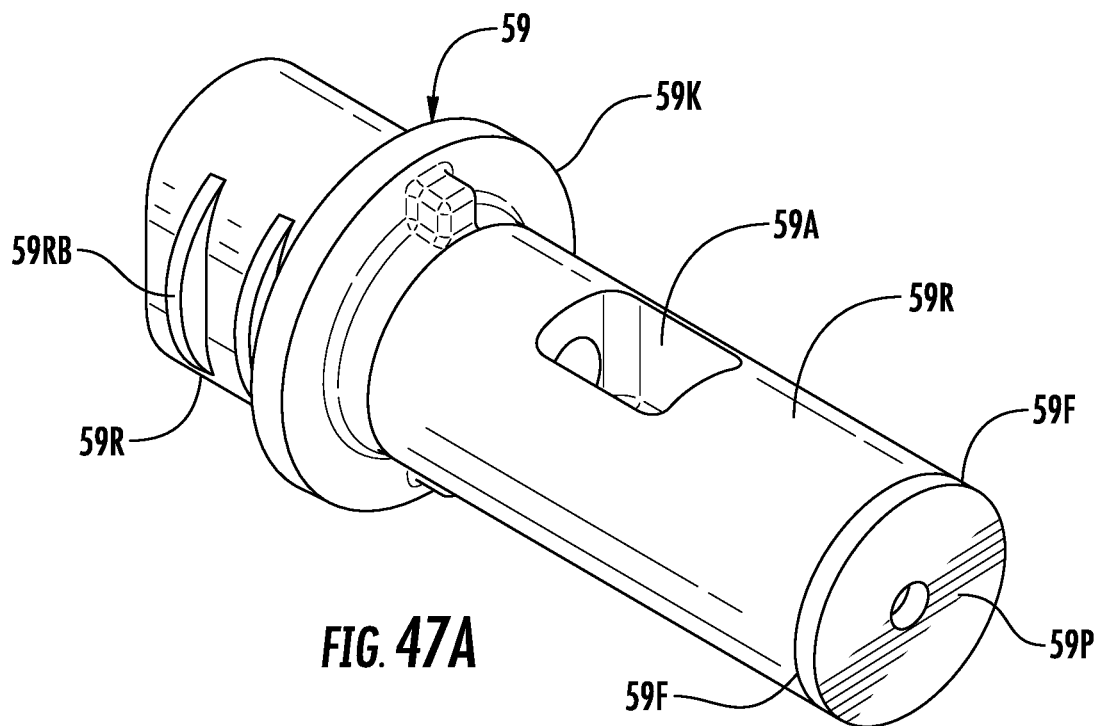
FIGS. 47A and 48A respectively are a perspective view and a cross-sectional view of another cable adapter.
Figure 48A:
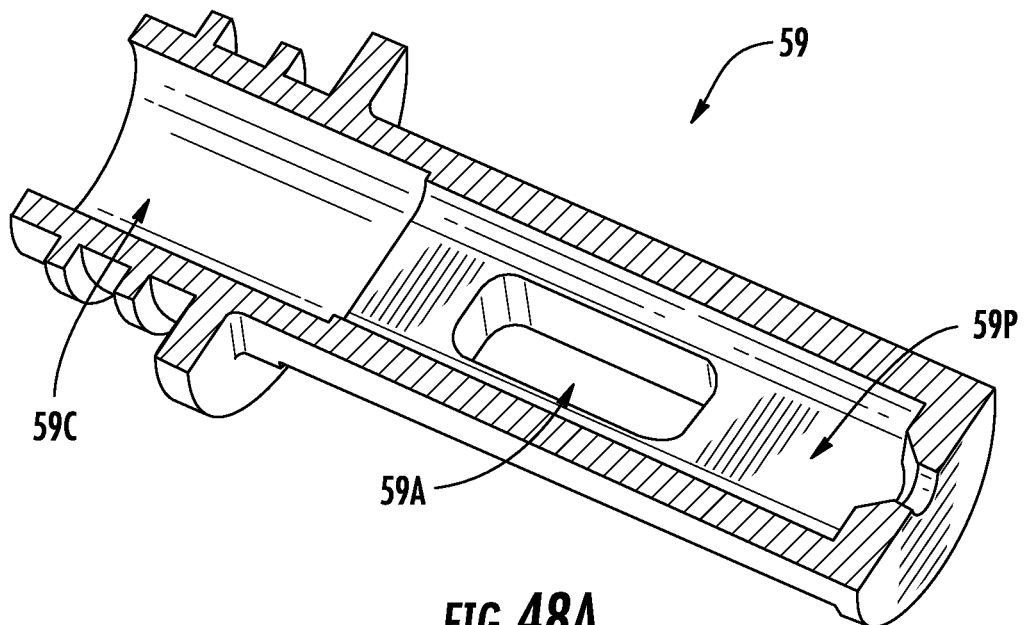

FIGS. 47A and 48A are a perspective view and a cross-sectional view of another cable adapter 59, that is similar to the cable adapter of FIG. 47. As depicted, cable adapters 59 may comprise an aperture 59A, a recessed surface 59R, a shoulder 59S, a passageway 59P, and a cable saddle 59C or a cable adapter key 59K as desired for any particular embodiment of cable adapter 59. Generally speaking, cable adapter 59 comprises passageway 59P from a cable adapter front end 59F to a cable adapter rear end 59R. Passageway 59P allows the optical fiber 92 of cable 90 to pass therethrough. Shoulder 59S allows cable adapter 59 to have a snug-fit within the passageway 22 of housing 20 and inhibits adhesive from wicking or flowing forward of the shoulder 59S. Any adhesive or epoxy used for securing cable adapter 59 may wick around the recessed surface 59R for creating a sufficient bonding area and any excessive adhesive or epoxy may flow into the aperture 59A. Housings 20 may include one or more aperture 29 for injecting epoxy or adhesive or the adhesive or epoxy may be placed on the cable adapter before insertion into the housing. For instance, housing may include two apertures 29 such as show in FIG. 49 so that air may escape as adhesive or epoxy is injected. Additionally, the one or more apertures 29 may be aligned with the apertures 59A of the cable adapter so that the adhesive or epoxy also secures the strength members 94 of cable 90 to the cable adapter 59 that is secured to the housing 20, thereby forming a robust cable/connector attachment and also providing sealing at the rear end. Cable saddle 59C is sized and shaped for the particular cable 90 that is intended to be secured using the cable adapter along with the appropriate components as appropriate such as depicted in FIG. 50. The rear portion of the cable adapter 59 may have a cable bend relief area such as a reverse funnel at entrance to the passageway, flexures or other suitable structure for inhibiting sharp bending of the cable near the rear of the cable adapter 59. Further, cable adapters 59 may or may not include keys 59K as desired for cooperating with features of the housing. The rear portion 59R of the cable adapter 59 of FIG. 47A comprises one or more ribs 59RB suitable for receiving a boot or overmold on the rear portion 59R The ribs 59RB aid in the retention of the boot or overmold.

Figure 51:
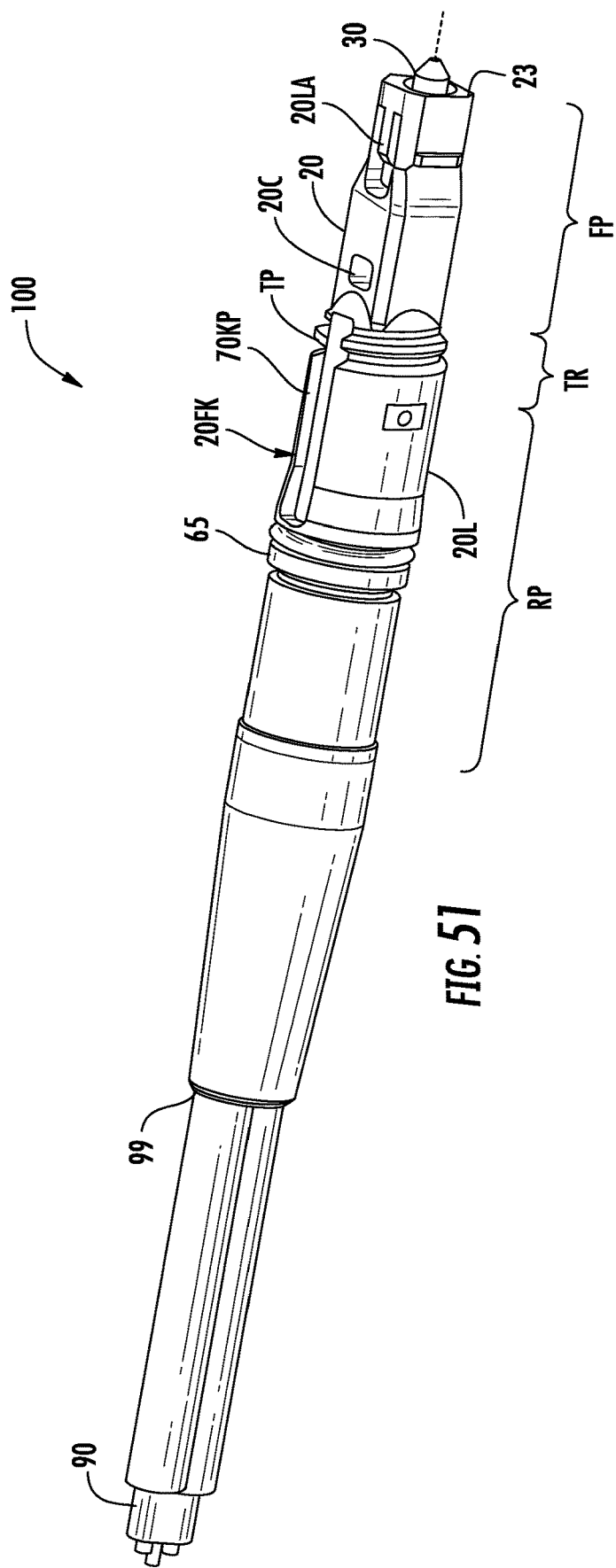
FIGS. 51-54 are various views of another fiber optic cable assembly having a keying portion configured as a female key.
Figure 52:
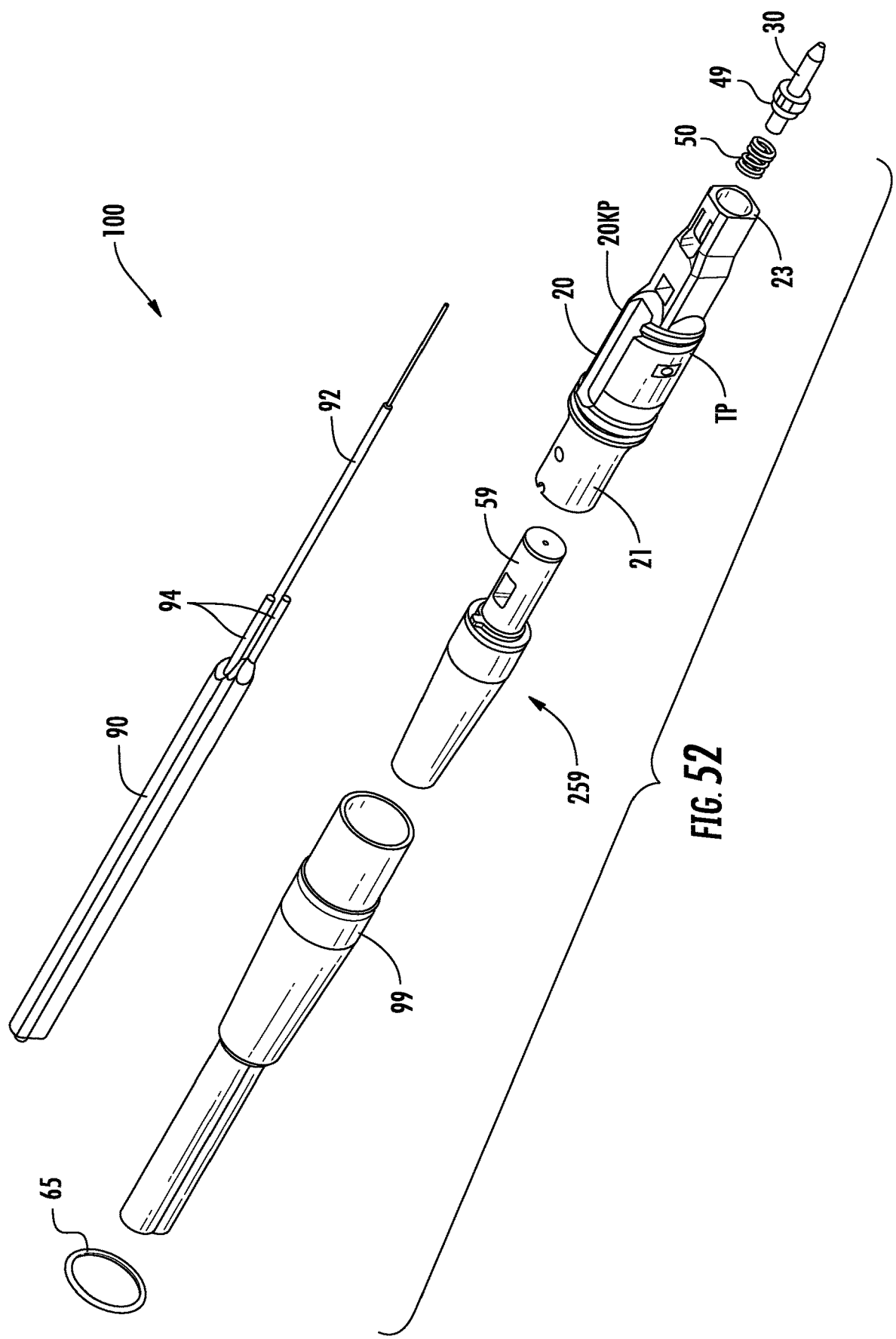

FIG. 51 is perspective view of another cable assembly 100 according to the concepts disclosed and FIG. 52 is an exploded view of the cable assembly 100. Housing 20 of this embodiment is similar to the housing disclosed herein, but further comprises a keying portion 20KP that extends into the transition region TR as shown, but embodiments without the keying portion 20KP are possible. The transition region TR of this housing is asymmetric. Specifically, the asymmetric transition region is a threaded portion TP, but other asymmetric geometries are possible as disclosed herein. In this embodiment, the keying portion 20KP is configured as a female key or a subtractive portion on housing 20 such as a female keyway or a slice on the side of the connector leaving a D-shape. The keying portion 20KP extends into the transition region as shown. The keying portion 20KP cooperates with a suitable keying portion in a connection port of a device such as an additive or male portion for inhibiting non-compliant connectors from being inserted into the connection port, Although, the keying portion 20KP is disposed about 180 degrees from the at least one locking feature 20L, other arrangements are possible where the keying portion 20KP is disposed less than 180 degrees from the at leak one locking feature 20L. In other embodiments, keying portion 20KP may be arranged as a subtractive portion that removes a side or slice of the housing 20 for creating a D-shaped cross-section over the length of the keying portion 20KP; instead of the female keyway shown.

Figure 53A:
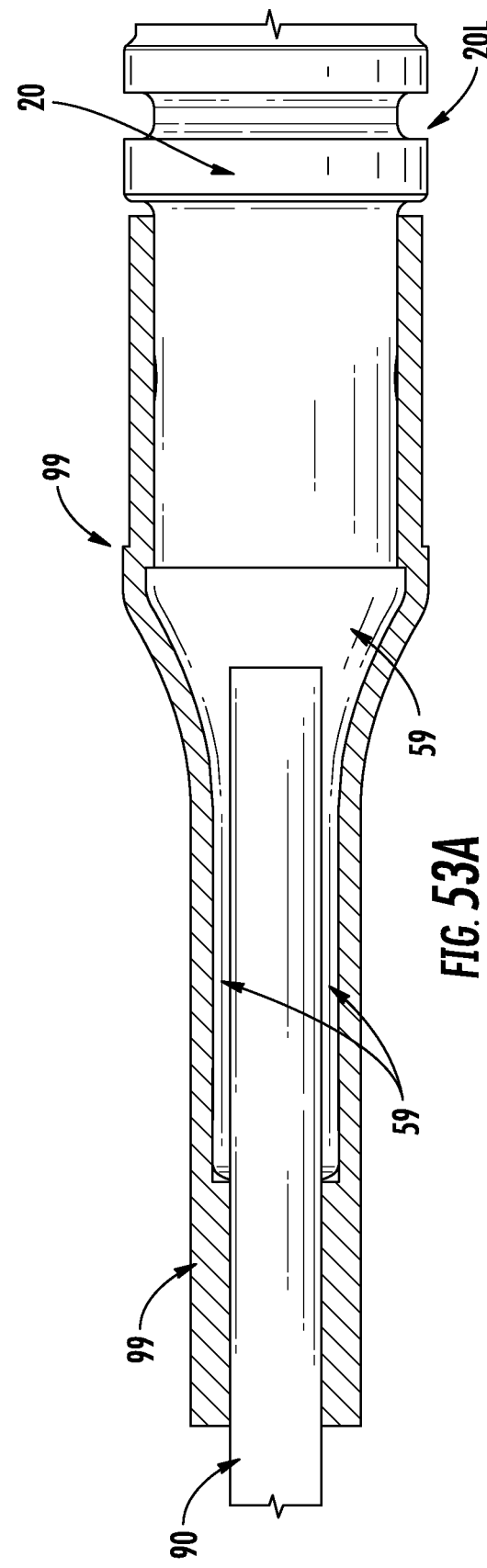
Figure 53:
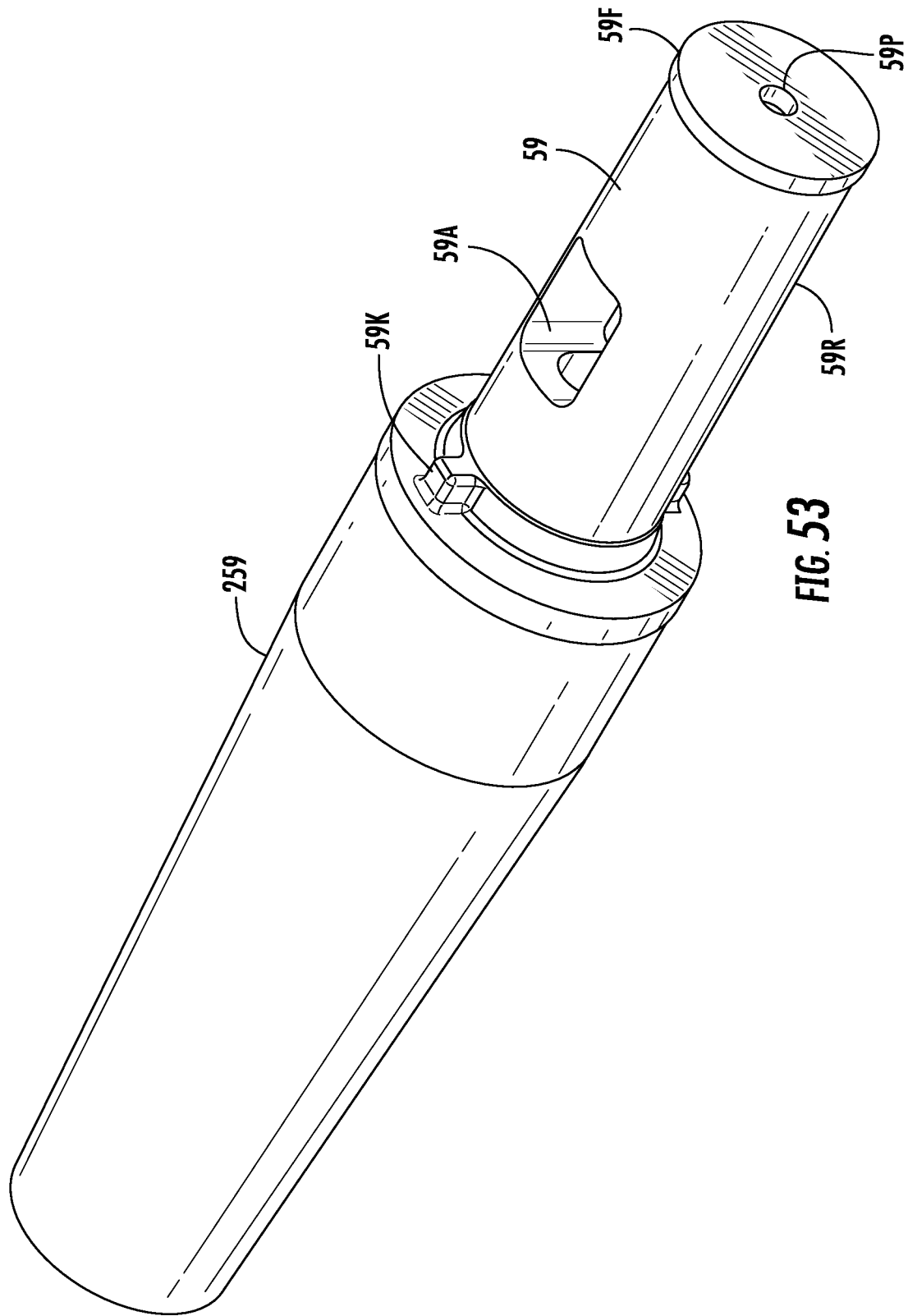
Figure 54:
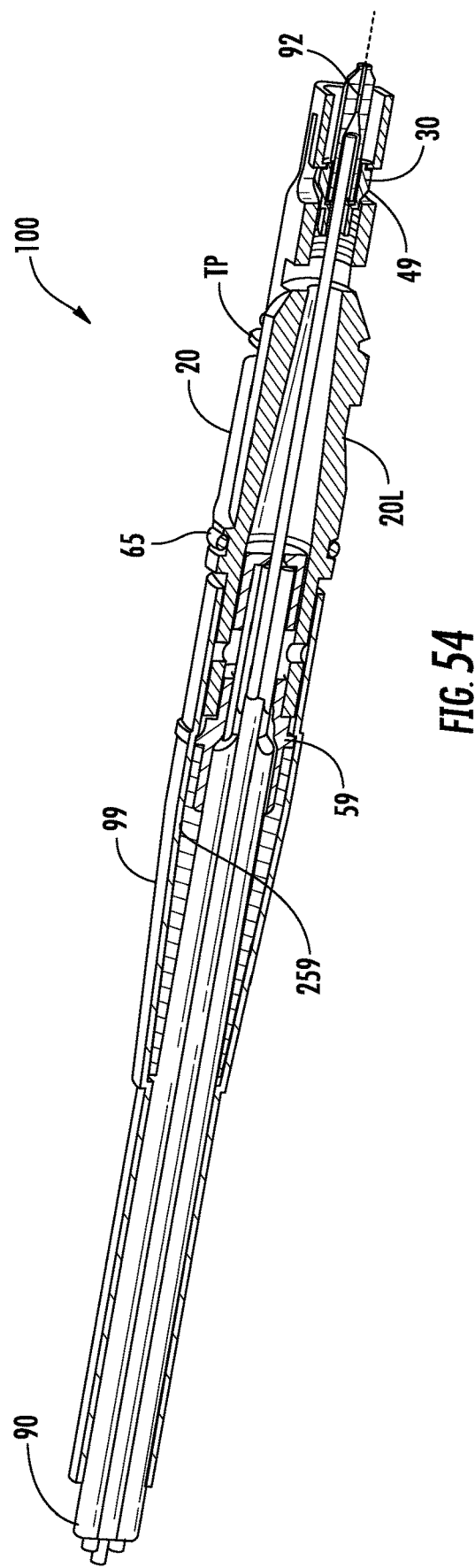

The internal construction of connector 10 of FIG. 52 is similar to that of FIGS. 70-78 where ferrule 30 disposed within a ferrule holder 49 and inserted from a front end 23 of the connector 10 and is discussed in more detail in relation to those FIGS. This embodiment also comprises a boot or overmold 259 disposed on the rear portion 59R of cable adapter 59 as best shown in FIG. 53. Further, when assembled a sealing element such a heat shrink 99 is disposed over the boot or overmold 259 as best shown in FIG. 54. The sealing element may also be disposed over a portion of the housing 20 as shown. Placing the sealing element over boot or overmold and a portion of the housing 20 allows for sealing of the cable jacket to the rear of the connector. This may also improve the bending strain-relief for the cable assembly.

Figure 51A:
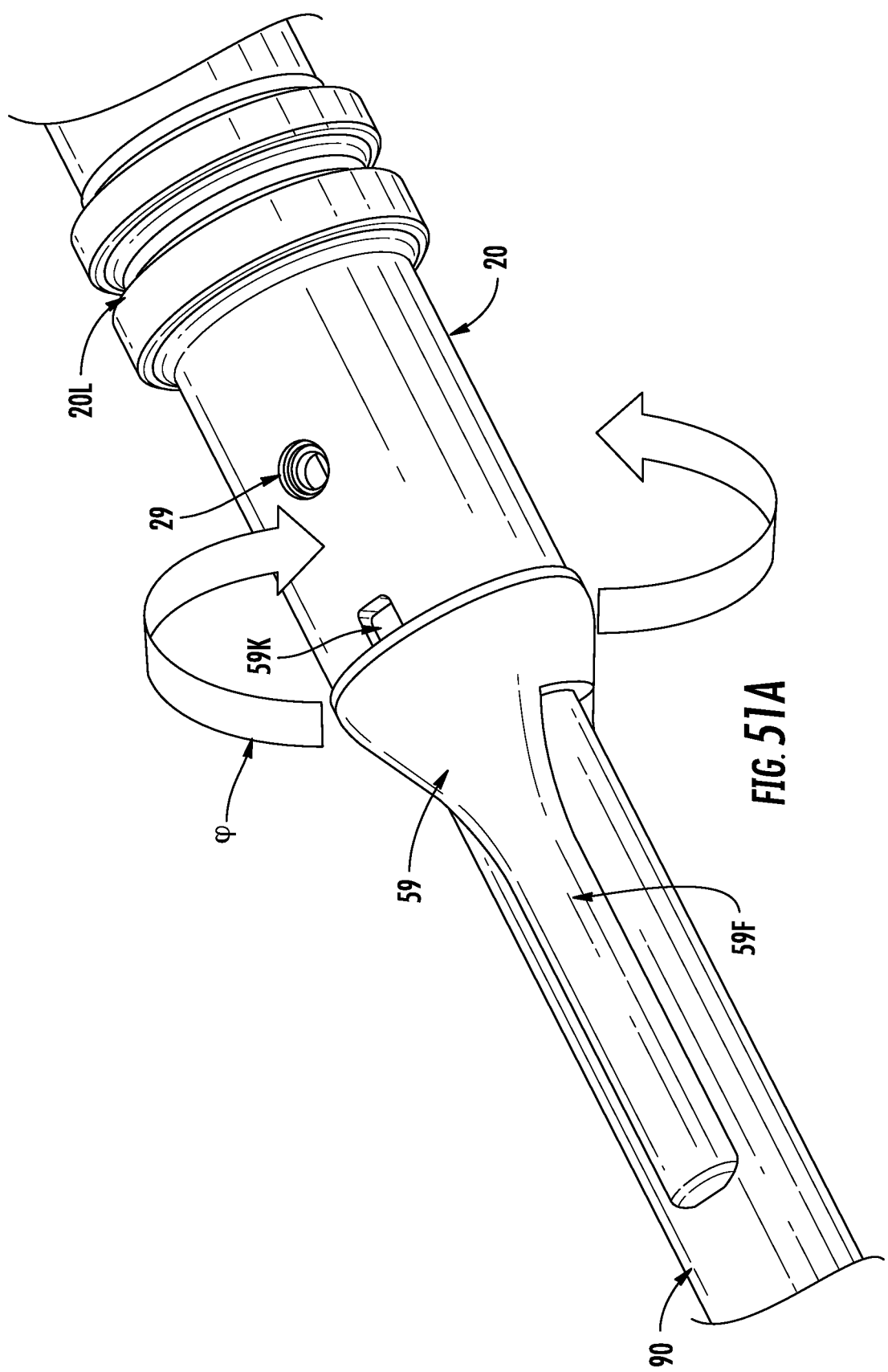
Figure 52A:
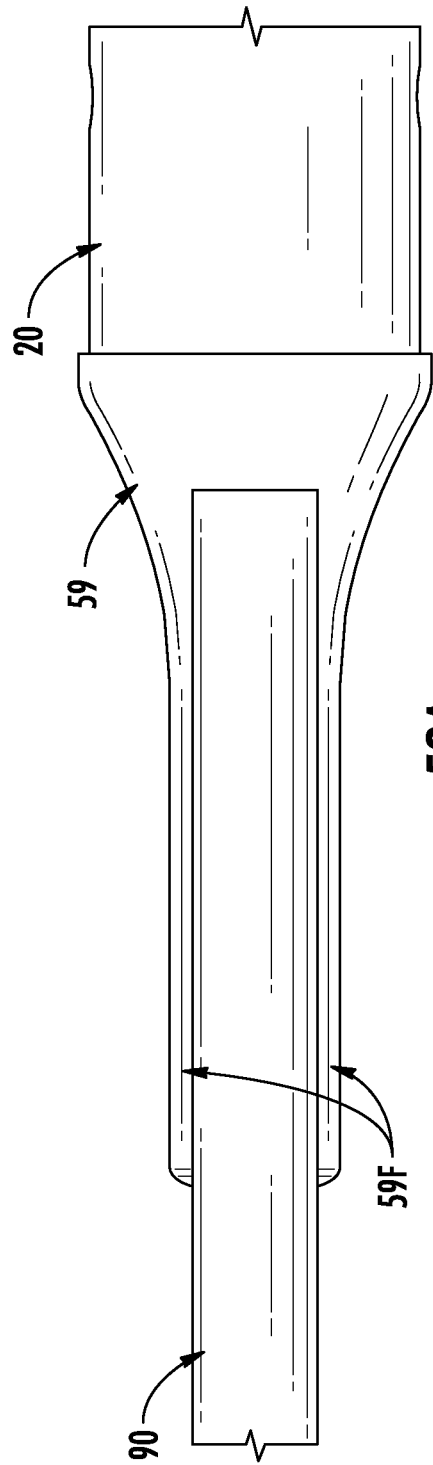

FIG. 51A is a rear perspective view of another cable assembly having cable adapter 59 with flexures 59F for bend-strain relief. FIGS. 52A and 53A are a side and sectional views of the cable assembly of FIG. 51A showing heat-shrink 99 before and after being installed. As depicted, if the cable adapter 59 uses flexures 59F they are generally aligned with the flat portions of cable 90 for cable bend relief. Also the cable adapter 59 may or may be able to have more than one rotational position with respect to the housing 20 depending on how the ends of the components cooperate or not. As depicted in FIG. 53A, housing 20 may have a stepped down portion at the rear end 21 for receiving a portion of heat shrink 99 and may cover the flexures 59F while also providing further cable bending strain-relief.

Figure 54A:
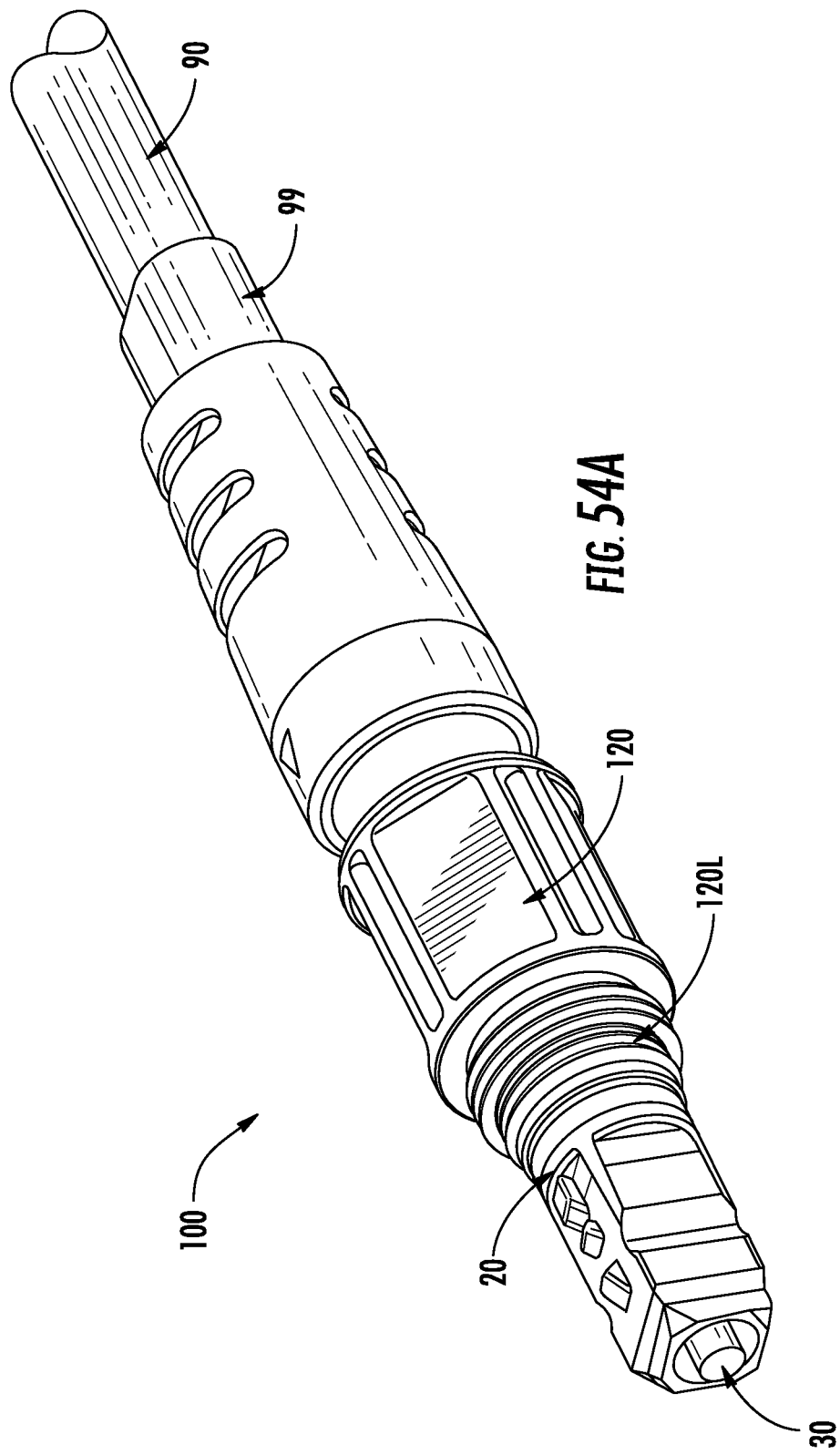
FIG. 54A is a front perspective view of another housing that may be used with the fiber optic connector concepts disclosed herein.

Still other variations of housings 20 are possible using the connector concepts disclosed herein. The other connector embodiments disclosed included locking features 201, that were integrated into the housing 20; however, other connectors may use locking features that are separate and distinct components from the housing 20. Although this may require a bigger connector footprint or more access space between connectors the concepts of separate and distinct components for the locking features are possible. FIG. 54A is a front perspective view of another housing 20 that may be used with the fiber optic connector concepts disclosed herein. In this embodiment, the securing feature is formed on a separate and distinct component from the housing 20. Specifically, securing feature is disposed on a coupling nut 120 having threads and that rotates about an outer shaft of housing 20 for securing the connector to a complimentary device. Additionally, the housing 20 may not have offset distance between transition portions of the housing 20 such as depicted in this embodiment.

Figure 55:
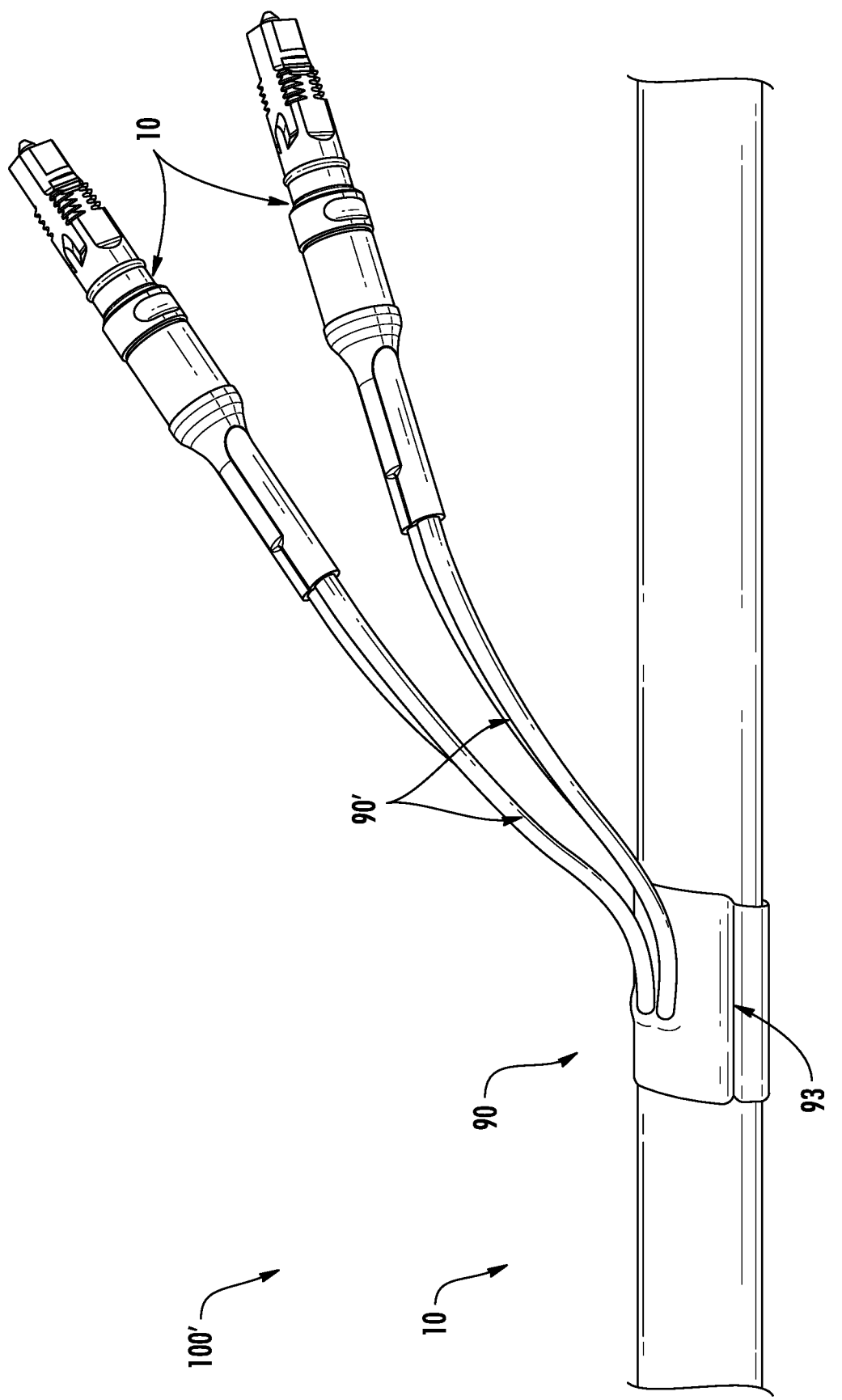
FIG. 55 depicts a distribution cable having a fiber optic connector according to the concepts disclosed disposed on a tether.

Connectors disclosed herein may be portions of other cable assemblies as desired. For instance, FIG. 55 depicts a distribution cable 100' having one or more connectors 10 on tether cables 90' that extend from a mid-span access 93 of a distribution cable. Of course, other suitable assemblies may use the connectors according to the concepts disclosed herein.

Figure 56:
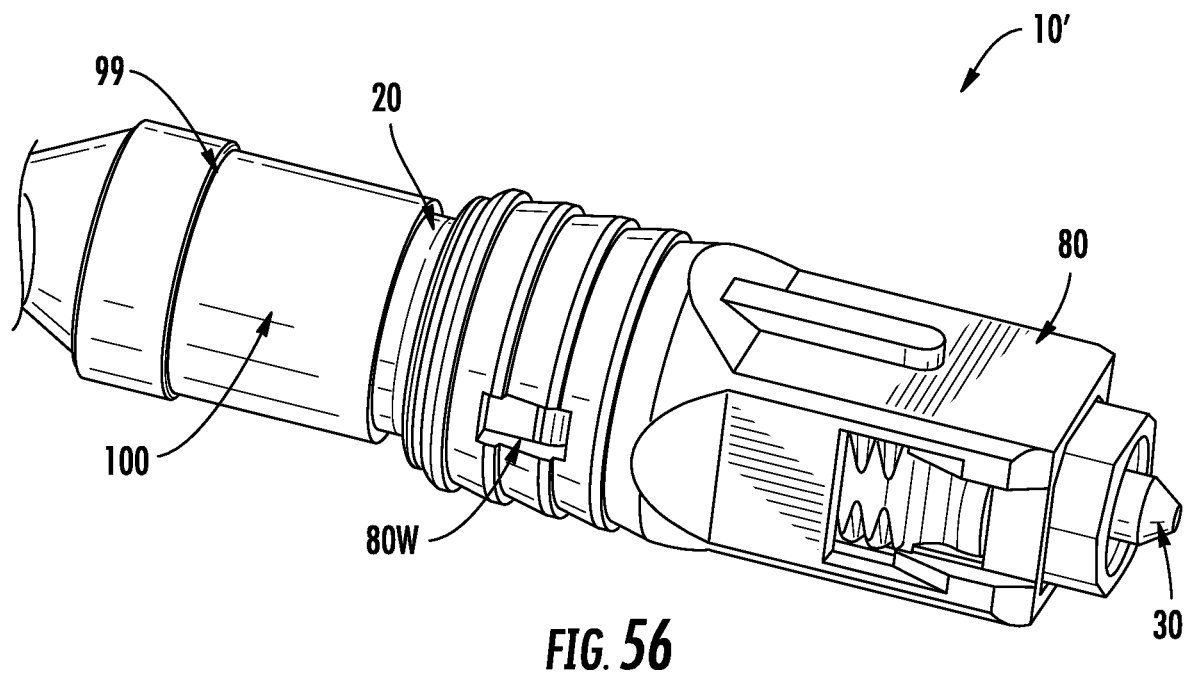
FIG. 56 is a perspective view of an explanatory fiber optic connector that further comprise a conversion housing attached about the housing for changing the fiber optic connector from a first connector footprint to a second connector footprint.
Figure 57:
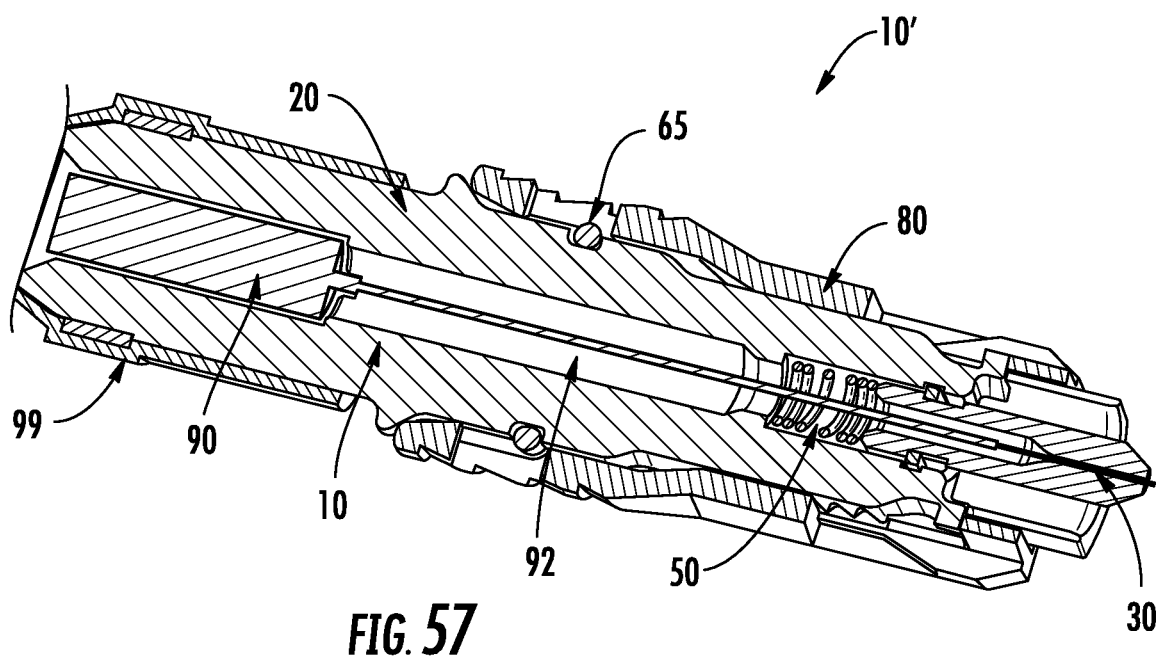
FIG. 57 is a sectional view of the fiber optic connector of FIG. 56.

By way of example, connectors disclosed herein may be converted from a first connector footprint to a second connector footprint. FIG. 56 is a perspective view of an explanatory connector 10' that further comprises a conversion housing 80 attached about the housing 20 for changing the connector 10' from a first connector footprint to a second connector footprint and FIG. 57 is a sectional view of the connector 10'. By way of example, the connector 10' may have a first connector footprint such as shown in FIG. 19 and be changed to a second connector footprint such as a SC connector by adding conversion housing 80. However, any of the suitable connectors disclosed herein may be converted as described herein. Conversion housing 80 cooperates with housing 20 for changing from the first connector footprint to the second connector footprint. In this embodiment, the changing of the first connector footprint to the second connector footprint comprises the use of a single component.

Figure 58:
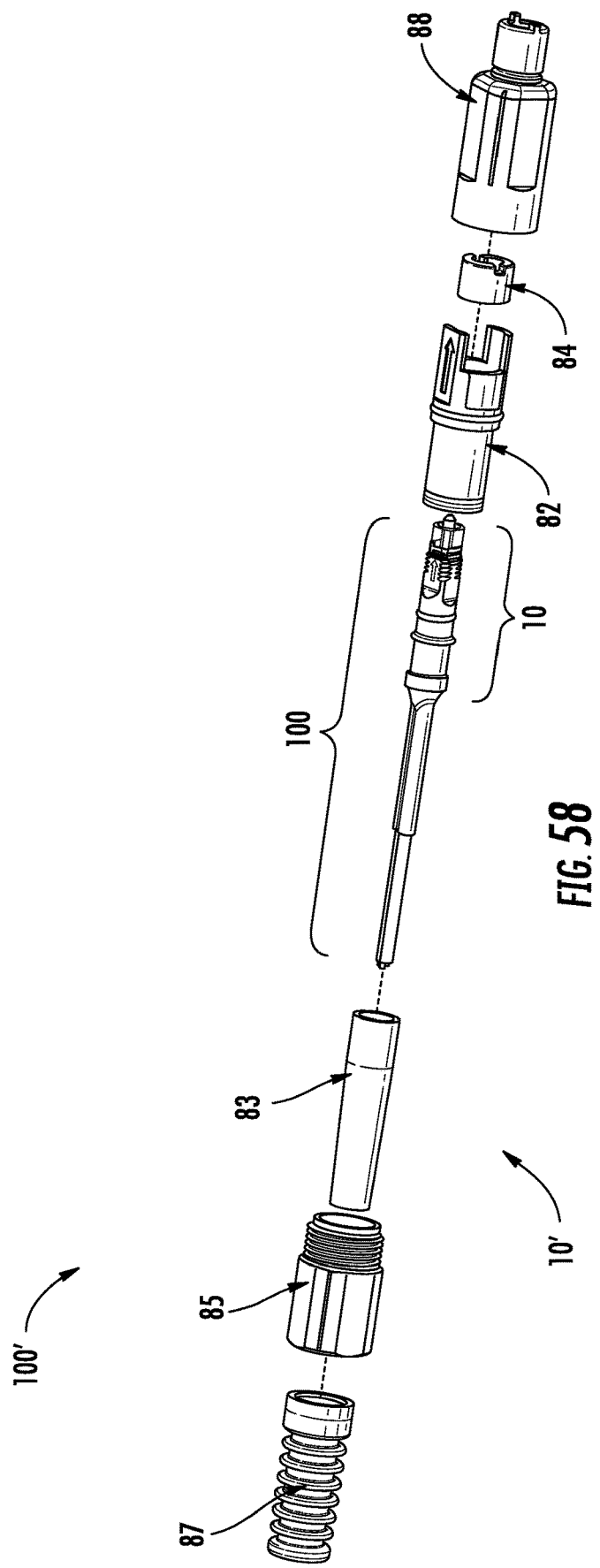
FIG. 58 is a partially exploded view of an explanatory fiber optic connector showing the fiber optic connector with a first connector footprint along with a conversion housing for changing the fiber optic connector to a second connector footprint that is a hardened connector footprint.
Figure 59:
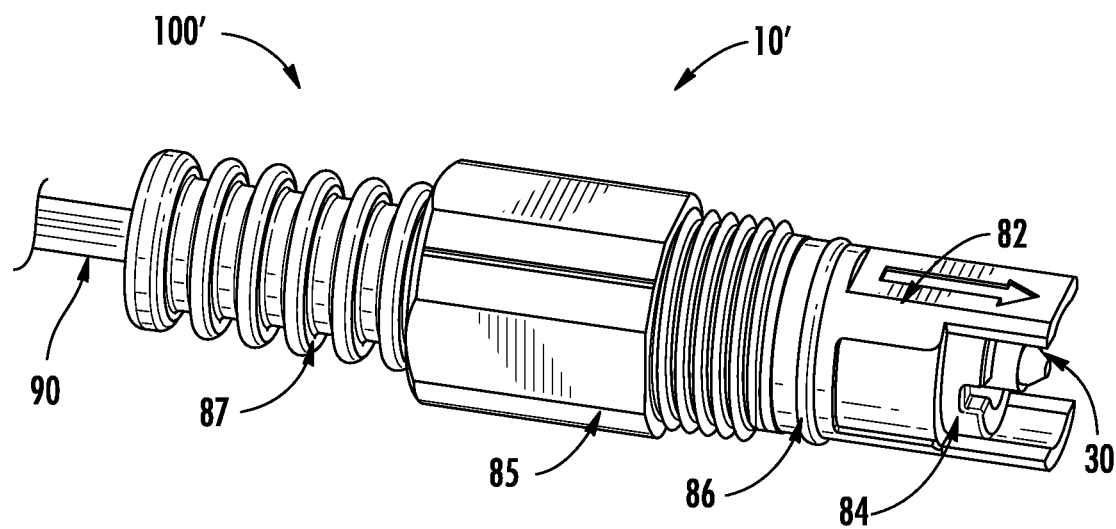
FIG. 59 is an assembled view of the fiber optic connector of FIG. 58 showing the second connector footprint as a hardened connector footprint with the dust cap removed for clarity.
Figure 60:
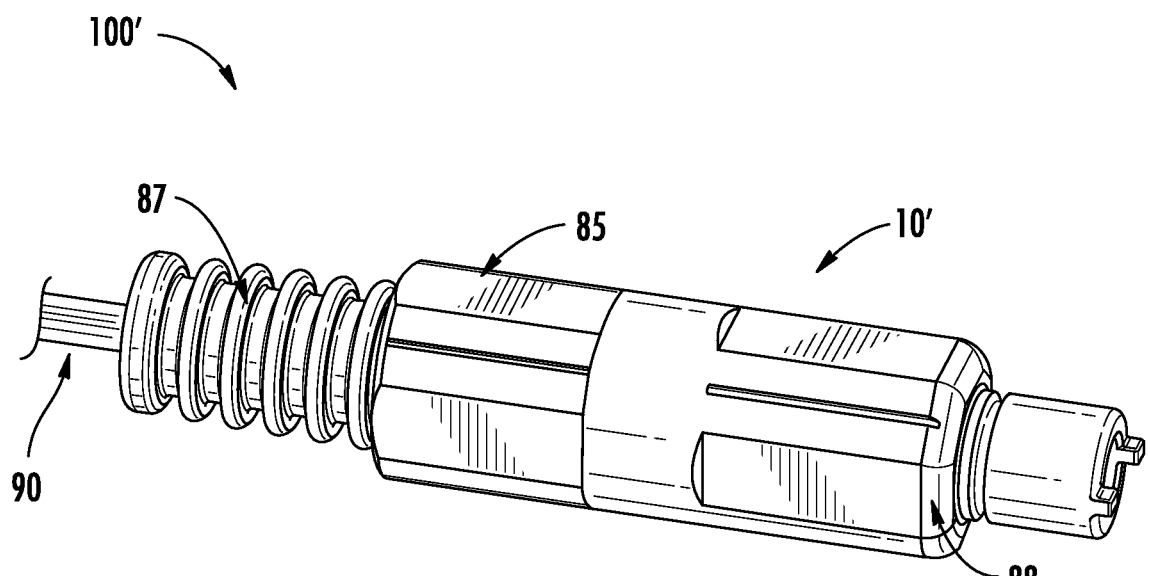
FIG. 60 is an assembled view of the fiber optic connector of FIG. 58 showing the second connector footprint with the dust cap installed.
Figure 61:
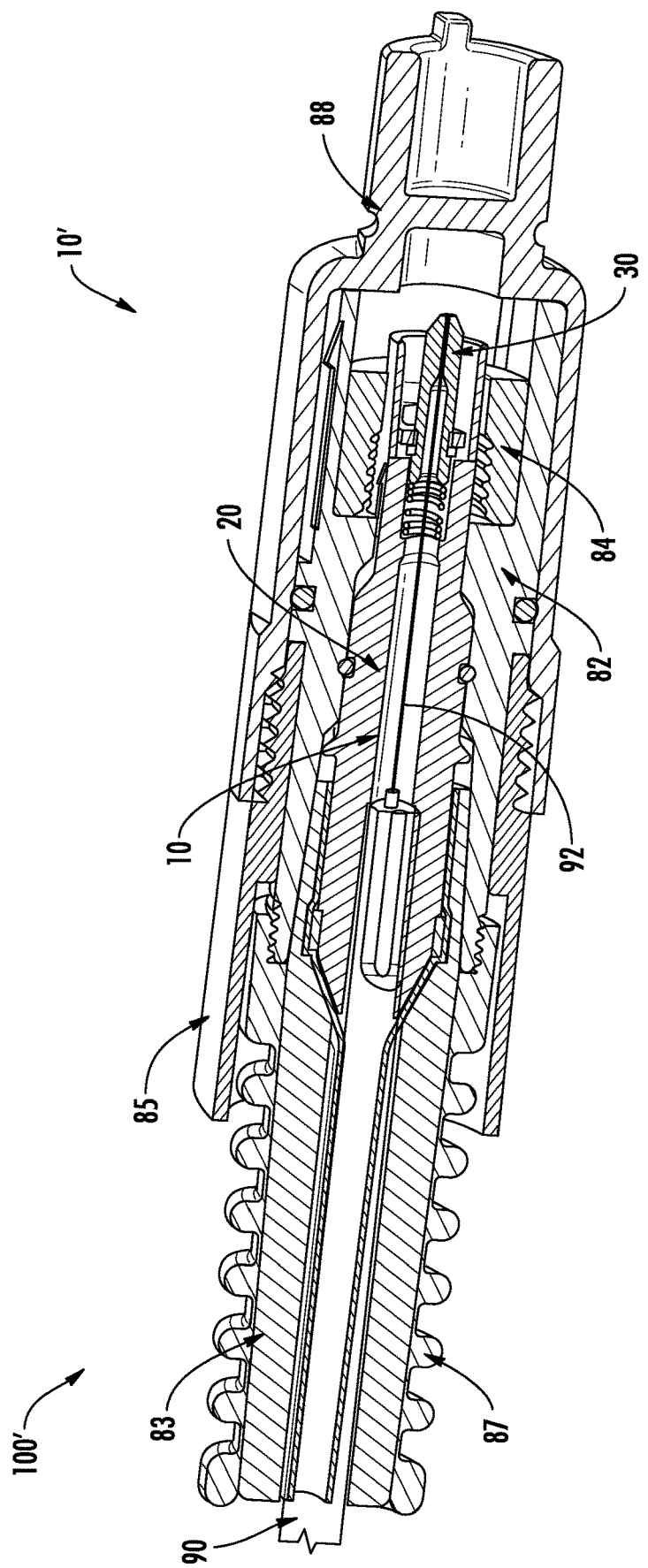
FIG. 61 is a sectional view of the fiber optic connector of FIG. 60.

In other embodiments, the changing of the first connector footprint to the second connector footprint may comprise the use of a plurality of components. Illustratively, FIG. 58 is a partially exploded view of another connector 100' that may be changed from a cable assembly 100 having first connector footprint 10 to a second connector footprint 10' as shown assembled in FIG. 59, Further, this embodiment of the second connector footprint 10' comprises a hardened connector footprint. Hardened connector footprint means that the connector is suitable for outdoor environments without be protected within a closure. Any suitable connector 10 disclosed herein may be used for such a conversion from the first footprint to the second footprint. FIG. 58 depicts cable assembly 100 with connector 10 with the plurality of components for the conversion to the second footprint exploded for depicting the assembly of the components. In this particular embodiment, the plurality of components are suitable for converting connector 10 to a hardened OptiTap® compatible connector; however, the plurality of components may be configured for converting connector 10 into other hardened connectors as desired. In this embodiment, the plurality of components for the conversion to the hardened connector comprise an inner boot 83, an outer boot 87, a conversion housing 82 configured as a shroud, a retaining member 84 configured as a retaining nut and a coupling nut 85. To make the conversion to the hardened connector, the inner boot 83 is slid over up over part of connector 10 and the conversion housing or shroud 82 is slid rearward into position and then the retaining nut 84 is secured to the threads of connector 10. The coupling nut 85 is slid onto shroud 82 and then outer boot 87 can be slid-up into position from the rear. Shroud 82 may include an O-ring 86 for sealing during mating. FIG. 60 is an assembled view of the fiber optic connector of FIG. 58 showing the hardened second connector footprint with the dust cap 88 installed thereon. FIG. 61 is a sectional view of the hardened connector of FIG. 60.

Figure 62:
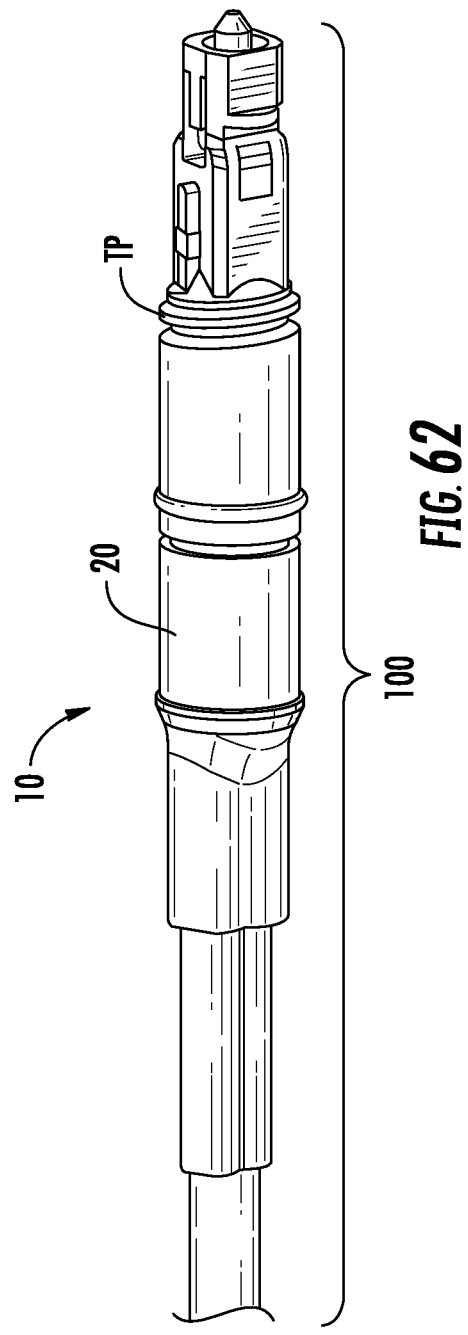
FIG. 62 is a perspective view of an explanatory fiber optic connector that may have a conversion housing attached about the housing for changing the fiber optic connector from a first connector footprint to a second connector footprint.
Figure 63:
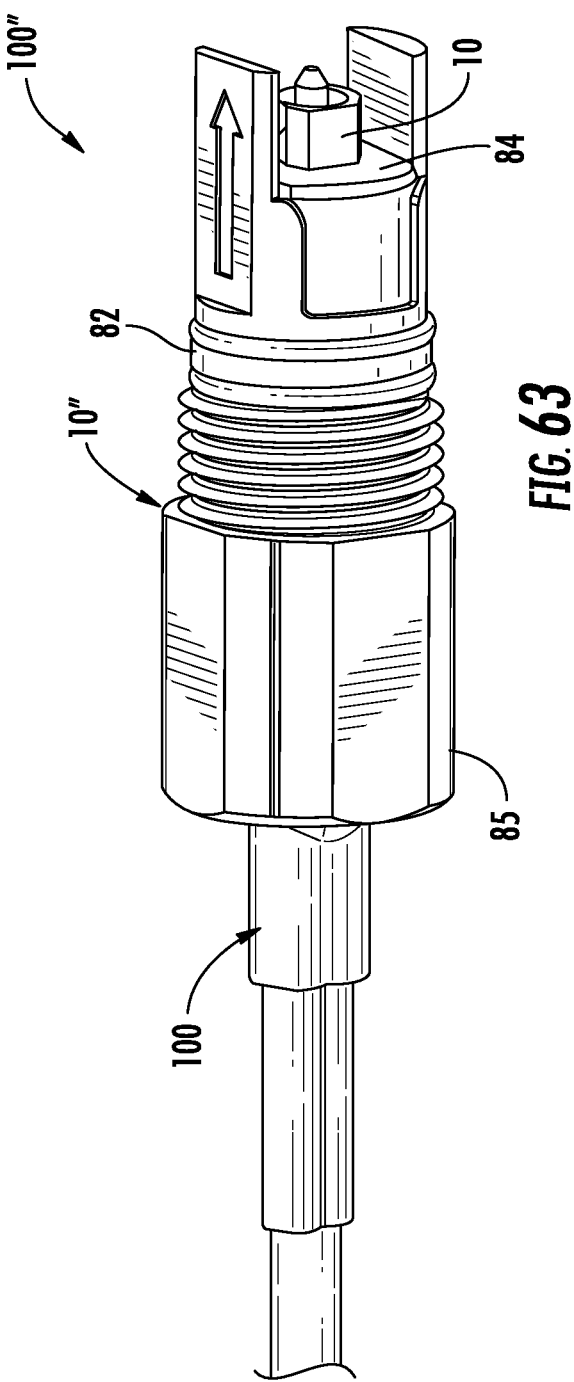
FIG. 63 is an assembled view of the fiber optic connector of FIG. 62 after conversion to a second connector footprint configured as a hardened connector footprint with the dust cap removed for clarity.

Still other embodiments for the conversion of connectors 10 are possible according to the concepts disclosed herein. By way of example, connectors 10 similar to the connector 10 of FIG. 2A with the transition region TR having a threaded portion TP may be converted to other connectors. FIG. 62 depicts cable assembly 100 having connector 10 with a connector housing 20 comprising a transition region TR having a threaded portion TP similar to connector 10 of FIG. 2A. FIG. 63 shows the connector 10 of FIG. 62 with a conversion housing 82 attached about the housing 20 for changing connector 10 with a first connector footprint to a connector 10" with second connector footprint. Second connector footprint for connector 10" comprises a hardened connector footprint, thereby converting cable assembly 100 to cable assembly 100".

Figure 64:
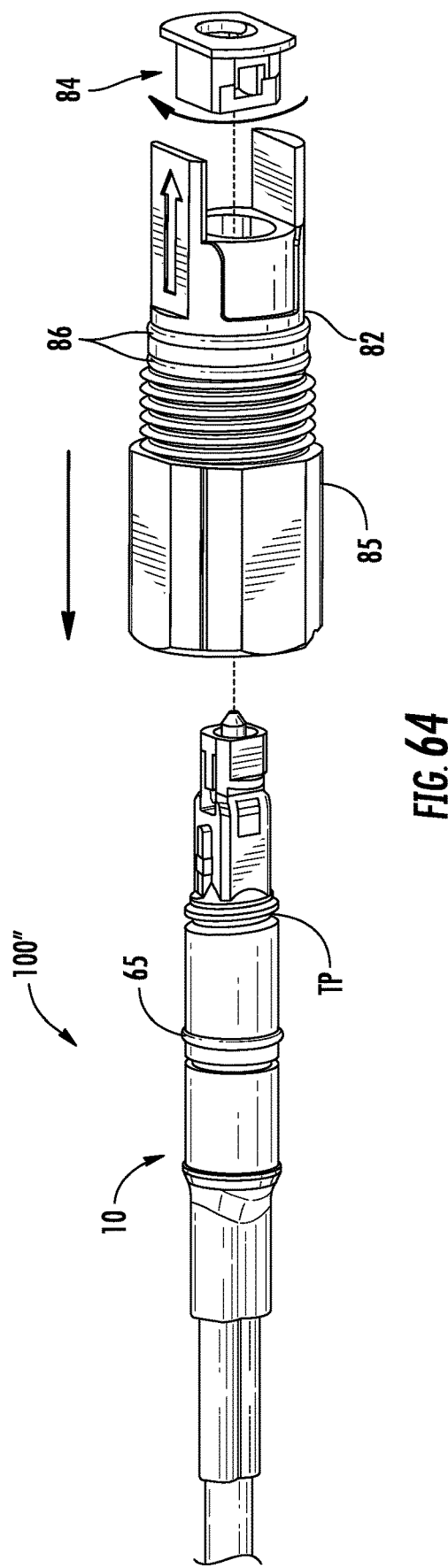
FIG. 64 is a partially exploded view of the fiber optic connector of FIG. 63.

FIG. 64 is a partially exploded view of connector 10" of FIG. 63, This particular conversion uses a plurality of components for converting connector 10 to a hardened OptiTap® compatible connector 10"; however, the plurality of components may be configured for converting connector 10 into other hardened connectors as desired. The plurality of components for the conversion to connector 10" comprise the conversion housing 82 configured as shroud, a retaining member 84 configured as a retaining clip, and a coupling nut 85. Shroud 82 may include one or more O-rings 86 for sealing during mating with a complimentary device.

Figure 65:
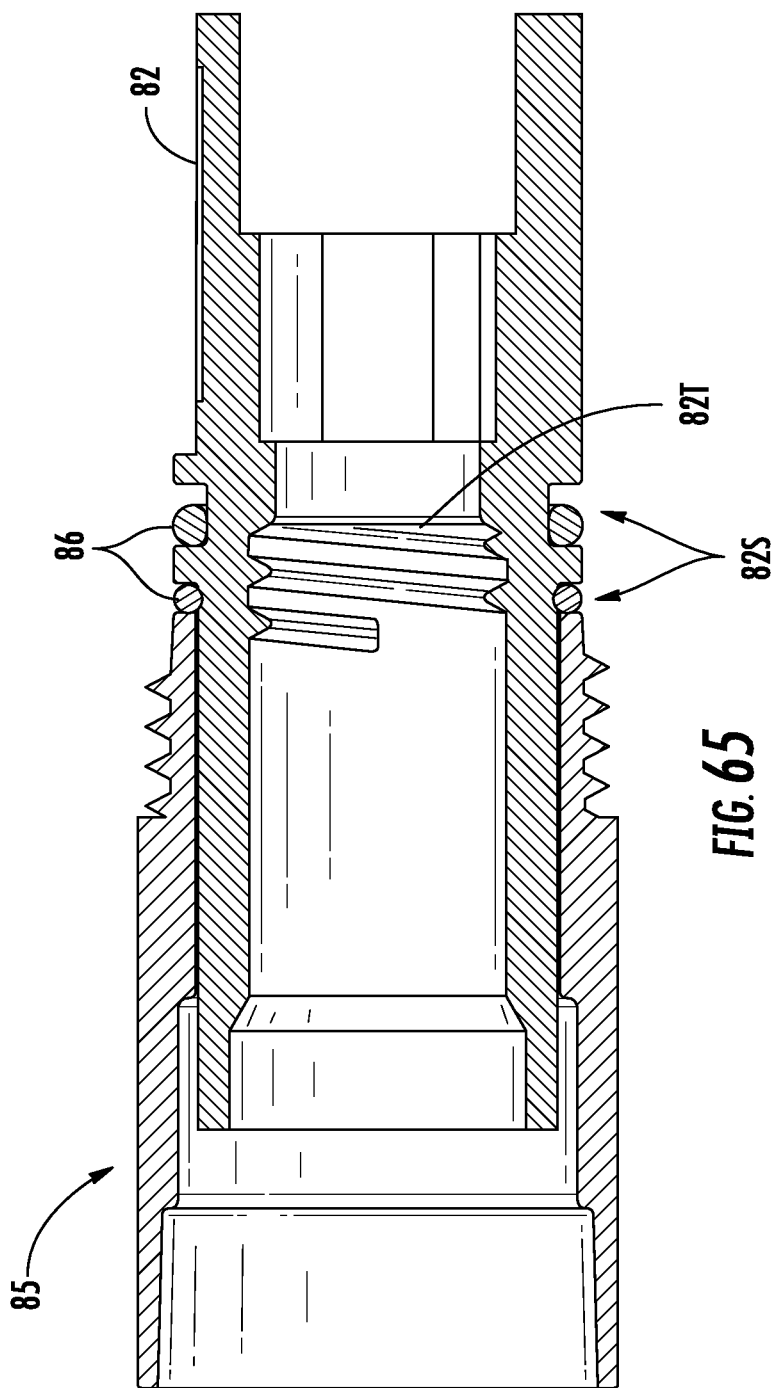
FIG. 65 is a sectional view of the conversion housing and coupling nut of the fiber optic connector of FIG. 63.
Figure 66:
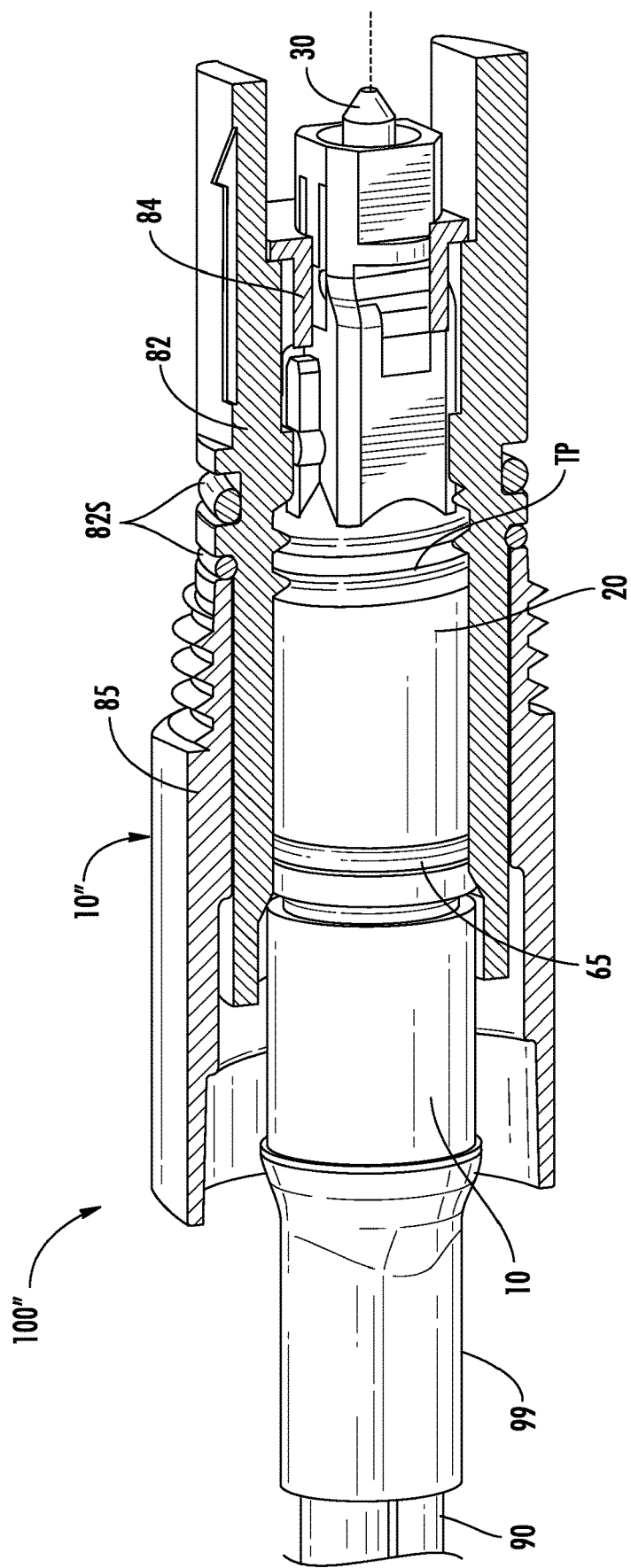
FIGS. 66 and 67 are sectional views of the fiber optic connector of FIG. 63.

To make the conversion to the connector 10", the shroud 82 is slid into a passageway of coupling nut 85 as shown and then slid over connector 10 from the front end. Next, the shroud 82 is rotated so that the internal threads 82T of shroud 82 as best shown in FIG. 65 engage with the threaded portion TP of connector 10 until the shroud 82 is secured to connector 10. Thereafter, retaining member 84 is aligned with the front end of the shroud 82 and then pushed onto the connector 10 until it is seated and retained on housing 20, thereby inhibiting the shroud 82 from backing off the threaded portion TP of connector 10 as depicted in FIG. 66.

Figure 68:
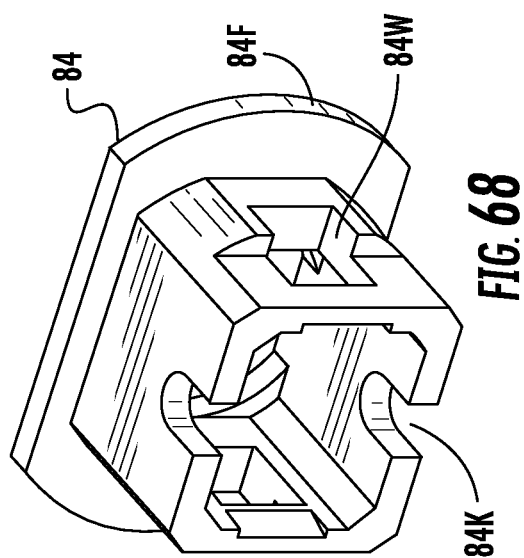
FIGS. 68 and 69 are perspective views of the retaining member of the fiber optic connector of FIG. 63.
Figure 69:
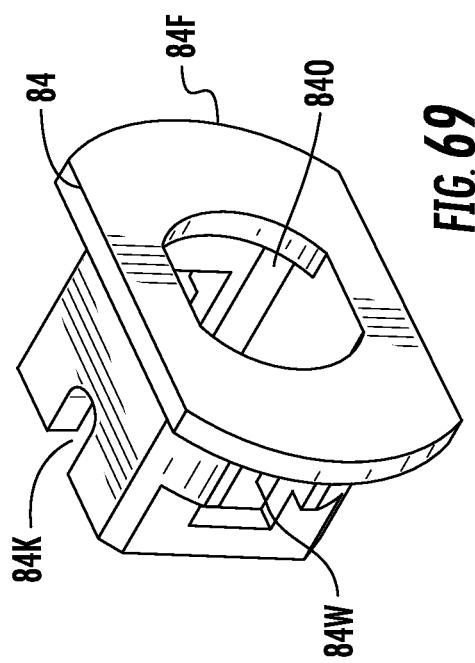
Figure 67:
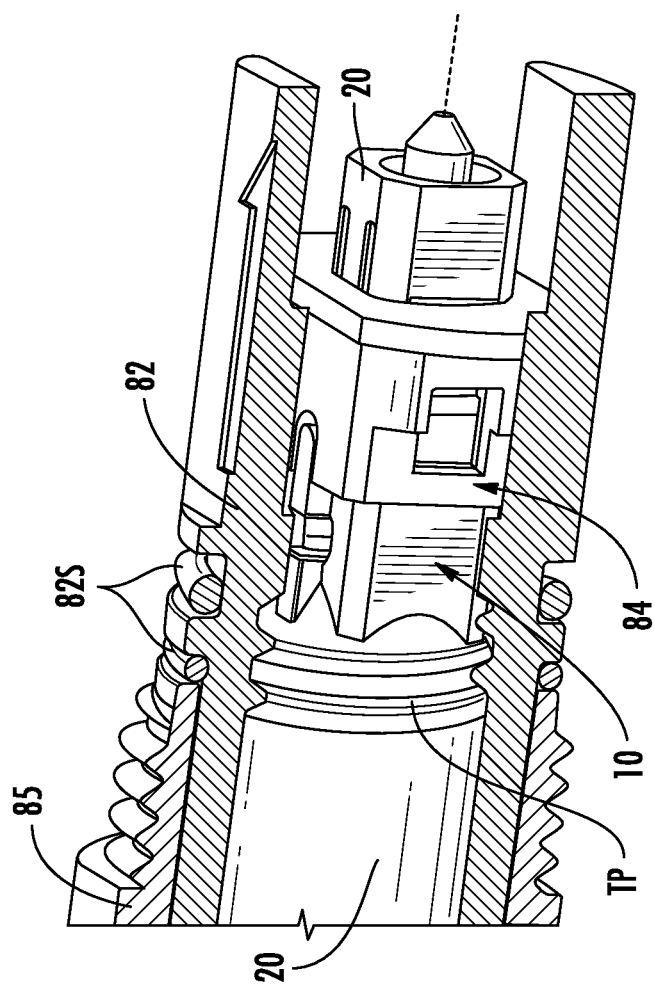

FIG. 67 is a detailed sectional view of the front end of connector 10" showing the retaining member 84 secured to connector 10 and FIGS. 68 and 69 are perspective views of the retaining member 84. As depicted, retaining member 84 comprises an opening 84O at the front for receiving a portion of housing 20 therethrough when installed. Additionally, retaining member 84 also has a front flange 84F shaped to the passageway of shroud 82 so it may be inserted and engage connector 10. Retaining member 84 may also include one or more keyways 84K for allowing the retaining member to slide past keying feature 20K of connector 10. Windows 84W disposed on opposite sides of retaining member 84 engage with ears 27 of housing 20 for securing the retaining member 84 to connector 10. Once installed, retainer member 84 inhibits the shroud 82 from rotating and coming off connector 10. Connector 100" may also include a dust cap 88 like connector 10' of FIG. 60.

The connector concepts disclosed herein may be used with still other connector designs such as connectors using a ferrule disposed in a ferrule holder. FIGS. 70-78 disclose a cable assembly 100 comprising connector 10. Connector 10 of FIGS. 70-78 is similar to other connectors 10 disclosed herein, but it has ferrule 30 disposed within a ferrule holder 49 and inserted from a front end 23 of the connector 10 as depicted in FIG. 75. Housing 20 of the connector 10 of FIGS. 70-78 is similar to other housings 20 discussed herein and differences with be described while other details will not be repeated for the sake of brevity.

Figure 70:
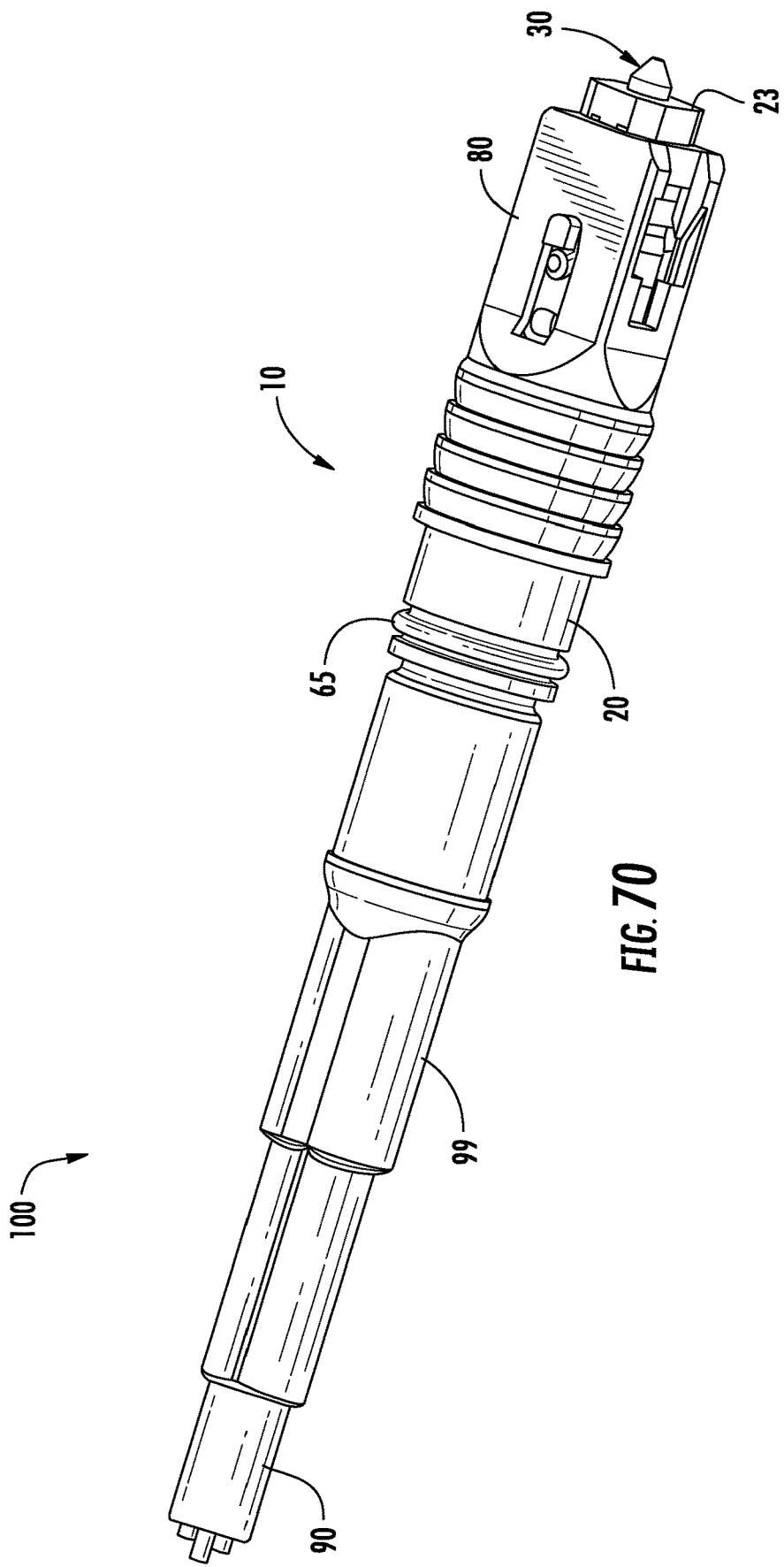
FIGS. 70 and 71 respectively are perspective and sectional views of another connector having a ferrule disposed within a ferrule holder that is loaded from the front end of the connector 10 and having a SC housing attached.
Figure 78:
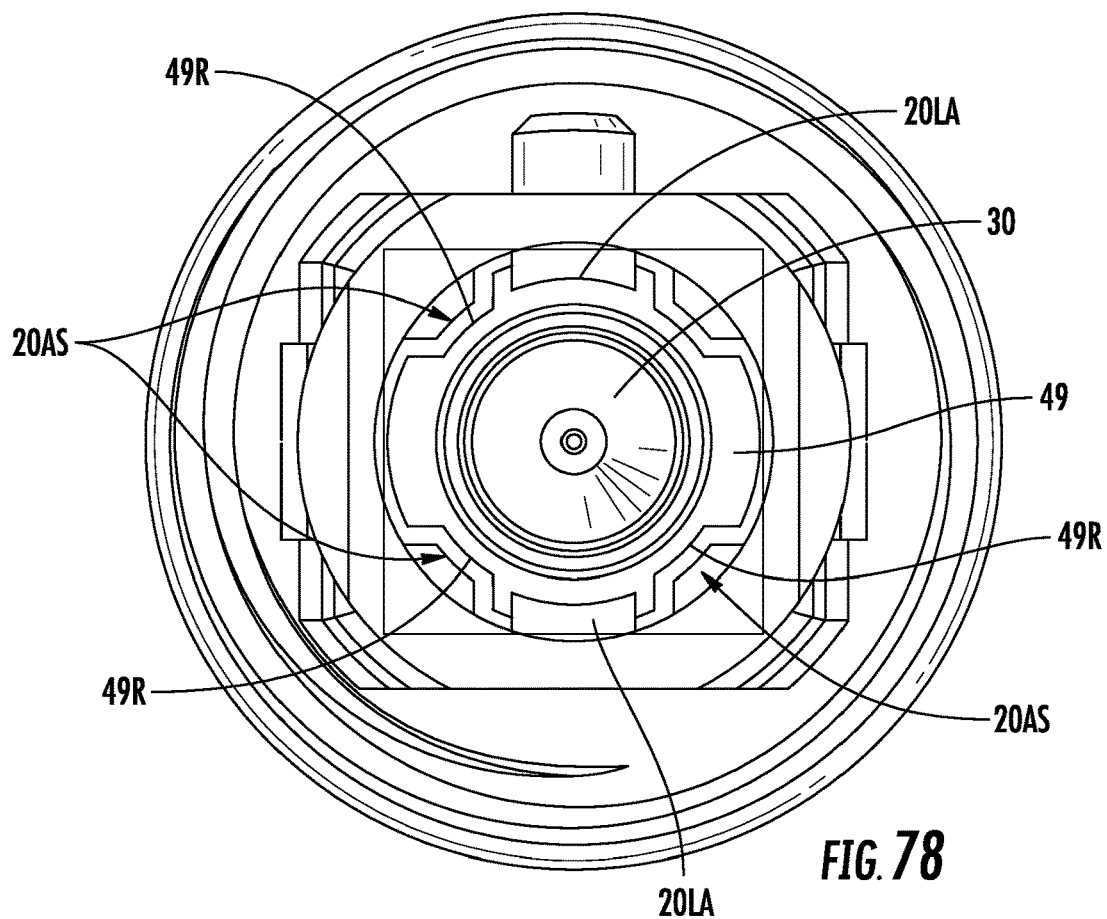
FIG. 78 is a front end view of the connector depicted in FIGS. 70 and 71 without the SC housing showing the details for the retention of the ferule holder assembly.

FIGS. 70 and 71 respectively are perspective and sectional views showing cable assembly 100 comprising connector 10 having a ferrule 30 disposed within a ferrule holder 49, thereby forming a ferrule sub-assembly (not numbered) that is biased to a forward position by resilient member 50. When assembled, ferrule sub-assembly (60) is configured to cooperate with the housing (20) for inhibiting the rotation of the ferrule subassembly (60) with respect to the housing (20) as best shown in FIG. 78.

As depicted in FIG. 70, connector 10 is configured so that conversion housing 80 may be attached to housing 20 for converting to an SC connector. Likewise, connector 10 has housing 20 with a transition region TR with a threaded portion TP similar to the housing 20 depicted in FIG. 2A so it may be converted to a hardened connector as depicted in FIGS. 62-69.

Figure 72:
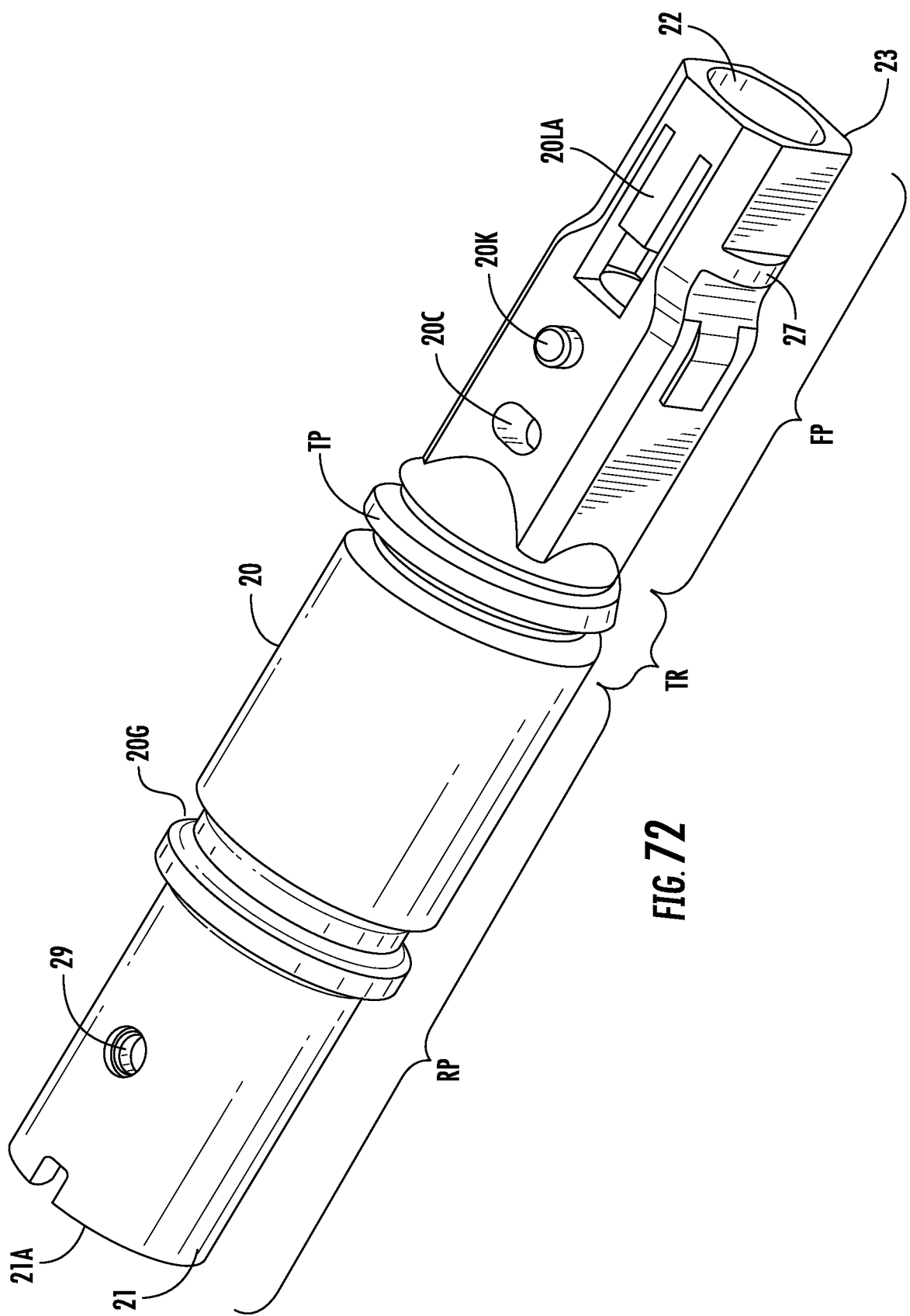
FIG. 72 is a perspective views of the connector housing of FIGS. 70 and 71.
Figure 73:
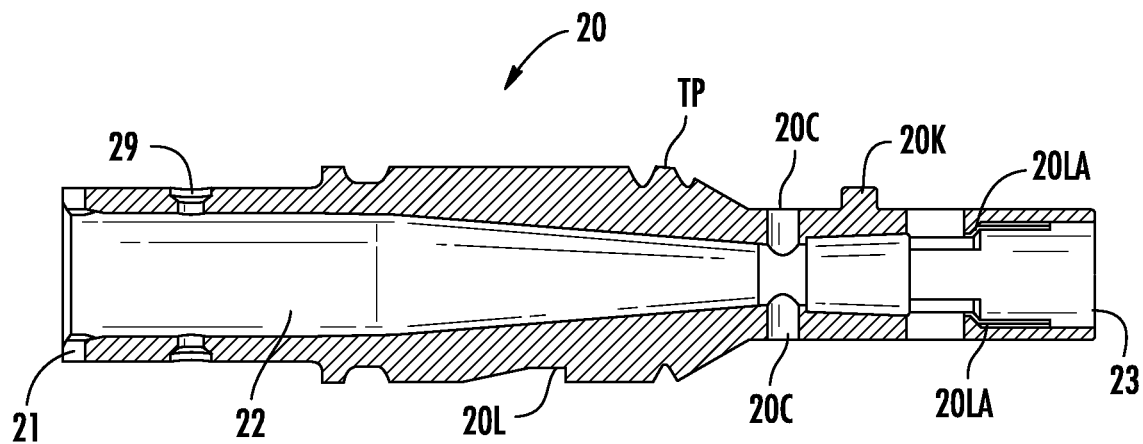
FIGS. 73 and 74 are cross-sectional views of the housing of the connector of FIGS. 70 and 71.
Figure 74:
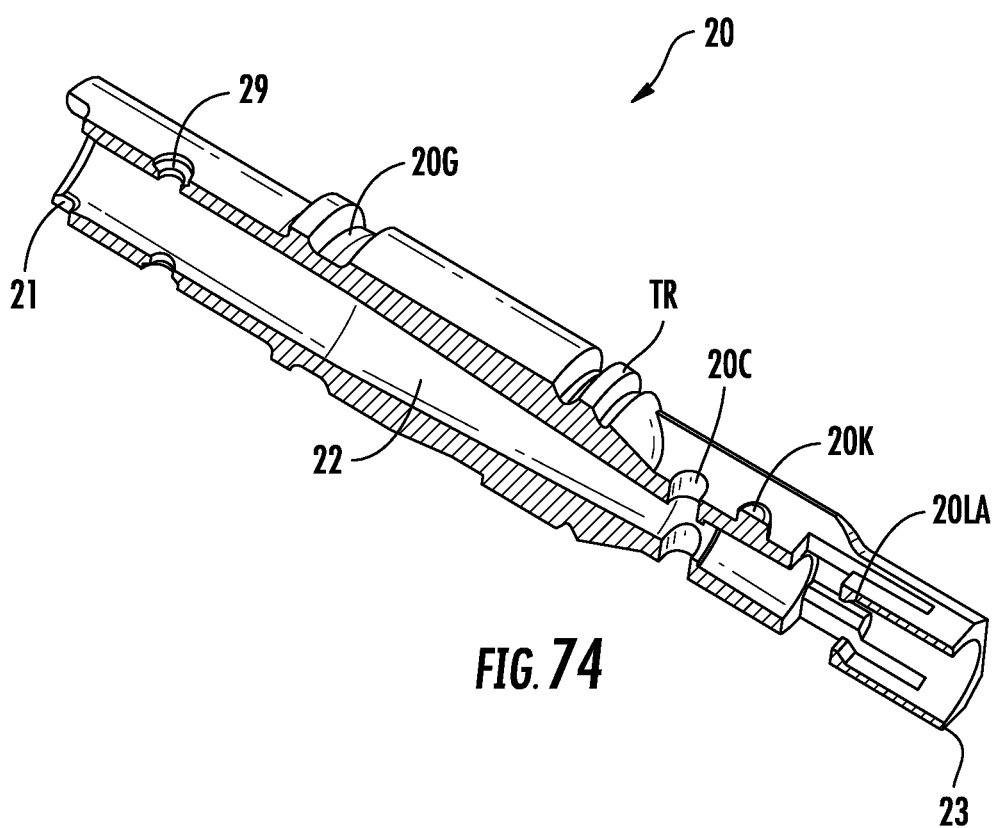
Figure 75:
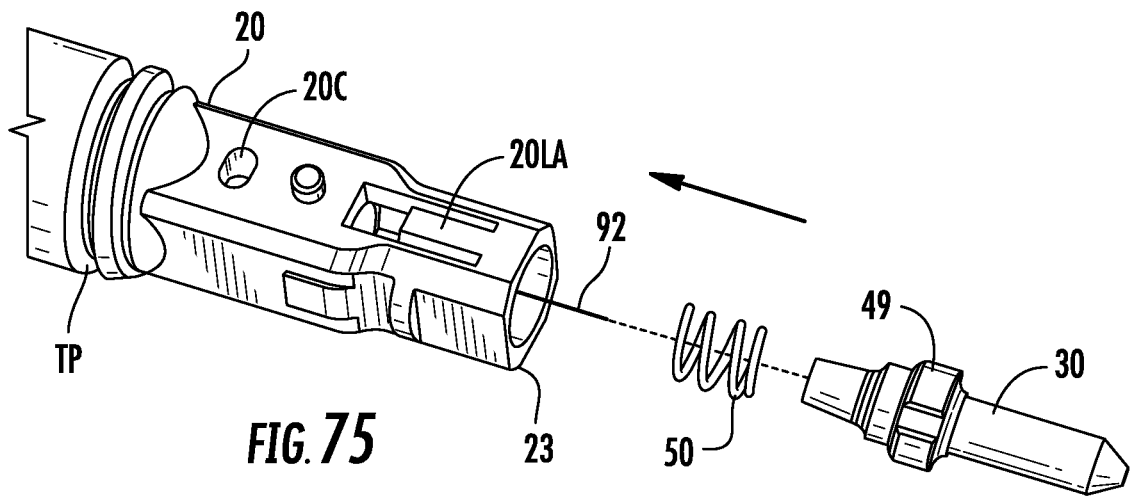
FIG. 75 is a partially exploded view of the front end of the connector depicted in FIGS. 70 and 71.

FIGS. 72-74 are various views of the housing 20 of the connector 10 depicted in FIGS. 70 and 71. FIG. 72A is bottom perspective view showing the locking feature 20L of housing 20 configured as a ramp (not numbered) with a ledge (not numbered) as the retaining feature for cooperating with a suitable securing feature of a device. Housing 20 is similar to the housings 20 disclosed herein, but further comprises one or more latch arms 20LA disposed in a front portion FP of housing 20 as depicted. Moreover, the front opening of passageway 22 is sized for allowing the insertion of ferrule holder 49 from the front end 23 of housing 20 such as shown in the cross-section of FIG. 73. Latch arms 20LA are connected at the front end and cantilevered at the rear end so they can be deflected when ferrule holder 49 is inserted and then spring back to retain the ferrule holder 49 once it is fully-inserted.

Figure 76:
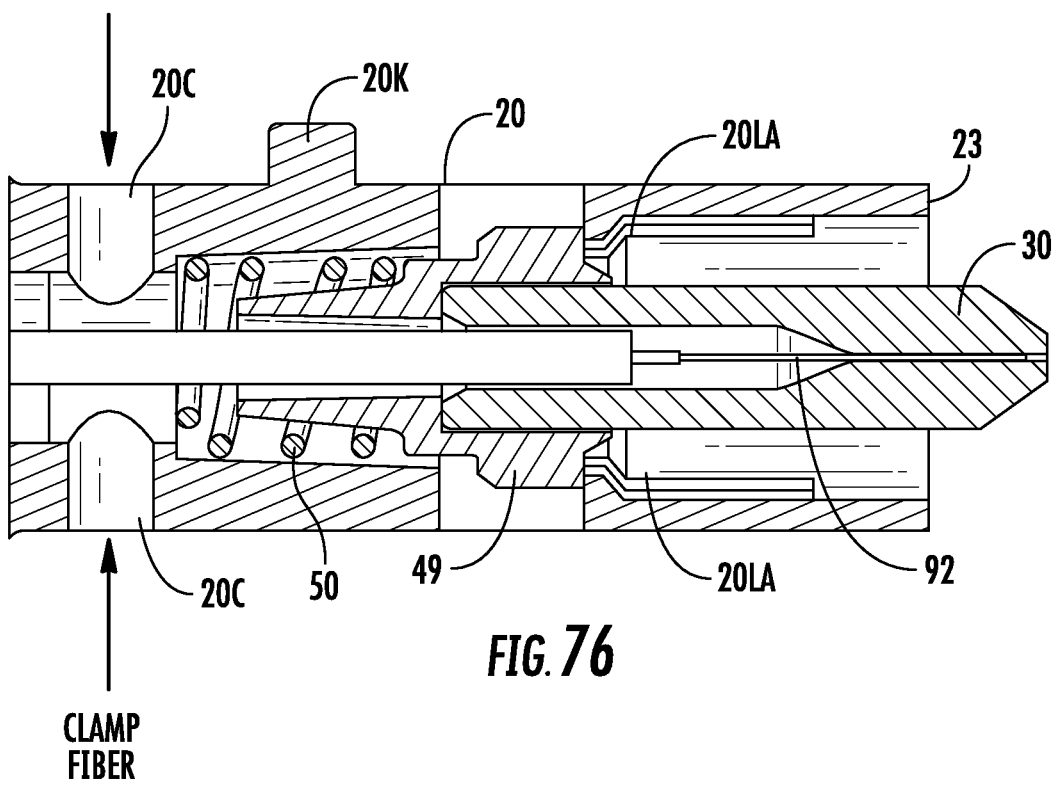
FIG. 76 is a cross-sectional view of the front end of the connector depicted in FIGS. 70 and 71.

FIG. 75 is a partially exploded view of the front end of connector 10 prior to the ferrule holder 49 and ferrule 30 being inserted into housing 20. FIG. 76 is a cross-sectional view of the front end of the connector 10 after the ferrule holder 49 and ferrule 30 are inserted into housing 20 and retained by latch arms 20LA. As depicted, latch arms 20LA have ramp portions for aiding portions of ferrule holder 49 to deflect the latch arms 20LA outward as the ferrule holder 49 is inserted into housing 20 and then spring back over ferrule holder 49 for retaining the same.

Referring to FIG. 75, optical fiber 92 of cable 90 is assembled to extend past the front end 23 and resilient member 50 is threaded about optical fiber 92 and then the ferrule holder 49 and ferrule 30 are threaded over optical fiber 92. Optical fiber 92 may be clamped in a suitable manner through bores 20C disposed on opposite side of housing 20 as represented by the arrows in FIG. 76 when ferrule holder 49 is being inserted into housing 20. Clamping optical fiber 92 inhibits the optical fiber 92 from pushing rearward or buckling as ferrule holder 49 inserted. Ferrule holder 49 is aligned to a suitable rotational position and pushed rearward into housing 20 until retained by latch arms 20LA as depicted in FIG. 76. Optical fiber 92 is secured to ferrule 30 in a suitable fashion and the end face of ferrule 30 is polished.

Figure 77:
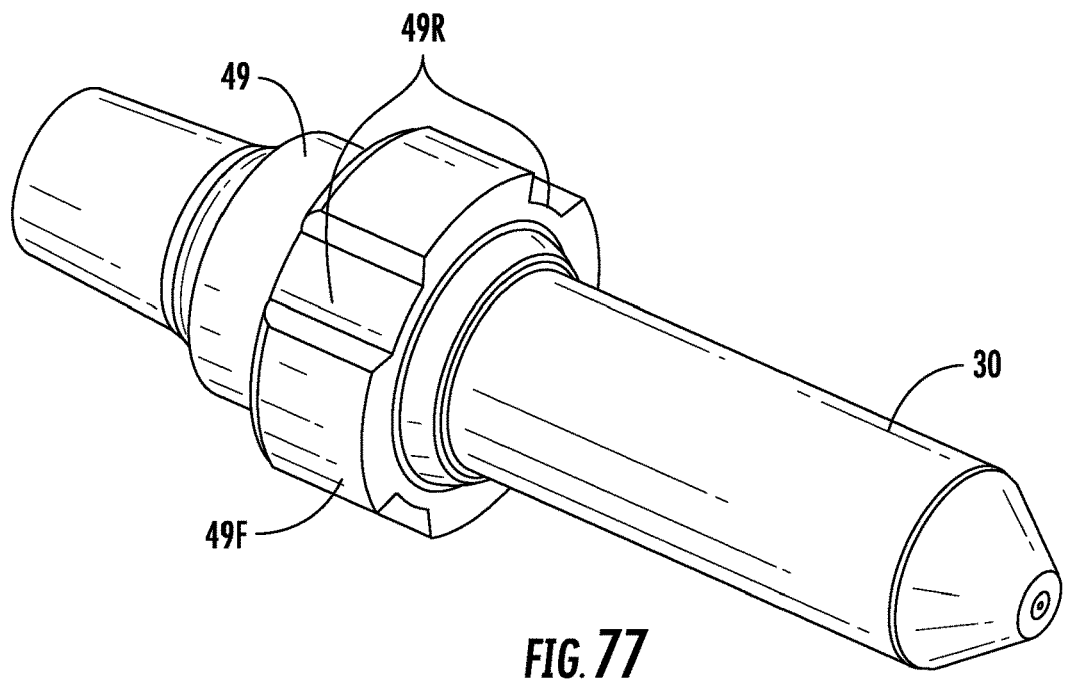
FIG. 77 is a perspective view of the ferrule and ferrule holder of the connector depicted in FIGS. 70 and 71.

Additionally, ferrule holder 49 may be configured for tuning ferrule 30 relative to housing 20. FIG. 77 is a perspective detailed view of the ferrule 30 disposed in ferrule holder 49. As shown, ferrule holder 49 comprises a plurality of recesses 49R formed in flange 49F for tuning of the connector. In this embodiment, flange 49F has four recesses 49R allowing four different rotational positions for ferrule holder 49/ferrule 30, thereby allowing quadrant tuning. FIG. 78 is a detailed front end view of the connector 10 showing that the front opening of housing 20 is sized for allowing the insertion of the ferrule holders. Additionally, a portion of the passageway 22 is sized to cooperate with the flange 49F and allow different rotational positions. Consequently, after measurement of the end face profile of the ferrule 30 or measurement of the insertion loss, the ferrule 30 may be tuned if desired for improving performance such as to a Grade B standard. By way of explanation, the latch arms 20LA may be deflected outward to release the ferrule holder 49 and then the ferrule holder 49 is rotated to the desired position and inserted back into the housing 20 until it is retained by latch arms 20LA. Other embodiments of ferrule holder 49 may have other suitable numbers of rotational positions as desired.

The concepts of the housings for connectors disclosed herein may also be used with multifiber connectors. By way of example, FIG. 79 is an assembled perspective view of a cable assembly 300 comprising a multifiber optic connector 200 having a housing 220. Housing 220 is similar to other housings 20 disclosed herein comprising a rear end (221) and a front end (223) with a longitudinal passageway (222) extending from the rear end (221) to the front end (223). Housing 220 comprises a part of the rear portion (RP) having a round cross-section (RCS) and a part of the front portion (FP) having a non-round cross-section (NRCS). By way of explanation, the front portion (FP) may have a rectangular cross-section with rounded sides (RS) that provides a first orientation feature for the connector for alignment during mating and inhibit insertion into a non-compliant device or port as best shown in FIG. 93.

Figure 80:
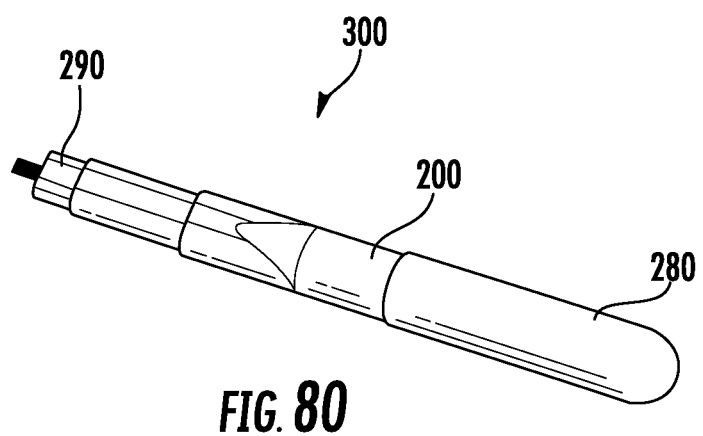
FIG. 80 is a perspective view of the multifiber optic connector of FIG. 79 with a dust cap attached.
Figure 92:
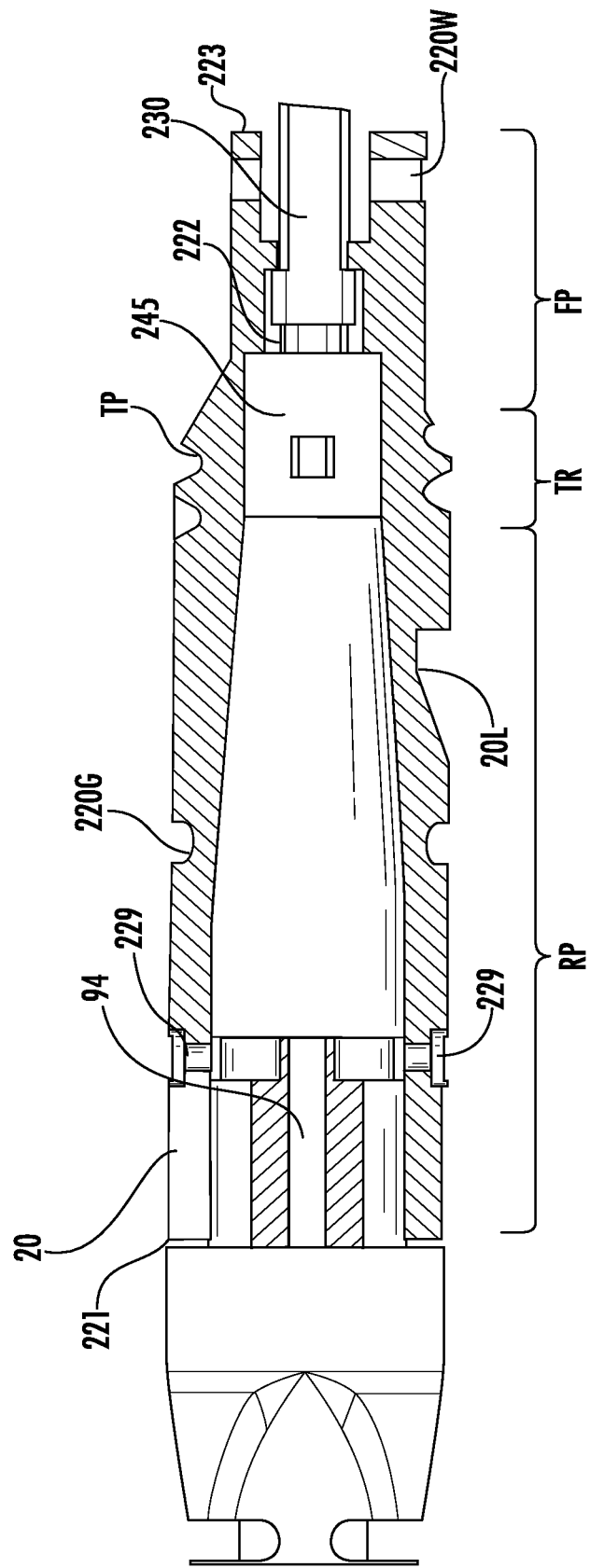
Figure 93:
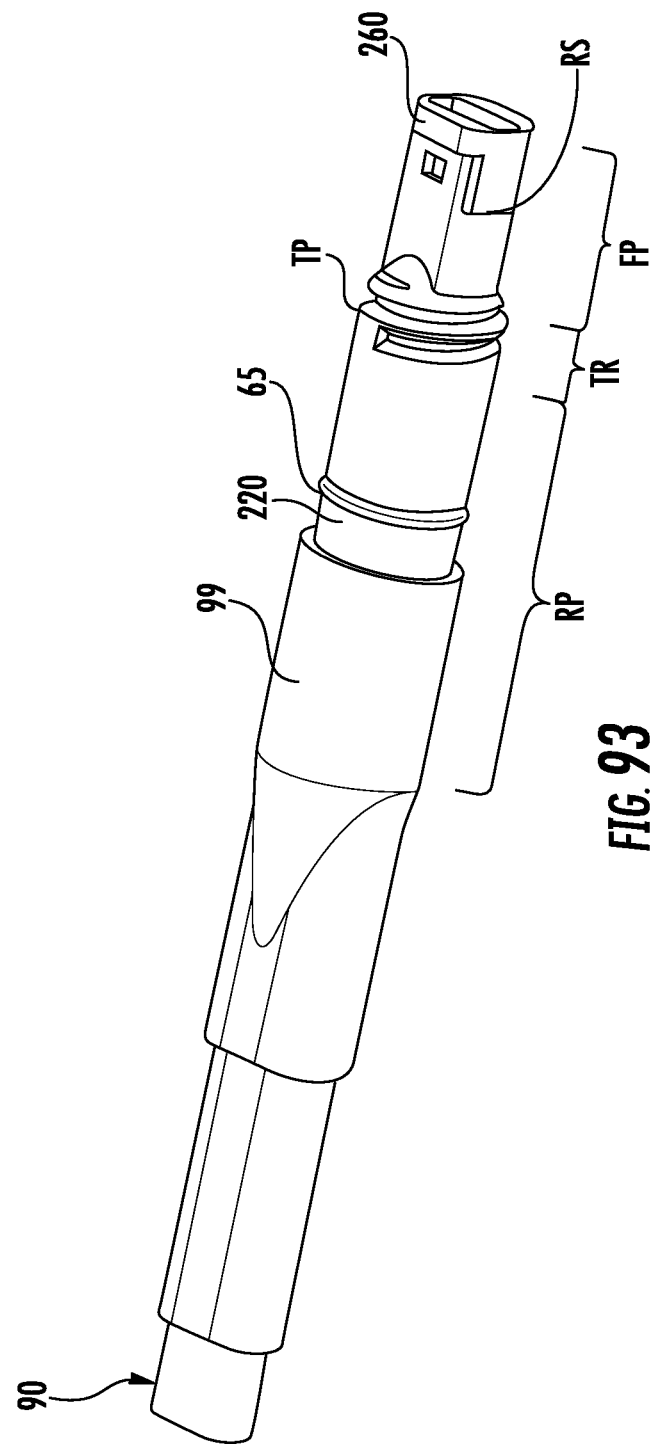
FIG. 93 depicts a perspective view of the assembled multifiber connector after the nosepiece is attached.

Housing 220 also comprises a transition region (TR) disposed between the rear portion (RP) and the front portion (FP) as best shown in FIGS. 92 and 93. Transition region (TR) of housing 220 comprises a threaded portion TP like other housings 20 disclosed herein. Housing 220 also comprises a locking feature 20L integrally-formed in housing 220 as best shown in FIG. 92. FIG. 80 depicts multifiber optic connector 200 may use a dust cap 280 attached for protecting a ferrule 230 form dust, debris and the like when not connected. Like other embodiments disclosed herein, dust cap 280 may be configured for attaching to the housing 220 using the threaded portion (TP).

Figure 81:
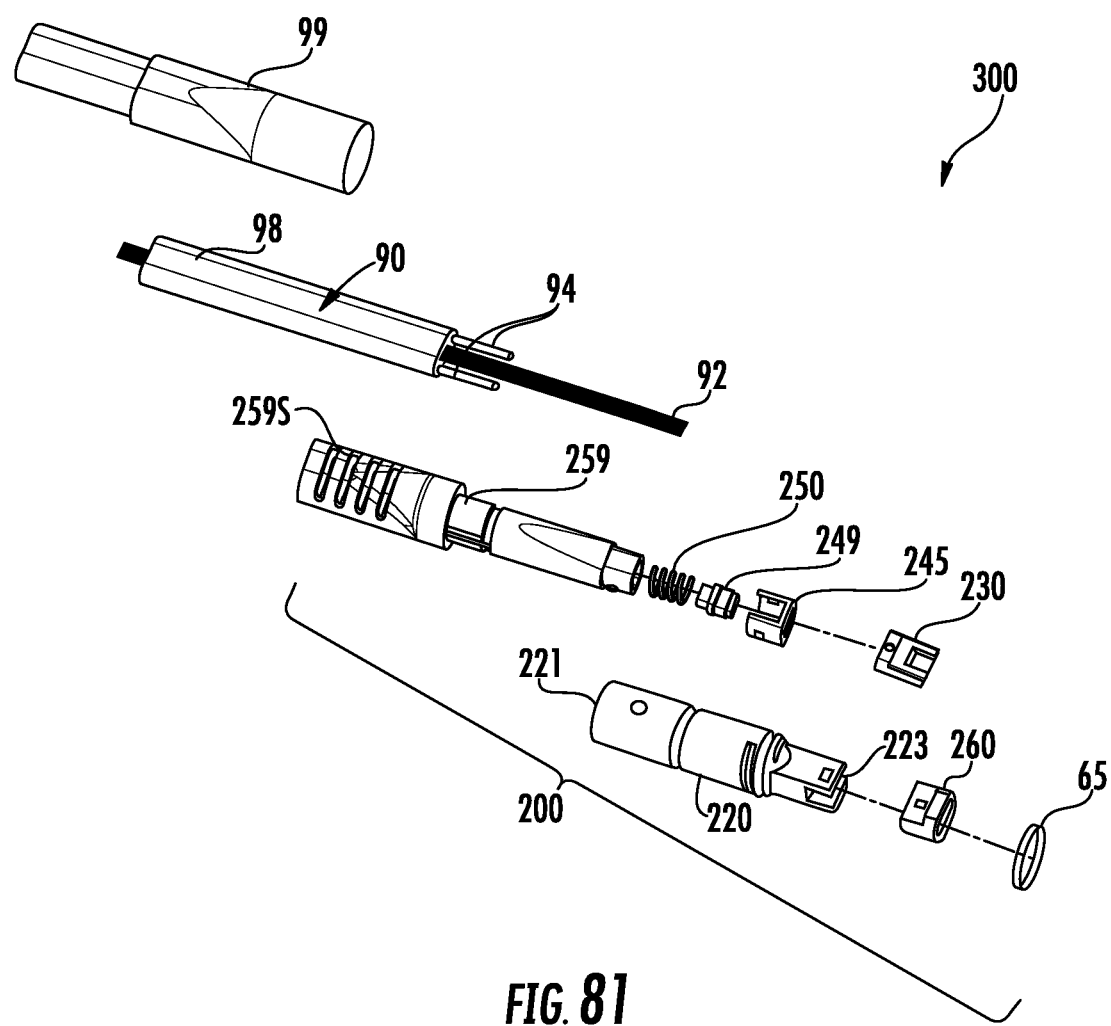
FIG. 81 is an exploded view of the cable assembly having the multifiber optic connector of FIG. 79.

FIG. 81 depicts an exploded view of cable assembly 300 having multifiber connector 200. As depicted, connector 200 comprises housing 220, multifiber ferrule 230, a ferrule holder 249, a ferrule holder retainer 245, a resilient member 250, a cable adapter 259, and a nosepiece 260. Connector may include other components such as one or more O-rings 65 that fit on housing 220. Connector 200 may have other components, arrangements or configurations depending various factors such as the cable or other considerations. Cable 90 is similar to the other cables disclosed herein, but it has a plurality of optical fibers. Cable assemblies 300 may use any suitable cable design.

Figure 82:
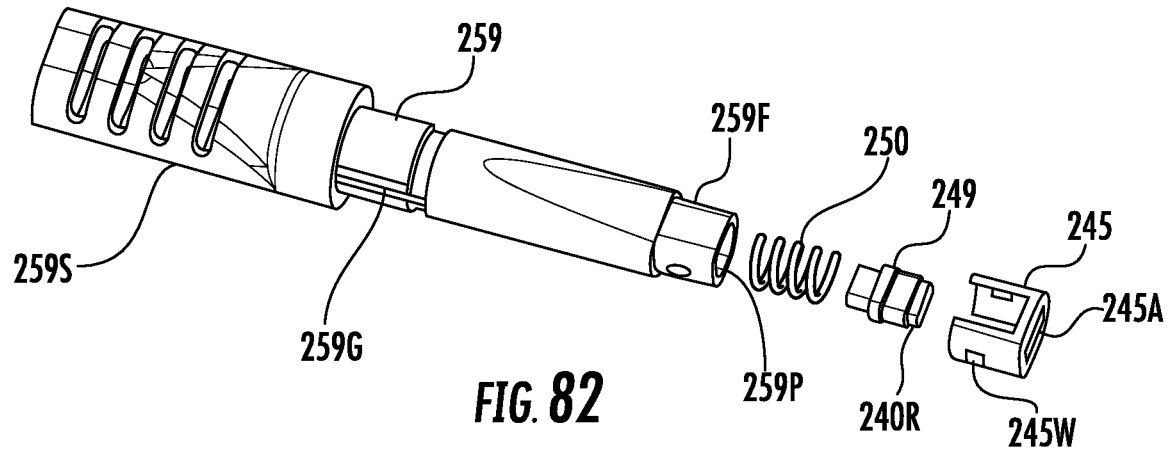
FIGS. 82 and 83 respectively are a detailed exploded and assembled view showing a pre-assembly of components of the multifiber optic connector of FIG. 79 before the fiber optic cable is threaded through the pre-assembly.
Figure 83:
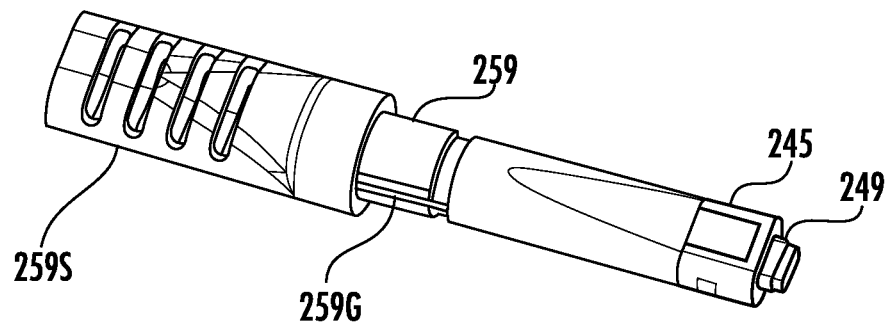

FIGS. 82-93 show the details and construction of cable assembly 300. FIGS. 82 and 83 respectively are a detailed exploded and assembled view showing a pre-assembly of components of multifiber connector 200 before cable 90 is threaded through the pre-assembly. The pre-assembly comprises ferrule holder 249, ferrule holder retainer 245, resilient member 250, and cable adapter 259. Ferrule holder retainer 245 comprises an aperture 245A sized for receiving a portion of ferrule holder 249 therethrough when attached to cable adapter 259 as shown in FIG. 83. Ferrule holder retainer 245 also comprises one or more attachment features 245W for securing ferrule holder retainer 245 to a front portion of cable adapter 259. Cable adapter 259 comprises a passageway 259P from the rear end to the front end for receiving the optical fibers 92 therethough. The opening at the front end of cable adapter 259 is sized for receiving resilient member 250 and has a backstop for seating the resilient member 250. When ferrule holder retainer 245 is attached to cable adapter 259 the resilient member 250 biases ferrule holder 249 to a forward position. Attachment features 245W of ferrule holder retainer 245 cooperate with attachment features 259F such as protrusions of cable adapter 259 for securing the ferrule holder retainer 245. As depicted in FIG. 83, forward portions of cable adapter 259 are exposed between arms of ferrule holder retainer 245 and the forward portion of ferrule holder 249 having recessed portion 249R is exposed. Cable adapter 259 may also include a strain-relieve portion 259S for inhibiting sharp cable bends near connector 200.

Figure 84:
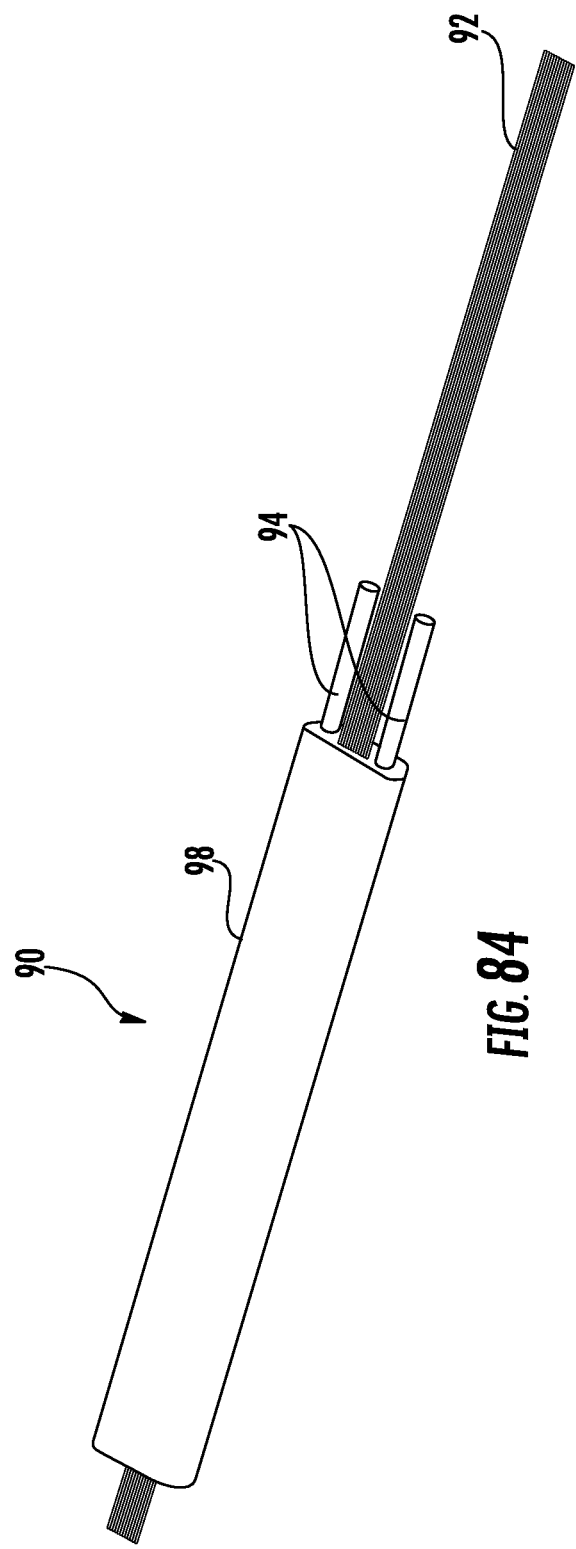
FIG. 84 is a perspective view of the fiber optic cable prepared for insertion into the pre-assembly of FIG. 83.
Figure 85:
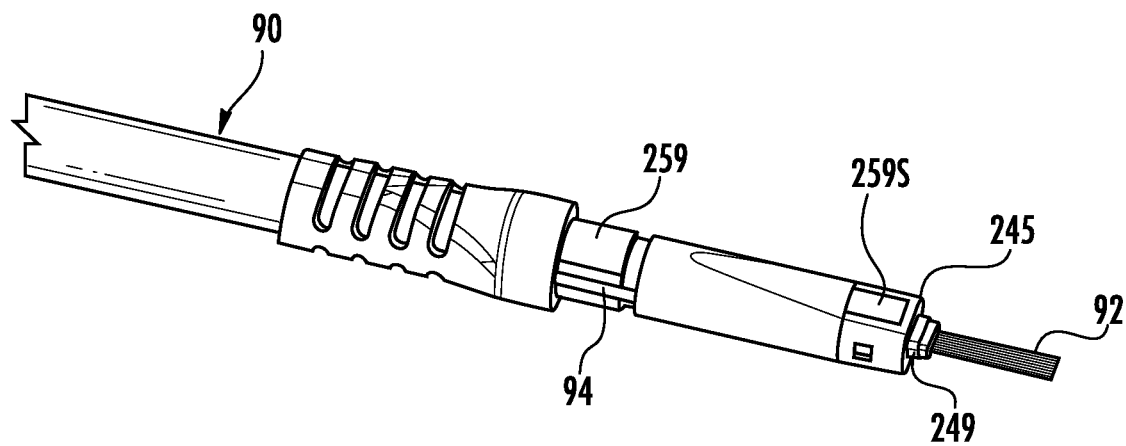
FIGS. 85 and 86 respectively are a perspective view and a sectional view of the fiber optic cable thread through the pre-assembly of FIG. 83.
Figure 86:
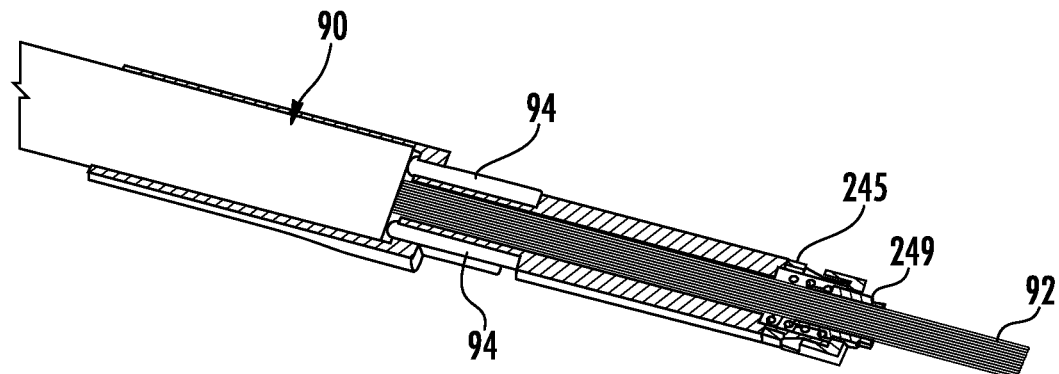
Figure 87:
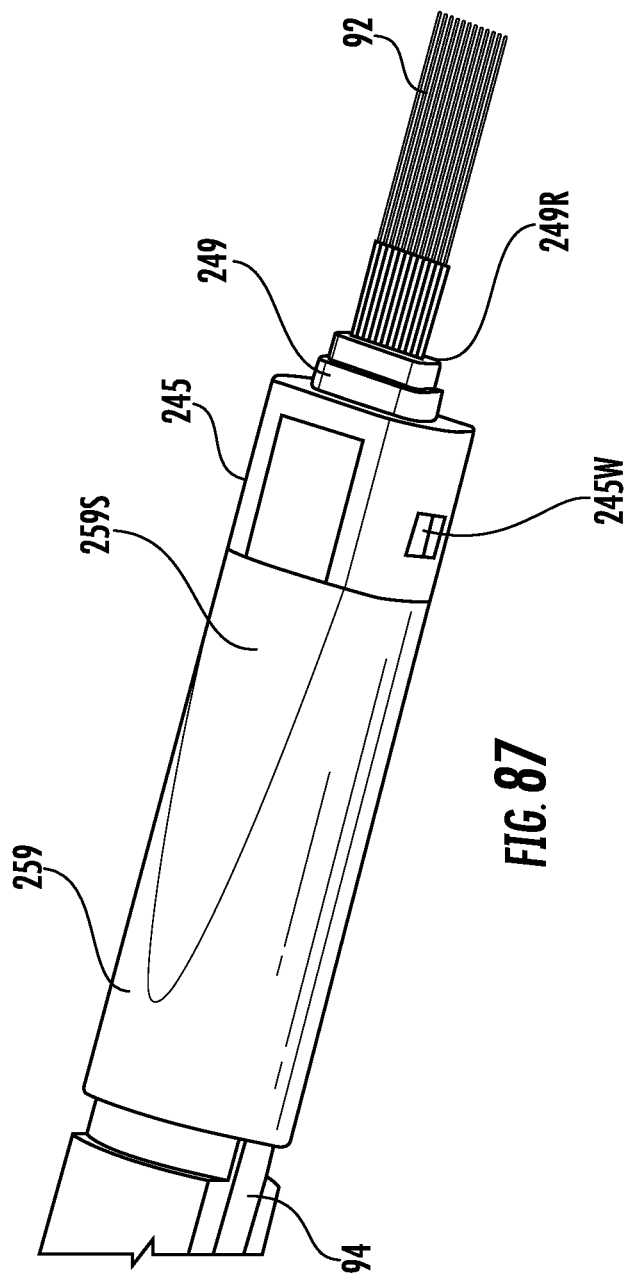
FIG. 87 depicts a perspective view of the assembly of FIG. 83 after a portion of the coating of the optical fibers is removed in preparation for inserting the ends of the optical fibers into the multifiber ferrule.

FIG. 84 is a perspective view showing cable 90 prepared for insertion into the pre-assembly of FIG. 83 with suitable lengths of strength components 94 and optical fibers 92 exposed. FIGS. 85 and 86 respectively depict a perspective view and a sectional view of cable 90 threaded through the pre-assembly of FIG. 83 so that optical fibers 92 extend well beyond the ferrule holder 249. As depicted, cable adapter 259 has bores on opposite side so that strength components 94 extend through the bores and into grooves 259G of cable adapter 259. Adhesive or other fastener may be applied to the strength components 94 to fix them to the cable adapter 259. FIG. 87 depicts a detailed perspective view of the assembly of FIG. 83 after a portion of the coating of optical fibers 92 is removed in preparation for inserting the ends of optical fibers 92 into the multifiber ferrule 230. Waiting to strip the coating from optical fibers 92 until this point in the assembly provides protection to the optical fibers 92 until they are ready to be inserted into the multifiber ferrule 230.

Figure 88:
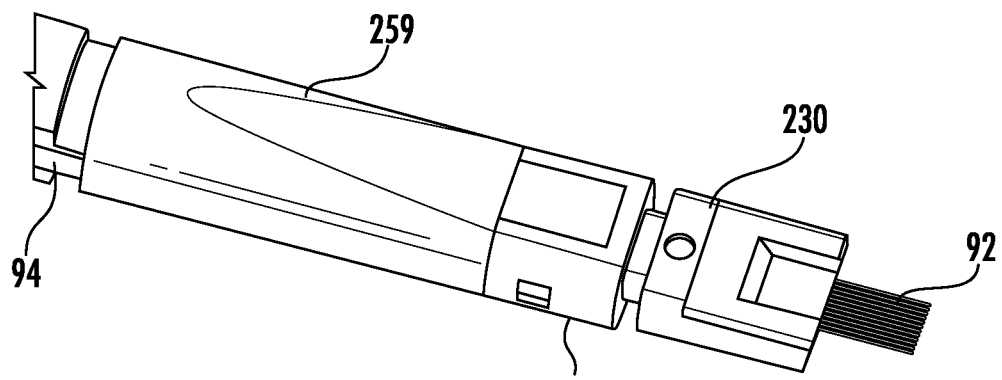
FIGS. 88 and 89 respectively are a perspective view and a sectional view of the multifiber ferrule attached to the optical fibers of the fiber optic cable.
Figure 89:
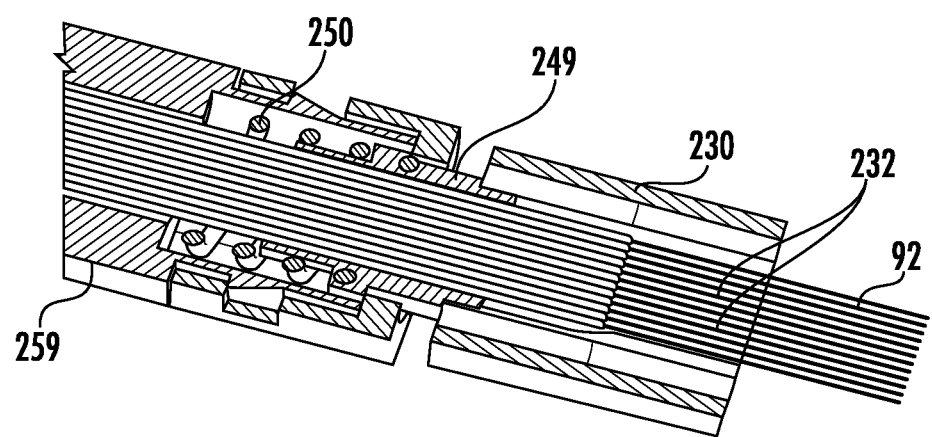
Figure 90:
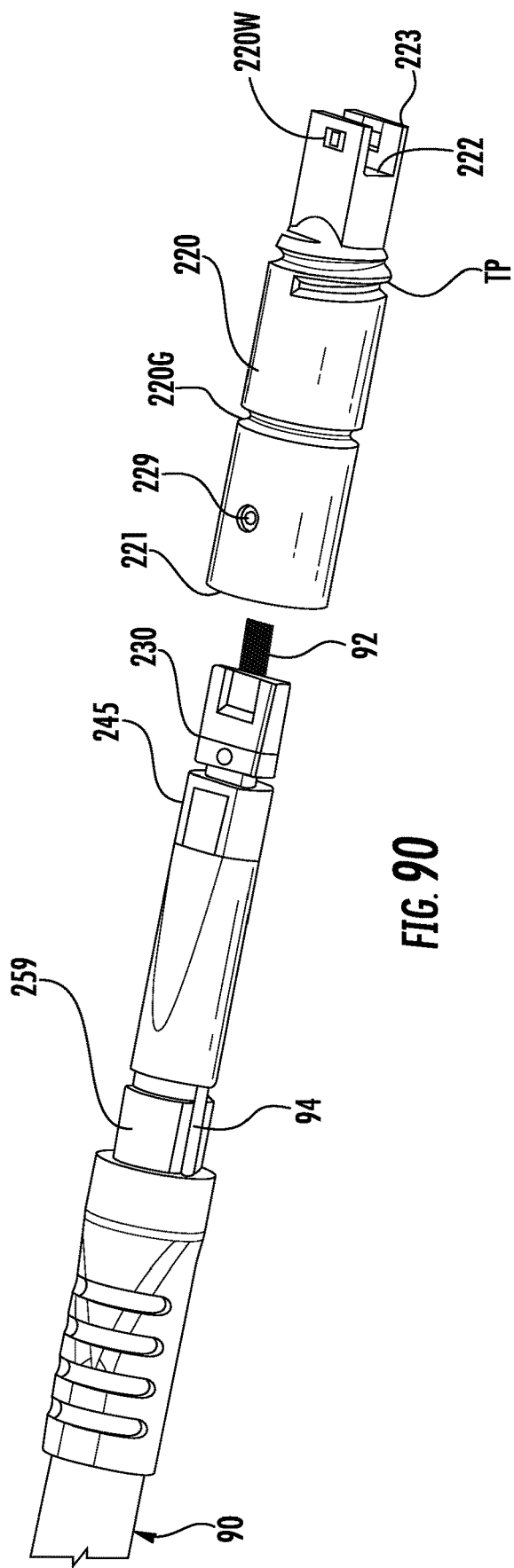
FIG. 90 shows the housing of the connector before being attached to a cable adapter of the multifiber connector.

FIGS. 88 and 89 shows the multifiber ferrule 230 attached to optical fibers 92 and the rear end of the multifiber ferrule 230 seated into the recess 249R of ferrule holder 249. Multifiber ferrule 230 may be a MPO ferrule, but other types of ferrules are possible such as a MT ferrule. Optical fibers 92 are attached to comprising a plurality of fiber bores (232) of multifiber 230 in a suitable manner known in the art such as adhesive or the like. FIG. 90 shows the housing 220 aligned with the cable adapter 259 before being attached. Housing 220 may include any suitable locking feature 20L disclosed herein.

Figure 91:
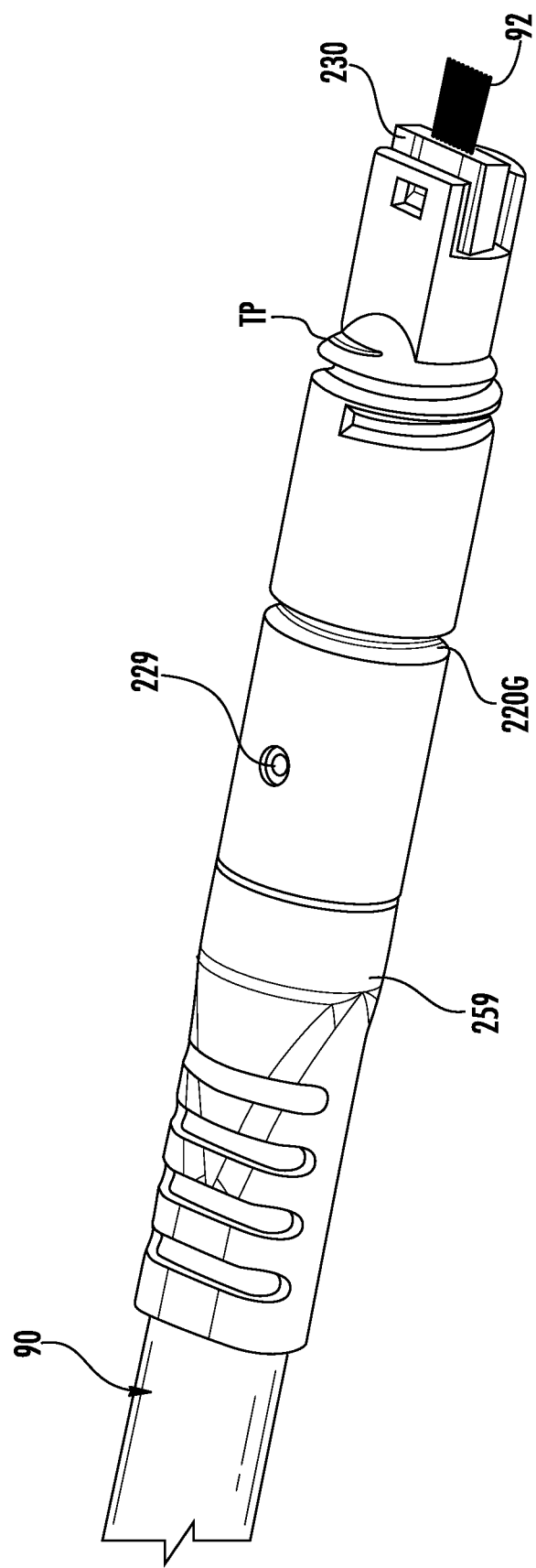
FIGS. 91 and 92 respectively show a perspective view and sectional view of the housing of the multifiber connector after being attached to the cable adapter.

FIGS. 91 and 92 respectively show a perspective view and a sectional view of the of the multifiber connector after being attached to the cable adapter 259. Optical fibers 92 extend beyond the front face of the multifiber ferrule 230 so they may be cleaved and polished after the multifiber ferrule is stabilized by the housing 220 as shown in FIG. 92. As depicted, opening 229 aligns over a groove of cable adapter 259 so that an adhesive may be injected into the opening 29 and wick about the cavity between the components and also contact the strength components 94. A second opening 229 is also provided in housing 220 so that air may escape when injecting the adhesive. FIG. 93 depicts a perspective view of the assembled multifiber connector after the nosepiece 260 is attached housing 220. Like the other nosepieces disclosed herein, nosepiece 260 may be attached in a similar fashion. Such as adhesive, welding and/or a mechanical means such as cooperating window and protrusions.

Other variations of housings 220 according to the concepts disclosed are possible. As an example of another housing for use with the multifiber connector, the housing may be defined as comprising a part of the rear portion (RP) having a polygonal cross-section (PCS) and a part of the front portion having a non-round cross-section (NRCS). The front portion (FP) or the rear portion (RP) of this explanatory housing may be further defined in various configurations as disclosed herein while retaining a part of the rear portion (RP) with the polygonal cross-section (PCS) and a part of the front portion (FP) having a non-round cross-section (NRCS). By way of example, the polygonal cross-section (PCS) may be a hexagon, a rectangle, a square or other suitable polygon as desired. Likewise, the complimentary device or port would be configured to mate in a suitable manner with the housing.

Other variations of the housing 20 for connectors 10 are possible. FIGS. 94 and 94A depict perspective view and cross-sectional views of another connector housing that may be used with any of the suitable concepts disclosed. In this embodiment, the rear portion RP is non-round, and has a polygonal cross-section PCS as shown by the cross-section in FIG. 94A. FIG. 94A shows that this housing 20 may have a keying feature 20K which may take any suitable form or may a keying portion 20KP as desired. Likewise, this housing 20 may use any suitable locking feature 20L as desired.

Although the disclosure has been illustrated and described herein with reference to explanatory embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

I claim:

1. A fiber optic connector, comprising:
a housing comprising a rear end and a front end, and a longitudinal passageway extending from the rear end to the front end, wherein a part of the rear portion of the housing comprises a round cross-section and a part of the front portion of the housing comprises a non-round cross-section with a transition region disposed between the rear portion and the front portion, and the housing comprises a locking feature integrally formed in the housing, wherein the locking feature is a subtractive portion from a primitive geometry of the rear portion of the housing for securing the optical mating of the fiber optic connector;
an O-ring being disposed on a portion of the housing; and
a multifiber ferrule comprising a plurality of fiber bores.

2. The fiber optic connector of claim 1, wherein the multifiber ferrule comprises an MPO ferrule.

3. The fiber optic connector of claim 1, further comprising a cable adapter.

4. The fiber optic connector of claim 3, wherein the cable adapter receives a portion of a resilient member and a portion of a ferrule holder, and a ferrule holder retainer is attached to the cable adapter.

5. The fiber optic connector of claim 3, wherein the cable adapter comprises a strain-relief portion.

6. A fiber optic connector, comprising:
a housing comprising a rear end and a front end, and a longitudinal passageway extending from the rear end to the front end, wherein a part of the rear portion of the housing comprises a round cross-section and a part of the front portion of the housing comprises a non-round cross-section with a transition region disposed between the rear portion and the front portion, and the housing comprises a locking feature integrally formed in the housing and a keying portion comprising a female key, wherein the keying portion is disposed 180 degrees from the locking feature, and the locking feature comprises a ramp with a ledge configured as a subtractive portion from a primitive geometry of the rear portion of the housing for securing the optical mating of the fiber optic connector; and
a MPO ferrule comprising a plurality of fiber bores.

7. The fiber optic connector of claim 6, further comprising a cable adapter.

8. The fiber optic connector of claim 6, wherein the cable adapter receives a portion of a resilient member and a portion of a ferrule holder, and a ferrule holder retainer is attached to the cable adapter.

9. A fiber optic connector, comprising:
a housing comprising a rear end and a front end, and longitudinal passageway extending from the rear end to the front end, wherein a part of the rear portion of the housing comprises a round cross-section and a part of the front portion of the housing comprises a non-round cross-section with a transition region disposed between the rear portion and the front portion, and the housing comprises a locking feature integrally formed in the housing and a keying portion comprising a female key, wherein the keying portion is disposed 180 degrees from the locking feature, and the locking feature is a subtractive portion from a primitive geometry of the rear portion of the housing for securing the optical mating of the fiber optic connector;
a MPO ferrule comprising a plurality of fiber bores; and
a cable adapter, wherein the cable adapter receives a portion of a resilient member and a portion of a ferrule holder, and a ferrule holder retainer is attached to the cable adapter.

10. The fiber optic connector of claim 1, the wherein the transition region comprises a threaded portion.

11. The fiber optic connector of claim 10, wherein the threaded portion extends from the non-round cross-section to the round cross-section.

12. The fiber optic connector of claim 10, wherein the threaded portion comprises less than three threads.

13. The fiber optic connector claim 12, wherein the less than three threads are continuous.

14. The fiber optic connector of claim 1, further comprising a nosepiece.

15. The fiber optic connector of claim 1, further comprising a dust cap.

16. The fiber optic connector of claim 1 being a portion of a cable assembly.

17. The fiber optic connector of claim 1 being a portion of a distribution cable.

18. The fiber optic connector of claim 1, wherein the locking feature comprises a ramp with a ledge.

19. The fiber optic connector of claim 1, the housing further comprising a keying portion comprising a female key.

20. The fiber optic connector of claim 19, wherein the keying portion is disposed 180 degrees from the locking feature.

21. The fiber optic connector of claim 1, wherein the locking feature is disposed on an outer surface of the housing.

22. The fiber optic connector of claim 1, the O-ring being disposed on the rear portion of the housing.

23. The fiber optic connector of claim 6, further comprising an O-ring disposed on a portion of the housing.

24. The fiber optic connector of claim 23, the O-ring being disposed on the rear portion of the housing.

25. The fiber optic connector of claim 9, further comprising an O-ring disposed on a portion of the housing.

26. The fiber optic connector of claim 25, the O-ring being disposed on the rear portion of the housing.

27. The fiber optic connector of claim 6, further comprising a nosepiece.

28. The fiber optic connector of claim 9, further comprising a nosepiece.

29. The fiber optic connector of claim 6 being a portion of a cable assembly.

30. The fiber optic connector of claim 9 being a portion of a cable assembly.

31. A fiber optic connector, comprising:
a housing comprising a rear end and a front end, and a longitudinal passageway extending from the rear end to the front end, wherein a part of the rear portion of the housing comprises a round cross-section and a part of the front portion of the housing comprises a non-round cross-section with a transition region disposed between the rear portion and the front portion, and the housing comprises a locking feature integrally formed in the housing, wherein the locking feature is a subtractive portion from a primitive geometry of the rear portion of the housing for securing the optical mating of the fiber optic connector;
a multifiber ferrule comprising a plurality of fiber bores; and
a nosepiece attached to the housing.

* * * * *

UNITED STATES PATENT AND TRADEMARK OFFICE
CERTIFICATE OF CORRECTION

| | |
|---|---|
| PATENT NO. | : 11,493,699 B2 |
| APPLICATION NO. | : 16/697036 |
| DATED | : November 8, 2022 |
| INVENTOR(S) | : Joel Christopher Rosson |

It is certified that error appears in the above-identified patent and that said Letters Patent is hereby corrected as shown below:

On the Title Page

On the page 7, in Column 2, under "Other Publications", Line 43, delete "lopp" and insert -- loop --.

On the page 7, in Column 2, under "Other Publications", Line 49, delete "Poeceedings" and insert -- Proceedings --.

In the Claims

In Column 31, Line 1, in Claim 10, after "claim 1," delete "the".

In Column 31, Line 8, in Claim 13, after "connector" insert -- of --.

Signed and Sealed this
Twenty-eighth Day of February, 2023

*Katherine Kelly Vidal*

Katherine Kelly Vidal
*Director of the United States Patent and Trademark Office*